United States Patent [19]

Hayafune

[11] Patent Number: 5,390,116
[45] Date of Patent: Feb. 14, 1995

[54] SPEED CHANGE CONTROL METHOD AND APPARATUS FOR AN AUTOMATIC TRANSMISSION FOR VEHICLES TRAVELING UNDER VARIOUS ROAD CONDITIONS

[75] Inventor: Kazuya Hayafune, Okazaki, Japan

[73] Assignee: Mitsubishi Jidosha Kogyo Kabushiki Kaisha, Tokyo, Japan

[21] Appl. No.: 851,190

[22] Filed: Mar. 13, 1992

[30] Foreign Application Priority Data

Mar. 13, 1991 [JP] Japan .............................. 3-048335
Feb. 19, 1992 [JP] Japan .............................. 4-032353

[51] Int. Cl.$^6$ ............................................. B60K 41/06
[52] U.S. Cl. ............................ 364/424.1; 364/425.05;
364/426.02; 180/142; 180/197; 477/903
[58] Field of Search ............ 364/424.1, 424.05, 426.01,
364/426.02, 426.03; 74/866; 180/132, 141, 142, 197

[56] References Cited

U.S. PATENT DOCUMENTS

| | | | |
|---|---|---|---|
| 4,788,892 | 12/1988 | Komoda et al. ...................... | 74/866 |
| 4,841,815 | 6/1989 | Takahashi ........................... | 74/866 |
| 4,966,049 | 10/1990 | Takahashi ........................... | 74/866 |
| 5,047,940 | 9/1991 | Onaka et al. ....................... | 364/426.02 |
| 5,079,705 | 1/1992 | Sakai et al. ......................... | 364/424.1 |
| 5,135,068 | 8/1992 | Emori et al. ........................ | 180/132 |
| 5,163,530 | 11/1992 | Nakamura et al. .................. | 180/197 |
| 5,189,621 | 2/1993 | Onari et al. ........................ | 364/431.04 |
| 5,245,542 | 9/1993 | Itoh et al. .......................... | 364/426.02 |
| 5,257,189 | 10/1993 | Asada ................................ | 364/424.1 |

FOREIGN PATENT DOCUMENTS 63-246546 10/1988 Japan .
2-3738 1/1990 Japan .
2-212655 8/1990 Japan .

*Primary Examiner*—Kevin J. Teska
*Assistant Examiner*—Collin W. Park

[57] ABSTRACT

In a speed change control method for an automatic transmission for vehicles with a plurality of gearshift positions, the frictional resistance of a road surface is detected, gearshifting to at least a lowest-speed gearshift position is prohibited if the frictional resistance of the road surface is judged to be low. Preferably, gearshifting to at least the lowest-speed gearshift position is prohibited when starting the vehicle from a stopped position if the frictional resistance of the road surface is judged to be low. The frictional resistance of the road surface is determined to be low when an occurrence frequency (%) of the detected frictional resistance value, being less than or equal to a first predetermined value, is more than or equal to a second predetermined value.

11 Claims, 36 Drawing Sheets

F I G. 1
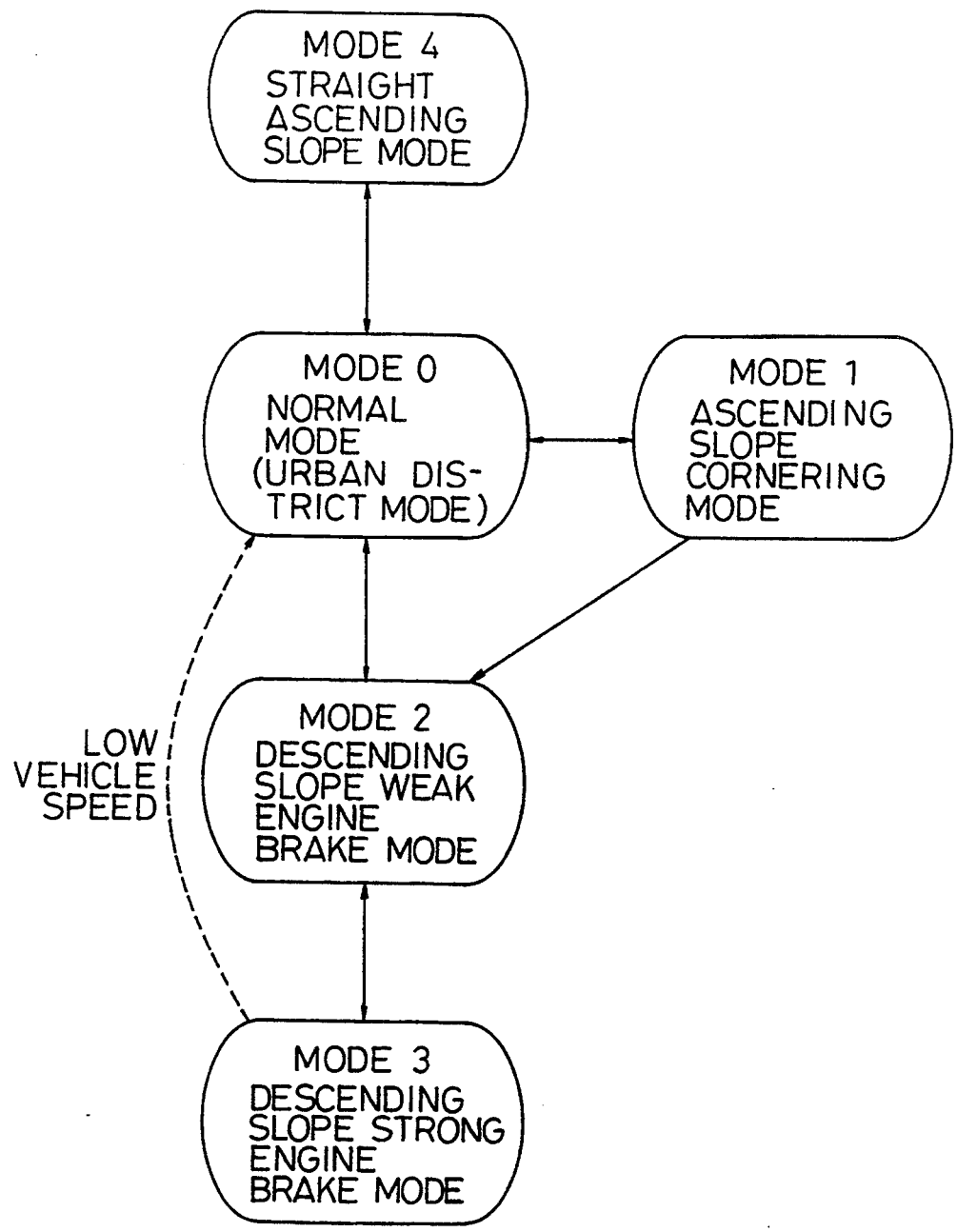

FIG. 20
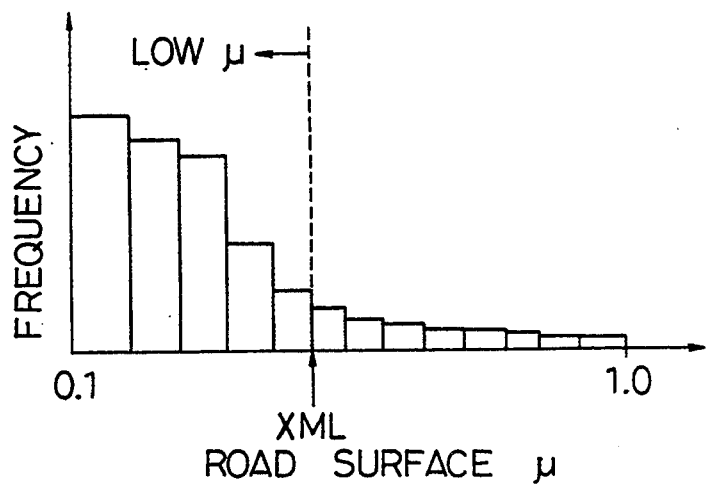
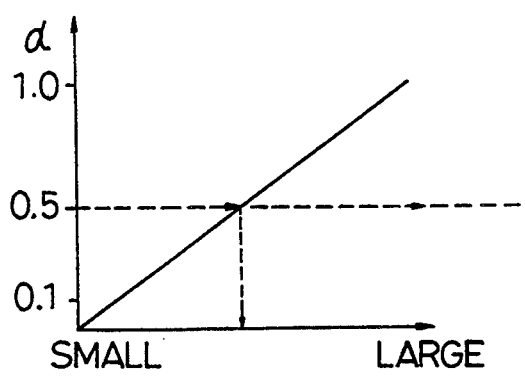
FIG. 21A
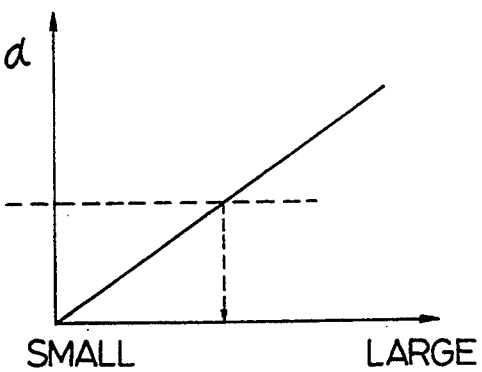
FIG. 21B

F I G. 22
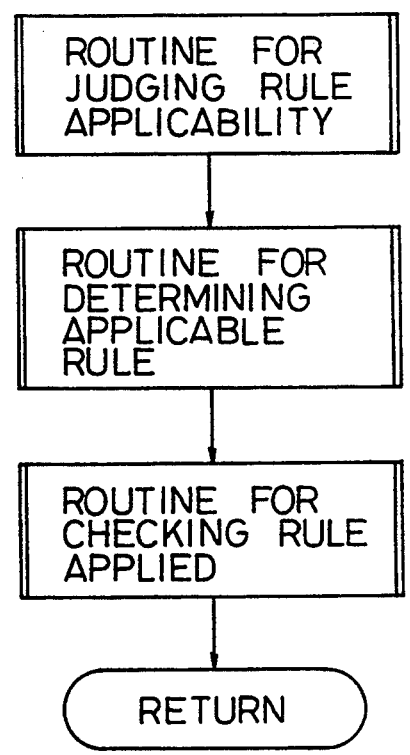

F I G. 27
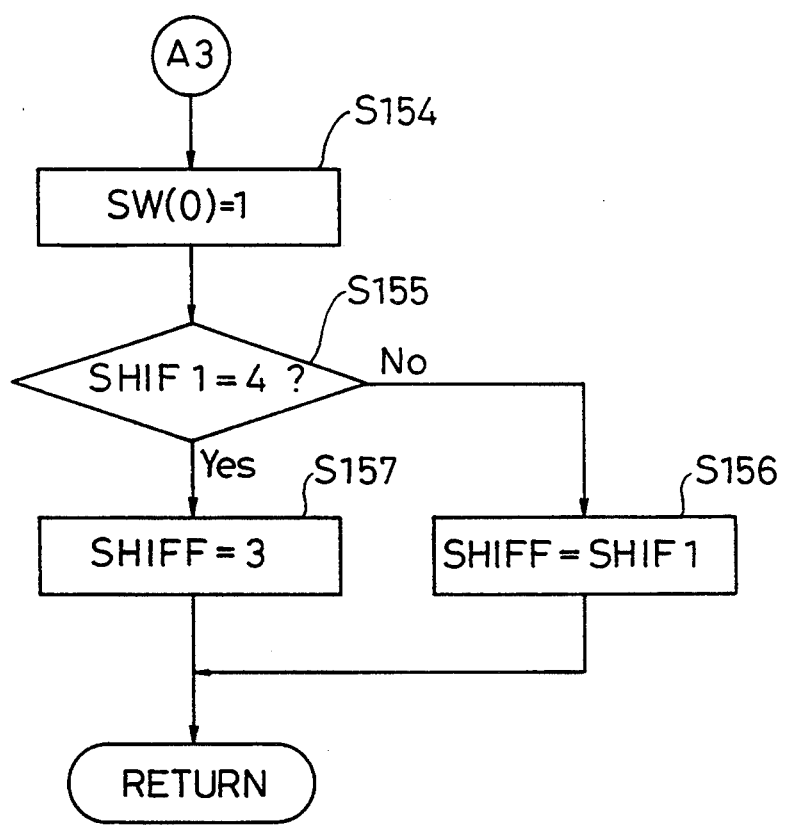

SPEED CHANGE CONTROL METHOD AND APPARATUS FOR AN AUTOMATIC TRANSMISSION FOR VEHICLES TRAVELING UNDER VARIOUS ROAD CONDITIONS

BACKGROUND OF THE INVENTION

1. Field of the Invention

The present invention relates to a speed change control method and apparatus for an automatic transmission for vehicles under various road conditions, and more particularly, to a speed change control method and apparatus whereby an optimum gearshift position is automatically selected by a fuzzy inference in accordance with road conditions, etc. when driving on flat roads such as urban district streets, and on snow-covered roads which have low frictional resistance.

2. Description of the Related Arts

In a conventional automatic transmission for a vehicle, shift patterns are preset in accordance with opening of a throttle (engine load) and vehicle speed, and a gearshift position is set using the shift patterns according to the opening of the throttle and the vehicle speed that are detected, thus automatically shifting the gear. The conventional automatic speed change control method presents no particularly serious problem and ensures smooth speed change with no difficulty as long as the gear is shifted while driving on flat roads such as urban district streets. However, driving in mountainous areas encounters straight ascending slope roads, ascending slope roads with many curves, descending slope roads that require strong engine braking, and gentle, long descending slope roads. Also, some drivers let their vehicles accelerate rapidly on descending slopes and step on brake pedals deeply immediately before cornering. During such driving in mountainous areas, it is rather difficult to select an optimum gearshift position in accordance with vehicle driving conditions, driving intention of a driver, road conditions, and the like. For this reason, there has been a need to achieve a method that permits easy driving operation, good car driving performance, and more comfortable driving even when driving in mountainous areas.

In response to the foregoing demand, speed change control methods wherein "fuzzy control" is performed to select an optimum gearshift position in accordance with the aforementioned vehicle driving conditions or the other conditions are known, for instance, by Japanese unexamined patent publications No. S63-246546, No. H02-3738, etc. These conventional speed change control methods are designed to determine all of optimum gearshift positions by a fuzzy inference for driving on urban streets and in mountainous areas. Accordingly, the speed change control methods based on the conventional fuzzy control have such disadvantages as many rules and complicated membership functions, requiring a computer with a large capacity for practical applications. Further, because of the many rules and the complicated membership functions, tuning is difficult, therefore making it difficult to apply them to other models.

In addition, when the speed change control methods based on the fuzzy control are newly adopted, they are likely to feel foreign to drivers who are accustomed to driving on normal flat roads in urban districts by the conventional automatic speed change control methods because a shift of gear is made in response to subtle changes in driving conditions such as riding over a small bump or a light step on an accelerator, whereas no shift of gear would be made in the conventional methods.

In Japanese unexamined patent publication No. H2-212655 is proposed a speed change control method wherein diverse parameters that represent vehicle driving conditions are detected, fuzzy inference is implemented based on the detected signals of the parameters and preset membership functions to assess the magnitude of the driving resistance, and a speed change map for high-load driving is selected to replace a speed change map for normal driving if the driving resistance value is greater than a predetermined value, thus determining the gearshift positions according to the speed change map for high-load driving. However, according to the proposed speed change control method, the same speed change map is used for both roads of straight ascending slopes and roads of ascending slopes with many curves, therefore, it does not permit sufficiently accurate speed change control for the foregoing diverse road conditions and driving intentions, etc. that are encountered while driving in mountainous areas.

Further, the behavior of the vehicle is likely to become unstable on a road such with a low frictional resistance, such as on a snow-covered road in response to small disturbance such as riding over a small bump, small change in driving forces, braking operation, or the like. For this reason, an sufficiently accurate speed change control on a road with a low frictional resistance, such as on a snow-covered road, is required to prevent unnecessary braking operation and gearshifting, as long as possible.

SUMMARY OF THE INVENTION

An object of the present invention is to provide a speed change control method for an automatic transmission for vehicles, which permits easy start of the vehicle and prevents slippage on a road with a low friction factor $\mu$ such as on a snow-covered road.

According to the present invention, there is provided a speed change control method for an automatic transmission which is provided on a vehicle and which has a plurality of gearshift positions including a lowest-speed gearshift position, comprising the steps of detecting the value of a parameter related to frictional resistance of a road surface on which the vehicle is traveling, and prohibiting gearshifting to at least the lowest-speed gearshift position if the frictional resistance of the road surface is judged to be low based on the detected parameter values related to the frictional resistance. Specifically, gearshifting to at least the lowest-speed gearshift position is prohibited at starting the vehicle if the frictional resistance of the road surface is judged to be low. Preferably, the frictional resistance of the road surface is determined to be low when the sum of detection frequency (%) of the detected parameter values, each of which is a first predetermined value or less, is a second predetermined value or more.

As required, if the sum of detection frequency (%) decreases to the second predetermined value of less, the frictional resistance of the road surface is determined to be low until a first predetermined period of time elapses from the point at which the sum of detection frequency lowers below the second predetermined value. Further, gearshifting to at least said lowest-speed gearshift position may be prohibited at starting the vehicle if the ratio of the period of time during which the frictional resistance of the road surface is judged to be low to a second predetermined period of time is a predetermined value or more.

The above and other objects, features, and advantages of the invention will be more apparent from the ensuring detailed description taken in connection with the accompanying drawings.

BRIEF DESCRIPTION OF THE DRAWINGS

FIG. 1 is a diagram which illustrates interrelation among control modes implemented by the speed change control method for an automatic transmission for vehicles according to the present invention;

FIG. 20 is an example of histogram of detected road surface $\mu$ values;

FIG. 21 illustrates membership functions for simultaneously determining all threshold values by an $\alpha$ value, in which FIG. 21 (A) is a graph showing the relationship between $\alpha$ value and weight/gradient resistance judgment threshold value P61U, and FIG. 21 (B) is a graph showing the relationship between $\beta$ value and 2-second vehicle speed difference judgment threshold value P82L;

FIG. 22 is a flowchart of a routine for judging whether rules are applicable in the fuzzy speed change control;

FIG. 27 is the remaining part of the flowchart of FIG. 26;

DETAILED DESCRIPTION OF TIM PREFERRED EMBODIMENTS

Basic Concept of the Present Invention

Figure 2:
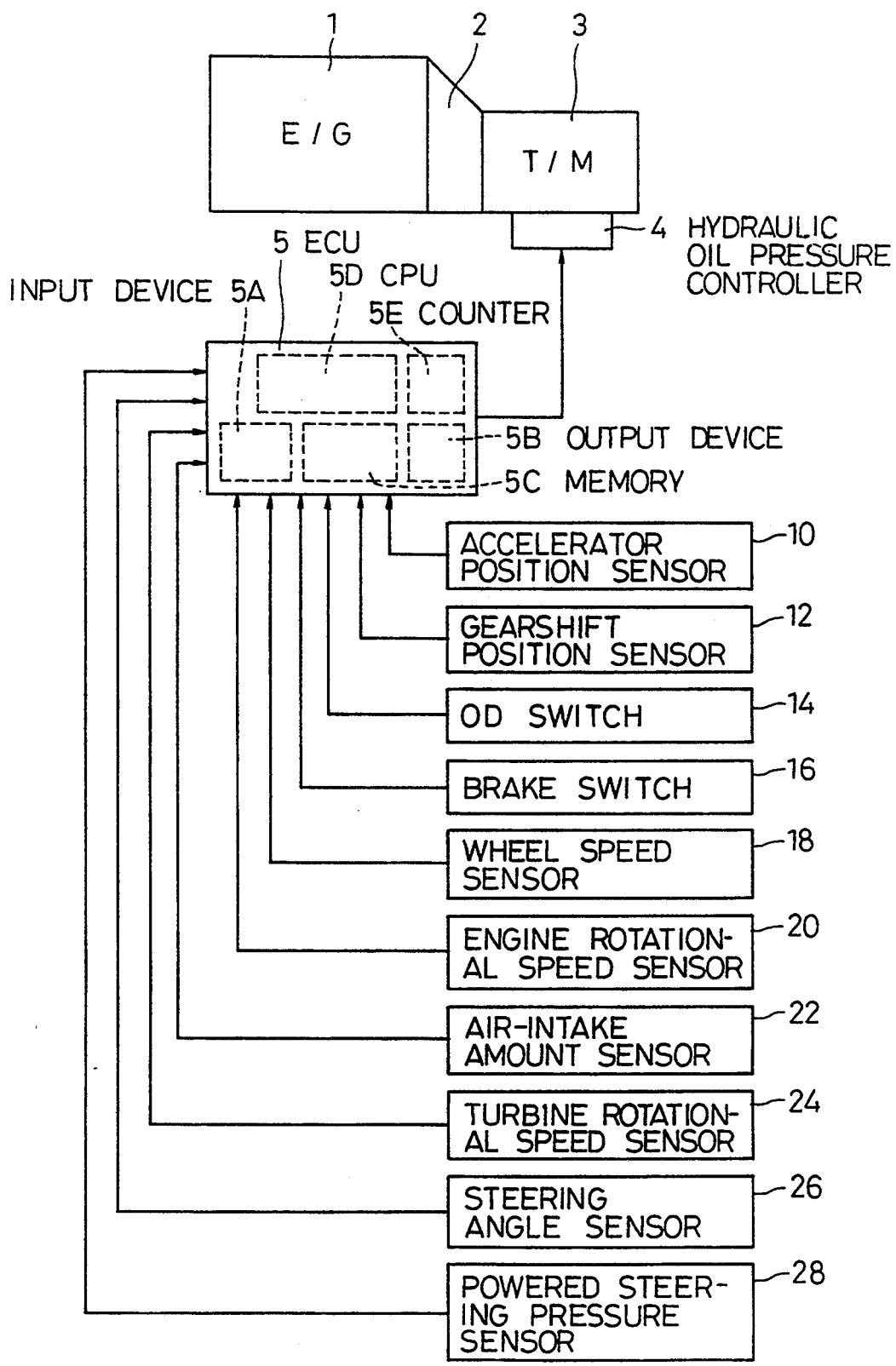
FIG. 2 is a block diagram which illustrates a schematic configuration of a speed change control unit to which the speed change control method according to the present invention is applied.

Prior to the description of preferred embodiments, the basic concept of the present invention is explained, referring to FIG. 1. The speed change control is classified into five modes, for example, and the following five different modes are provided; a normal mode (MODE 0) used for driving on flat roads in an urban area or the like, an ascending slope cornering mode (MODE 1) used for a mountainous ascending slope with many curves, a descending slope weak engine braking mode (MODE 2) used for driving on a gentle descending slope which requires weak engine braking, a descending slope strong engine braking mode (MODE 3) used for driving on a steep descending slope or a slope with a sharp curve which requires strong engine braking, and a straight ascending slope mode (MODE 4) used for driving on a long, straight ascending slope.

In the normal mode 0, a shift pattern for driving on flat roads in an urban district or the like is prepared in advance, and the shift pattern for driving on flat roads is used to set an optimum gearshift position in accordance with opening of the accelerator (engine load) and vehicle speed. This is substantially the same as the conventional speed change control methods. When this mode 0 is selected, the gearshift position is set by a speed change control program for the normal mode 0 which is separately prepared.

In the ascending slope cornering mode 1, a shift pattern for driving on an ascending slope with many curves (to be detailed later) is prepared which differs from the shift pattern for driving on a flat road. The shift pattern for the model 1 is designed so that it is difficult for an upshift to take place even if the pressure on an accelerator is decreased at the time of cornering, thereby to prevent shift hunting.

In the descending slope weak engine braking mode 2 and the descending slope strong engine braking mode 3, gearshaft positions 3 and 2 are coercively set, respectively, and appropriate engine braking is automatically applied to prevent excessive speed at the time of cornering on a descending slope and also to minimize braking operation.

In the straight ascending slope mode 4, the current gearshift position is changed to another position for lowering the speed by one level to secure a required driving force. In this straight ascending slope mode 4, downshift is automatically performed, making it possible to secure the required driving force and to prevent shift hunting. The speed change control by this mode 4 is particularly effective for a vehicle with a smaller engine-displacement.

According to the speed change control method for the present invention, those control modes are selected by implementing the fuzzy inference based on various fuzzy input variables which represent vehicle driving conditions, driver's driving intention and road conditions, and a membership function (crisp set), and a fuzzy shift position is set according to the selected control mode. Thus, the gearshift position is not set directly by the fuzzy inference for all gear shifting operations when driving in an urban district or mountainous district, therefore, fewer rules are required for selecting the control modes and simpler functions results.

The arrows drawn between the control modes in FIG. 1 indicate the control mode directions into which the current control can be switched. This will be discussed in detail later. For instance, if the current mode is the ascending slope cornering mode (MODE 1), then it is possible to go back from the Mode to the normal mode 0 and also to directly switch to the descending slope weak engine braking mode 2, but it is impossible to switch directly to the straight ascending slope mode 4. It is impossible to directly switch from the normal mode 0 to the descending slope strong engine braking mode 3, so it must always be switched via MODE 2.

Hardware Configuration of the Speed Change Control Unit of the Automatic Transmission FIG. 2 shows an outline of the speed change control unit of the automatic transmission to which the present invention is applied. To the output side of an internal-combustion engine (E/G) 1 mounted on a vehicle or a car is connected a gear transmission (T/M) 3 via a torque converter 2. The transmission 3 has, for example, speed change stages consisting of four forward stages and one reverse stage, and it is capable of establishing a desired gearshift position by engaging or disengaging one or more of brakes and clutches which are not illustrated. The speed change control unit is equipped with a hydraulic oil pressure controller 4 to control the hydraulic oil pressure applied to the foregoing brakes and clutches in response to control signals received from an electronic control unit (ECU) 5 to be discussed later. Diverse types of oil pressure controls or the like for speed shifting can be considered for the transmission and the hydraulic oil pressure controller to which the present invention is applied, and there is no particular limitation.

The electronic control unit 5 sets an optimum gearshift position for vehicle operating conditions or the like and delivers a control signal corresponding to the set gearshift position to the aforementioned hydraulic oil pressure controller 4. To the output side of the electronic control unit 5 is connected the hydraulic oil pressure controller 4, and to the input side are connected various sensors. These sensors supply detection signals related to driver's driving intention, operating conditions of the vehicle including the engine 1, and road conditions to the electronic control unit 5.

These input signals (input variables) include the amount of operation made by a driver on an accelerator pedal i.e., accelerator position (opening) APS which is detected by an accelerator position sensor 10, shift lever position SPOS detected by a shift position sensor 12, an ON/OFF signal OD of an OD switch 14 for selecting the 4th gearshift (overdrive) position, an ON/OFF signal BRK of a brake switch 16 which turns ON or OFF as a driver steps on a brake pedal, a wheel speed signal which is detected by a wheel speed sensor 18 and which is used for calculating vehicle speed V0 or longitudinal (forward/backward) acceleration Gx applied to the vehicle, a signal Ne indicating rotational speed of the engine 1, which signal is detected by an engine rotational speed sensor 20, a signal A/N of air-intake amount per intake stroke of the engine 1, which air-intake amount is calculated on the basis of air flow rate per unit time which is detected by an air-intake amount sensor 22, and engine rotational speed Ne, torque converting speed ratio (slip rate) e, which is calculated on the basis of rotational speed of a turbine of the torque converter 2 which is detected by a turbine rotational speed sensor 24 and engine rotational speed Ne, a commanded gearshift position signal SHIF0 being supplied by the electronic control unit 5 to the hydraulic oil pressure controller 4, a gearshift position signal SHIF1 calculated from a map, which is identified from the shift pattern of MODE 0, a steering angle signal $\theta w$ which is detected by a steering angle sensor 26 and which indicates turning amount of a steering wheel operated by a driver, and a power steering pressure signal PST, which is detected by a powered steering pressure sensor 28 and which is determined as a pressure difference between the right and left pressure chambers (not shown) of a front-wheel steering actuator.

The information received from the abovementioned diverse sensors may be supplied by the sensors especially provided for speed change control. Many pieces of such information are also necessary for such control operations as fuel supply control for supplying a required amount of fuel to the engine 1, anti-lock braking control (ABS control) at the time of braking, and traction control for controlling the output of the engine 1, and therefore, as an alternative, necessary information may be taken from those control units.

The electronic control unit 5 comprises mainly of input/output units 5A and 5B, a memory 5C, a central processing unit (CPU) 5D, and a counter 5E. The input unit 5A receives detection signals from the foregoing diverse sensors and performs, as required, filtering, amplification, A/D conversion and the like on the detection signals, while the output unit 5B output the aforementioned control signal to the hydraulic oil pressure controller 4 according to a calculation result executed by the central processing unit 5D. The memory 5C comprises usual RAM and ROM and also a non-volatile RAM, which is backed up by a battery to maintain stored information even after a key switch (not shown) is turned OFF. The central processing unit 5D judges vehicle driving conditions, driver's driving intention, road conditions and the like to select one of the control modes, and determines a gearshift position to be set in accordance with the selected control mode. This will be explained in detail later.

Speed Change Control Program

Figure 3:
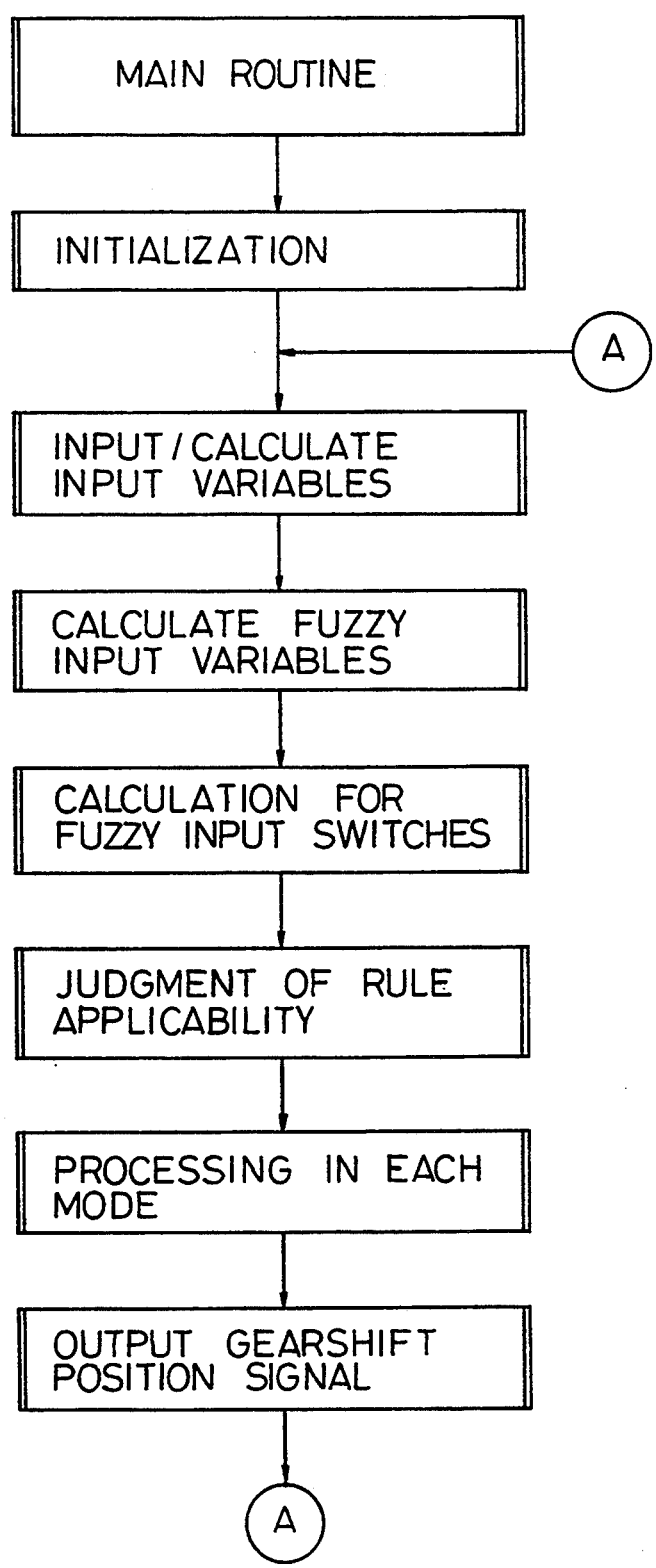
FIG. 3 is a flowchart of a main routine which shows a procedure of fuzzy speed change control implemented by an electronic control unit (ECU) shown in FIG. 2.

The procedure for calculating a fuzzy speed change gearshift position by the aforementioned speed change control unit and for performing the fuzzy speed change control in accordance with the calculation result will now be described with reference to the flowcharts shown in FIG. 3 and after. When the normal mode 0 is selected by the fuzzy speed change control, the speed change control based on the normal mode 0 is carried out by a speed change control program for the normal mode which is separately prepared.

Main Routine

First, the main routine (general flow) of the fuzzy speed change control program shown in FIG. 3 will be described. This program includes an initializing routine wherein control variable values and various stored values are reset to initial values, a routine for entering input variables received from the diverse sensors or the like and for performing arithmetic calculation, a routine for calculating fuzzy input variables from entered or calculated input variables, a routine for setting the values on diverse fuzzy input switches according to the input variables, a routine for judging whether the fuzzy rule applies, routines each of which is prepared according to the control mode currently being implemented and used for setting a fuzzy gearshift position in accordance with the applied fuzzy rule, and a routine for outputting a gearshift position signal in accordance with the set fuzzy gearshift position or the like.

The initializing routine is executed only once at the beginning of the main program, for example, immediately after the ignition key switch (not shown) is turned ON. Upon completion of the execution of the initializing routine, the subsequent routines are repeatedly executed at a predetermined interval (e.g., 50 msec).

Routine for Entering and Calculating Input Variables

In this routine, input variables required for speed change control are received from the foregoing diverse sensors or the fuel control unit or the like. Some of the input variables only require filtering or A/D conversion of detection signals received directly from sensors, but some other input variables must be calculated from other input variables. Further, upper and lower limit values are established for input variables as necessary to exclude variables that exceed the upper and lower limit values. The input variables required for the speed change control are shown in Table 1.

TABLE 1

| Input Variable | Unit | Label |
|---|---|---|
| Vehicle speed | km/hr | V0 |
| Longitudinal acceleration | g | Gx |
| Engine rotational speed | rpm | Ne |
| A/N | % | A/N |
| Steering angle | deg | $\theta w$ |
| Accelerator position | % | APS |
| Torque converter speed ratio | % | e |
| Gearshift position | | SPOS |
| OD switch | | OD |
| Commanded gearshift position | | SHIF0 |
| Mode 0 calculated gearshift position | | SHIF1 |
| Lateral acceleration | g | Gy |
| Engine torque | kg · m | ETRQ |
| Brake switch | | BRK |
| Powered steering pressure | kg/cm$^2$ | PST |

Some of input variables shown in Table 1 will now be described. Vehicle speed V0 is calculated from the wheel speed detected by the wheel speed sensor 18. For the speed change control, it is scarcely required to consider slip amount of each wheel; therefore, vehicle speed V0 may be calculated from an average wheel speed value of all wheels or from one of the individual wheel speeds. Another alternative is to calculate from the rotational speed of an output shaft of the transmission rather than from the wheel speed. Longitudinal acceleration Gx is determined by calculation based on the time-dependent change of the vehicle speed V0. The detection accuracy of longitudinal acceleration Gx exerts significant influences on the arithmetic operation of weight/gradient resistance to be discussed later, and therefore, careful filtering must be performed to eliminate noise.

Steering angle $\theta w$ is set to an upper limit value when its absolute value exceeds a predetermined upper limit value (e.g., 360°), or to 0° when the absolute value is the lower limit value (e.g., 10°) or less. The lateral acceleration Gy is restricted to a value 0 when the vehicle speed V0 is a predetermined value (e.g., 10 km/hr) or less, or, when it exceeds a predetermined upper limit value, it is restricted to the upper limit value. The lateral acceleration Gy is calculated based on the following expression (A1):

$$Gy = (\theta w / \rho) / \{Lw \cdot (A + 1/V0^2)\} \times C1 \ldots \quad (A1)$$

where "$\rho$" is a steering wheel equivalent gear ratio, Lw is a wheel base (m), A is a stability factor, and C1 is a constant.

The lateral acceleration Gy is computed by the above expression (A1) on the basis of vehicle speed V0 and steering angle $\theta w$ in this embodiment, but it may also be directly detected through an acceleration sensor which is installed on a car body.

Engine torque ETRQ is read out from a predetermined torque map on the basis of engine rotational speed Ne and air-intake amount A/N by using, for example, a known interpolation. At this time, the maximum torque MXETRQ generated when air-intake amount A/N be changed with engine rotational speed Ne unchanged is also determined from the torque map and recorded.

Arithmetic Operation of Fuzzy Input Variables

As the next step, the eleven fuzzy input variables FV (0) through FV (10), which are shown in Table 2 and are required for the fuzzy inference, are calculated. These fuzzy input variables FV (0) through FV (10) are classified into three types of information as shown in Table 2; information on driver's driving intention, information on vehicle operating conditions, and information on a road. Information on steering angle in the road information is also the information on driver's driving intention, but it is handled as the road information because a curving degree of a road is judged from information on steering angle. Likewise, information on lateral acceleration in the road information is also a piece of information on vehicle operation, but it is handled as the road information because a curving degree of a road is judged also from that information.

TABLE 2

| Fuzzy Input Variable | Category | Unit | Label |
|---|---|---|---|
| Vehicle speed | Information on Vehicle operation | km/hr | FV (0) |
| Longitudinal acceleration | Information on Vehicle operation | g(gravity) | FV (1) |
| Steering wheel operating amount | Information on road | g · deg | FV (2) |
| Brake deceleration width | Information on driving intention | km/hr | FV (3) |
| Accelerator opening | Information on driving intention | % | FV (4) |
| Accelerator operating speed | Information on driving intention | %/s | FV (5) |
| Weight/gradient resistance | Information on road | kgf | FV (6) |
| Engine torque allowance | Information on vehicle operation | kgm | FV (7) |
| 2-sec. vehicle speed difference | Information on vehicle operation | km/hr | FV (8) |
| Steering angle absolute value | Information on road | deg | FV (9) |
| Lateral acceleration absolute value | Information on road | g | FV (10) |

Figure 4:
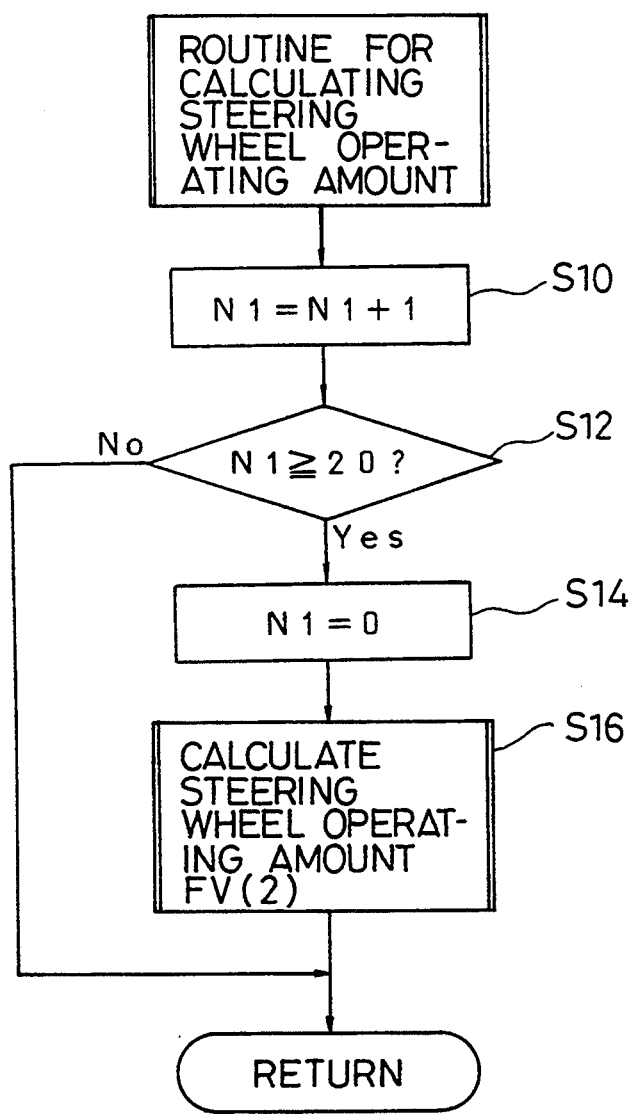
FIG. 4 is a flowchart which shows a calculating procedure for steering wheel operating amount FV (2) used for the fuzzy speed change control.

Of the fuzzy input variables shown in Table 2, steering wheel operating amount FV (2) is an effective value of a product of steering angle $\theta w$ and lateral acceleration Gy. The arithmetic operation of the effective value is conducted at a predetermined interval (e.g., every 1 second), and a mean value of the effective values during a certain past period (e.g., 20 seconds) serves as a parameter that denotes the frequency of the operation of a steering wheel. The calculating procedure for steering wheel operating amount will now be described with reference to FIG. 4.

First, program control variable N1 is incremented by a value 1 (the step S10). It is judged whether the value of variable N1 has reached a corresponding predetermined value (20) within a predetermined time (e.g., 1 second) (the step S12), and the step S10 and the step S12 are repeatedly executed until the value of variable N1 reaches the predetermined value. When the value of variable N1 has reached the predetermined value, the value of variable N1 is reset to zero (the step S14), then the step S16 is carried out. Thus, the step S16 is implemented at the predetermined interval (every second).

In the step S16, the steering wheel operating amount FV (2) is calculated by the following expressions (A2) and (A3).

$$FV(2) = \sqrt{\frac{1}{T} \int (\theta w)^2 \cdot (Gy)^2 dt} \quad (A2)$$

$$= \sqrt{\frac{1}{20} \sum_{i=1}^{20} (\theta wi)^2 \cdot (Gyi)^2} \quad (A3)$$

In the arithmetic operation of the above expressions (A2) and (A3), a product of all squared values of steering angle $\theta w$ and lateral acceleration Gy detected at the predetermined interval (every second) is stored successively in a ring buffer which is capable of holding 20 data, and the data are erased successively to determine a mean value of the stored data; then a square root of the mean value is calculated. This makes it possible to easily determine an effective value of a product of the steering angle and the lateral acceleration Gy.

The steering wheel operating amount FV (2) is determined on the basis of both factors, steering angle and lateral acceleration. For this reason, the operating amount increases as the vehicle speed increases when turning the same corner, and it increases as the radius R of a corner decreases at the same vehicle speed. Further, with the steering angle unchanged, the lateral acceleration increases as the vehicle speed increases, causing the steering wheel operating amount FV (2) to increase. Thus, steering wheel operating amount FV (2) can be regarded as an index that involves the frequency of steering wheel operation and the degree of driver's tension.

Regarding the steering wheel operating amount FV (2) obtained once every second from 20 samples, the comparison of the values obtained from driving on a standard urban street, driving on a winding road at a medium speed, and driving on a winding road has revealed that the mean value is 3.0 (g.deg) when driving on the standard urban street, 10 to 30 (g.deg) when driving on the winding road at the medium speed, and 40 (g.deg) or more when driving on the winding road. Thus, the steering wheel operating amount FV (2) shows noticeable differences depending on the type of road; this therefore, makes it possible to determine the type of road on which the vehicle is traveling.

For instance, in an urban district, even when the vehicle rides over a bump, causing a different fuzzy input variable to provoke a rule for judging an ascending slope or descending slope, the system accurately judges that the vehicle is traveling on the urban street as long as the steering wheel operating amount FV (2) is the foregoing value 3.0 (g.deg) or less.

Figure 5:
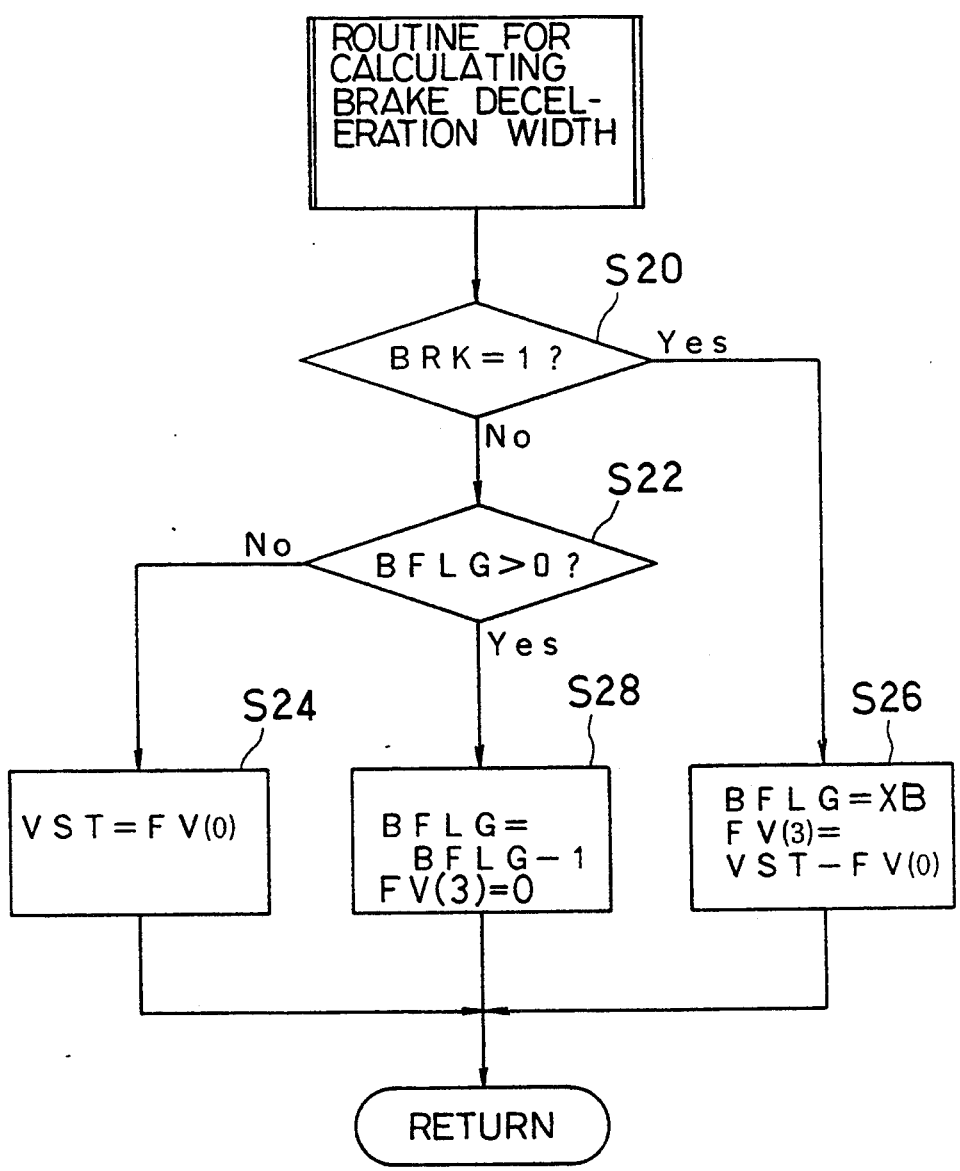
FIG. 5 is a flowchart which shows a calculating procedure for brake decelerating width FV (3) used for the fuzzy speed change control.

Braking deceleration width FV (3), the 4th fuzzy input variable in Table 2, indicates how much one braking operation decreases vehicle speed V0 in terms of km/hr. Immediately after the brake switch is turned OFF, accurate computation of braking deceleration width FV (3) may not be possible mainly because it takes time to release the frictional engagement between brake shoes and a caliper of a braking unit. Accordingly, the computation of braking deceleration width FV (3) is prohibited for a predetermined period of time (e.g., 0.3 second) immediately after completion of braking. The flowchart of FIG. 5 shows a procedure for computing the braking deceleration width and also for prohibiting the computation after the brake switch is turned OFF.

First, the electronic control unit 5 determines whether the value of brake switch BRK is 1 (the step S20). The BRK value is 1 if a driver steps on the brake pedal to perform braking operation, while the BRK value is 0 when the driver releases the brake pedal. If the driver does not perform any braking operation, then the judgment result in the step S20 is negative (NO). In this case, the program performs judgment in the step S22 to be described later, and proceeds to the step S24, to store the vehicle speed V0 detected this time as a variable value VST. The variable value VST is updated every time the routine is implemented unless braking operation is carried out, and the vehicle speed immediately before braking is stored in terms of the variable VST.

When the driver steps on the brake pedal, the judgment result in the step S20 is affirmative (YES), then the program proceeds to the step S26 where a predetermined value XB (e.g., a value corresponding to 0.3 second) is set in timer flag BFLG, and braking deceleration width FV (3) is calculated by an expression (A4) shown below. Timer flag BFLG serves as a timer for clocking the predetermined period of time after the brake switch is turned OFF.

$$FV(3) = VST - FV(0) \quad \ldots (A4)$$

where VST is a vehicle speed stored immediately before the braking operation was started, and FV (0) is a vehicle speed fuzzy input variable value calculated this time. Accordingly, as long as the braking operation is continued, the step S26 is repeatedly implemented, and the braking deceleration width FV (e3) increased by the braking operation is updated. In the arithmetic operation in the step S26, if VST<FV (0), then a value 0 is set for the braking deceleration width FV (3).

When the driver releases the brake pedal, the judgment result of the step S20 becomes negative again, and it is determined whether the timer flag BFLG is greater than 0 in the step S22. Since the BFLG value is set to the predetermined value XB immediately after the driver releases the brake pedal, the judgment result of the step S22 is affirmative. Then, the program proceeds to the step S28, to decrement the flag value BFLG by a value 1, and reset the braking deceleration width FV (3) to a value 0. The step S28 is repeated until the flag value BFLG is reduced to a value 0 by the 1-value decremental operation, i.e., until the predetermined period of time (0.3 second) elapses. During that time, the computation of the braking deceleration width FV (3) is prohibited by setting same to 0.

When the predetermined period of time (0.3 second) elapses, the judgment result of the step S22 becomes negative, the aforementioned step S24 is executed, and the variable value VST is repeatedly updated.

Figure 6:
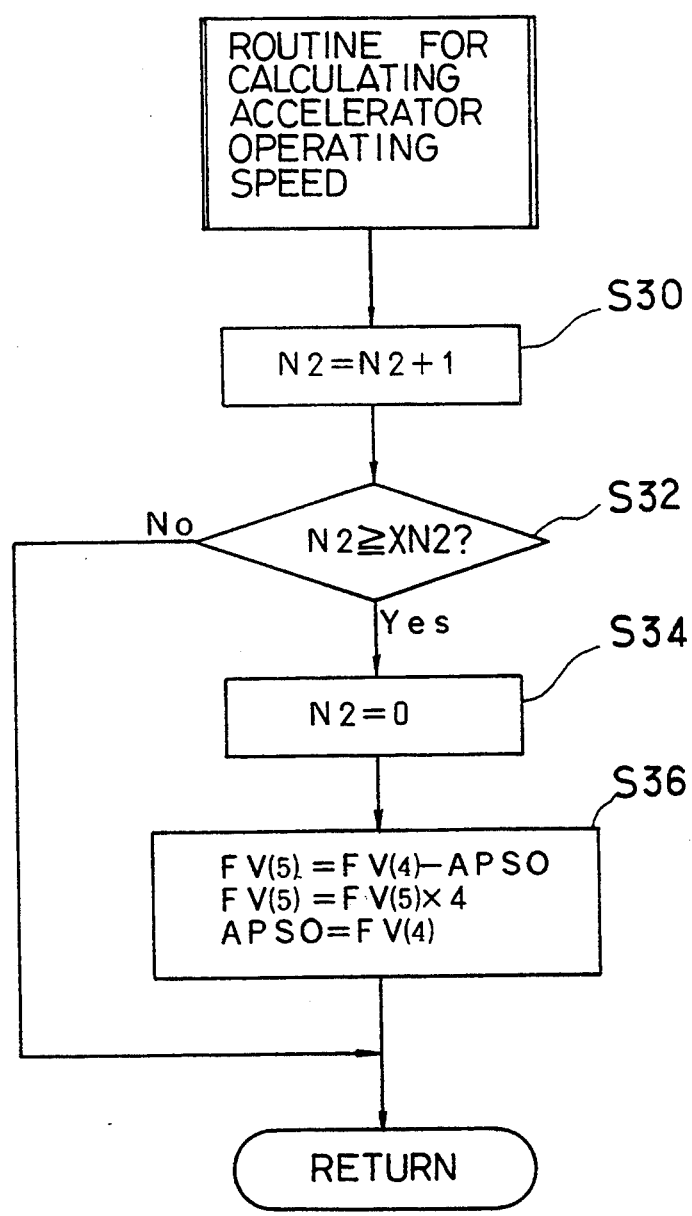
FIG. 6 is a flowchart which shows a calculating procedure for accelerator operating speed FV (5) used for the fuzzy speed change control.

Accelerator operating speed FV (5) is determined by converting a difference of an accelerator opening FV (4) detected at a predetermined interval (e.g., every 0.25 second) into a difference in 1 second. In the embodiment, accelerator operating speed FV (5) is determined by multiplying the difference obtained every 0.25 second by 4. The flowchart in FIG. 6 shows a procedure for determining accelerator operating speed FV (5).

The electronic control unit 5 first increments program variable N2 by a value 1 in the step S30. The program variable N2 is used as an up-counter. After each increment, the variable value N2 is compared with a predetermined value XN2 (a value corresponding to 0.25 second) at the step S32, and the step S34 and the step S36 are carried out each time the variable value N2 reaches the predetermined value XN2.

In the step S34, the program variable value N2 is reset to 0, and in the step S36, accelerator operating speed FV (5) is calculated by the aforementioned method. More specifically, first, a change in the accelerator opening generated in 0.25 second is calculated by the following expression (A5):

$$FV(5) = FV(4) - APSO \quad \ldots (A5)$$

Here, the value of FV (4) is directly set at a value of accelerator opening APS detected this time. Variable APSO is the accelerator opening detected 0.25 second ago as discussed later. Next, the change in the accelerator opening that took place in 0.25 second is multiplied by 4 to convert it into a change in 1 second. The result is taken as the accelerator operating speed FV (5) to implement setting again.

$$FV(5) = FV(5) \times 4 \quad \ldots (A6)$$

Then, the accelerator opening FV (4) which is the fuzzy input variable set this time is stored as an updated variable value APSO.

APS0 = FV (4)

The stored value APSO is used for calculating a change in the accelerator opening in 0.25 second.

Figure 7:
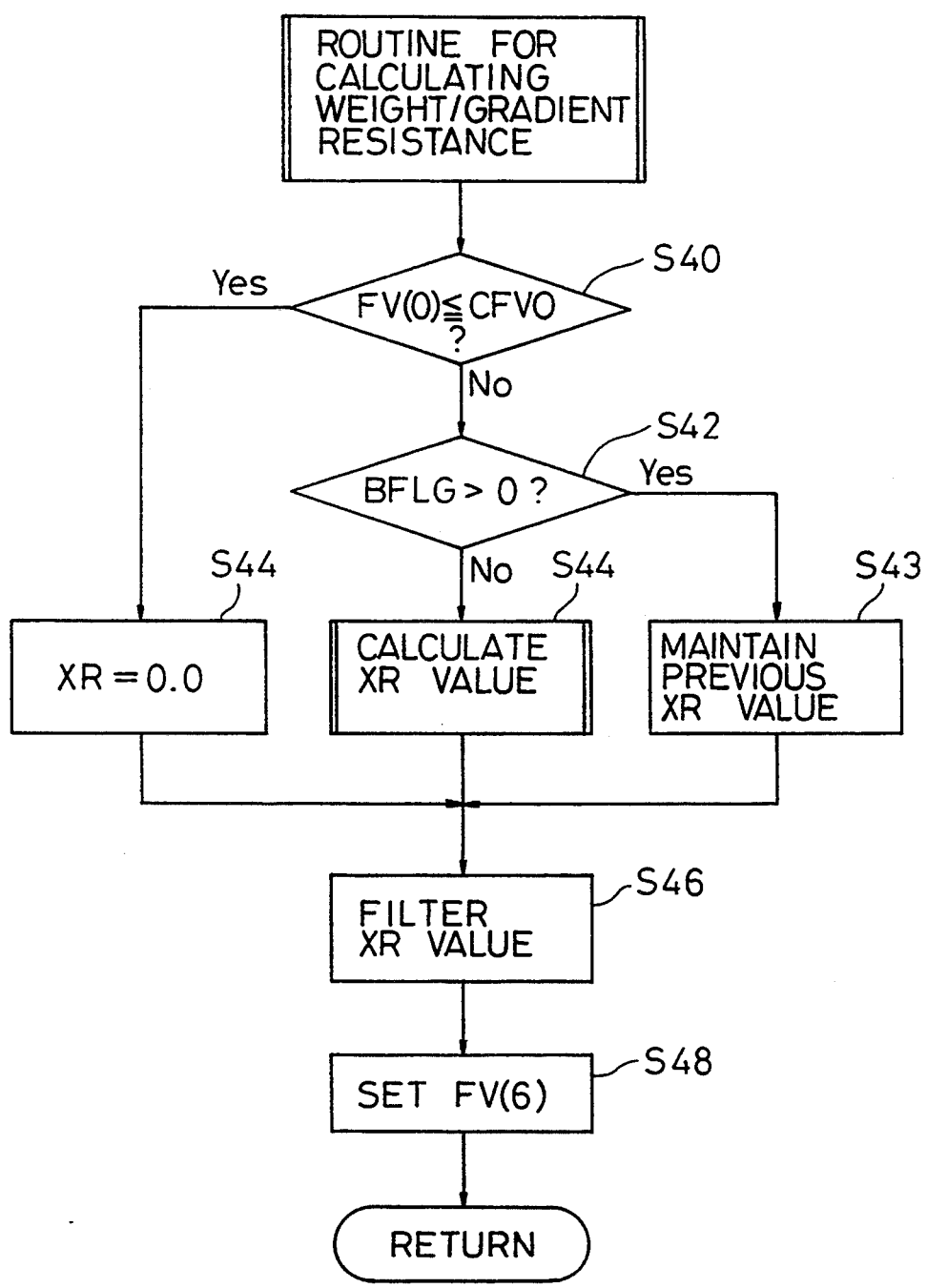
FIG. 7 is a flowchart which shows a calculating procedure for weight/gradient resistance FV (6) used for the fuzzy speed change control.

A calculating method for weight/gradient resistance FV (6) which is a fuzzy input variable shown in Table 2 will now be described with reference to FIG. 7. First, the electronic control unit 5 judges whether the vehicle speed FV (0) is a predetermined value CFV0 (e.g., 10 km/hr) or less (the step S40). If the vehicle speed FV (0) is the predetermined value CFVO or less, then a value 0.0 is set in a weight/gradient value XR as a calculation result at this time in order to set weight/gradient resistance FV (6) to 0 (the step S41), and the program proceeds to the step S46 to be described later.

In the step S40, if it is judged that the vehicle speed FV (0) is greater than the predetermined value CFVO, then the program proceeds to the step S42 where it is judged whether a braking operation is being executed and whether the predetermined period of time (0.3 second) has elapsed from completion of the braking operation. This judgment is made by judging whether the timer flag BFLG is greater than 0. The timer flag BFLG is also used in this routine, which was used for the foregoing arithmetic operation routine for braking deceleration width FV (3). The timer flag BFLG is always reset to the initial value XB (the value corresponding to 0.3 second) during braking operation, and it is decremented by 1 until it reduces to the value 0 (until the predetermined period of time elapses) from the completion of the braking operation as previously described. If the judgment result of the step S42 is affirmative, i.e., if the predetermined period of time (0.3 second) has not yet elapsed during the braking operation or from the completion of the braking operation, then the computation of weight/gradient resistance FV (6) cannot be carried out. In this case, therefore, the previous value is maintained as the present calculated value XR, and this value is used for setting the value of weight/gradient resistance FV (6) (the step S43). On the other hand, if it is not in the middle of the braking operation and the predetermined period of time has elapsed after the braking operation, then the program goes to the step S44 to calculate the present value XR of weight/gradient resistance FV (6) as explained below.

Weight/gradient resistance is determined by subtracting an aerodynamic resistance, rolling resistance, and acceleration resistance from an engine driving force, and it is represented by the following expression (A8):

$$XR = \text{(Engine driving force)} - \text{(Aerodynamic resistance)} - \text{(rolling resistance)} - \text{(Acceleration resistance)} \quad \ldots (A8)$$

Although weight/gradient resistance cannot be determined during the braking operation or the like, as mentioned above, but it can be accurately calculated by adding a resistance caused by a cornering force to the rolling resistance while the vehicle is making a turn. The engine driving force in the above expression (A8) is calculated by the following expression (A9):

$$\text{Engine driving force} = T_E(\eta_E) \cdot t(e) \cdot \rho \cdot i_T \cdot i_F / r \quad \ldots (A9)$$

where $T_E$ ($\eta E$) is an engine torque (kg.m) obtained after subtracting an exhaust loss, and t(e) is a torque ratio of the torque converter 2, the t(e) being read out as a function of a torque converter speed ratio e from a torque ratio table which is stored beforehand. "$\eta$" is a transmitting efficiency of the transmission 3, $i_F$ is a gear ratio of a differential gear device, and these three values are given as constants. "$i_T$" is a predetermined gear ratio of the transmission 3, which corresponds to command gearshift position SHIF0 as an input variable. "r" is a dynamic radius (m) of a tire which is given as a predetermined value.

The aerodynamic resistance in the expression (A8) is computed from the following expression (A10):

$$\text{Aerodynamic resistance} = \rho a \cdot S \cdot Cd \cdot V0^2/2 \quad (A10)$$
$$= C2 \cdot V0^2$$

where "92 a" is an air density and given as a constant assuming that the open air temperature stays constant. "S" is a projection area of the front of the vehicle, "Cd" is a drag coefficient, and latter two are also constants. Accordingly, the aerodynamic resistance can be calculated as a function of only vehicle speed VO as shown in the expression (A10) provided that C2 is a constant.

Rolling resistance in the expression (A8) is calculated by the following expression (A11):

$$\text{Rolling resistance} = RO + (CF^2/CP) \quad \ldots (A11)$$

where "RO" is a rolling resistance at the time of free rolling, "CF" is a cornering force, and "CP" is a cornering power. The second term of the right side in the above expression is a contribution term due to a cornering resistance when the skid angle is small. The rolling resistance RO at the time of free rolling is calculated by the following expression (A12):

$$RO = \mu r \cdot W \quad \ldots (A12)$$

where "$\mu r$" is a rolling resistance coefficient, and "W" is the weight of the vehicle.

If a 2-wheel model is applied, assuming that the load sharing ratio of the front and rear wheels is constant (e.g., the ratio of the front to rear of 0.6:0.4), and the cornering powers of the front and rear wheels are CPf and CPr (constant values), respectively, then the cornering resistance in the expression (A11) can be calculated by the following expression (A13):

$$\text{Cornering resistans} = \frac{\left(\frac{0.6W}{2} \cdot Gy\right)^2}{CPf} \times 2 + \frac{\left(\frac{0.4W}{2} \cdot Gy\right)^2}{CPr} \times 2 \quad (A13)$$
$$= C3 \times W^2 \times Gy^2$$

where "C3" is a constant. Thus, the rolling resistance contains the cornering resistance, and therefore, the weight/gradient resistance even when a steering wheel is turned by a great amount can be accurately calculated. In other words, if the cornering resistance is not included, then the gradient at the time of cornering on a descending winding road is calculated to be less than its actual magnitude. As a result, the system may erroneously presume at the time of turning that the vehicle is climbing an ascending slope even when it is actually traveling on a flat road. This problem is solved by including the cornering resistance.

The acceleration resistance in the expression (A8) is calculated by the following expression (A14):

$$\text{Acceleration resistance} = (W + \Delta W) \cdot Gx \quad \ldots (A14)$$

where "W" is the weight of the vehicle mentioned above, and "$\Delta W$" is the equivalent weight of a rotary part thereof. The equivalent weight of the rotary part "$\Delta W$" is calculated by the following expression (A15):

$$\Delta W = W0 \times \{Ec + Fc \ (I_T i_F)^2\} \quad (A15)$$

where "W0" is the weight of the vehicle when empty, "Ec" is the proportion of the equivalent weight of the tire rotary part, "Fc" is the proportion of the equivalent weight of the engine rotary part, and "$i_T$" and "$i_F$" are the gear ratios of the foregoing transmission 3 and differential gear device, respectively.

When the arithmetic operation for the value XR to be calculated this time is completed as described above, the determined value XR is subjected to digital filtering to eliminate noise (the step S46), then the result is stored as a fuzzy input variable FV (6) (the step S48).

Engine torque allowance FV (7), a fuzzy input variable shown in Table 2, is calculated according to the following expression (A16):

$$FV (7) = MXETRQ - ETRQ \quad \ldots (A16)$$

where "MXETRQ" and "ETRQ" are the engine torque and the maximum engine torque which are read out from the torque map in the input variable entering/calculating routine.

Figure 8:
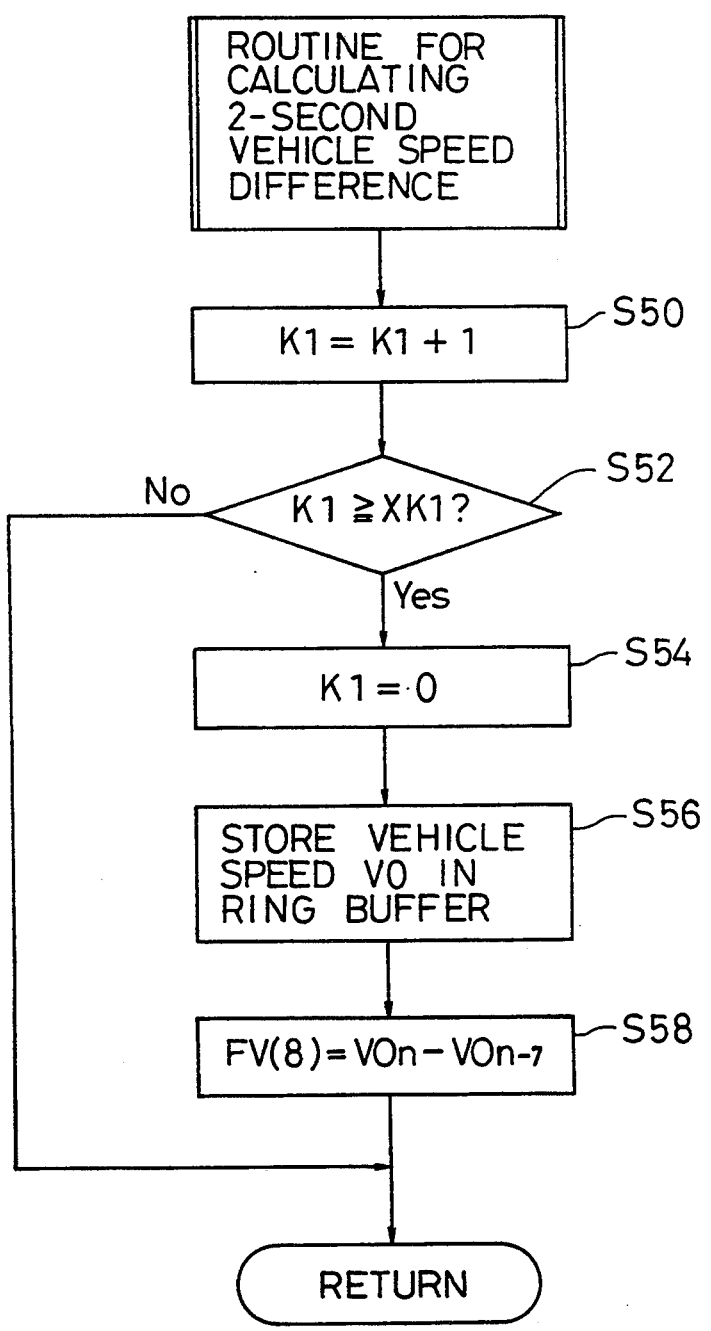
FIG. 8 is a flowchart which shows a calculating procedure for 2-second vehicle speed difference FV (8) used for the fuzzy speed change control.

A method for calculating 2-second difference FV (8) of vehicle speed, a fuzzy input variable shown in Table 2, will now be described with reference to FIG. 8. It is desirable that each time vehicle speed is detected at the control interval (50 msec), the detected vehicle speed data is stored in a ring buffer, and the arithmetic operation of 2-second difference FV (8) of vehicle speed is performed each time the vehicle speed is detected. However, if the capacity of the ring buffer is limited, then the difference may be calculated every 0.25 second, for example. The flowchart shown in FIG. 8 indicates a case where 2-second difference FV (8) of vehicle speed is computed every 0.25 second.

The electronic control unit 5 first increments program control variable K1 by a value 1 in the step S50, and judges whether the value of the variable K1 has reached a predetermined value XK1 (e.g., a value corresponding to 0.25 second) (the step S52). The program control variable K1 is an up-counter for clocking a predetermined period of time (a duration of 0.25 second in this embodiment), and the step S50 and the step S52 are repeatedly implemented until the predetermined value XK1 is reached, waiting until the predetermined period of time (0.25 second) elapses.

When the value of variable K1 reaches the predetermined value XK1, the step S54 is executed, resetting the value of variable K1 to 0. The vehicle speed V0, which has been detected this time in the step S56, is stored in the ring buffer (not shown), then the latest vehicle speed data and the vehicle speed data of 2 seconds ago are taken out of the ring buffer to determine the 2-second difference FV (8) of vehicle speed (the step S58).

$$FV(8) = V0_n - V0_{n-7} \qquad \ldots (A17)$$

where "$V0_n$" is the vehicle speed detected this time, and "$V0_{n-7}$" is the vehicle speed detected 2 seconds ago. Accordingly, the 2-second difference FV (8) of vehicle speed is maintained at the same value for the predetermined period of time (0.25 second).

Arithmetic Operation for Fuzzy Input Switches

When a fuzzy rule is checked for applicability, the adaptability levels of fuzzy input switches SW (0) through SW (10) is computed just like the membership functions of the fuzzy input variables. They are handled as switch inputs and are separated from the fuzzy input variables because they are given in digital values. These fuzzy input switches are listed in Table 3.

TABLE 3

| Fuzzy Input Switch | Label |
| --- | --- |
| Control mode | SW (0) |
| High gradient resistance state | SW (1) |
| Non-negative gradient resistance state | SW (2) |
| Non-high gradient resistance state | SW (3) |
| Winding road flag | SW (4) |
| Large accelerator opening state | SW (5) |
| Medum accelerator opening state | SW (6) |
| High acceleration flag during 3rd-gearshift engine braking | SW (7) |
| High acceleration flag during 2nd-gearshift engine braking | SW (8) |
| Low μ road judgment flag | SW (9) |
| Long-term low μ road judgment flag | SW (10) |

The value of fuzzy input switch SW (0) indicates a selected control mode, and its value is set in each mode processing step to be discussed later.

Regarding fuzzy input switch SW (1), the system judges that the vehicle is climbing an ascending slope and sets a value 1 in the fuzzy input switch SW (1) to memorize a state that the gradient resistance is high, if a condition that the weight/gradient resistance stays at a predetermined value CFV61 or more during the first predetermined period of time (an appropriate value between 4 and 10 seconds, e.g., 5 seconds) continues for the second predetermined period of time (an appropriate value between 2 and 5 seconds, e.g., 2.5 seconds). The aforementioned first and second predetermined periods of time are experimentally set at appropriate values for each car.

Figure 9:
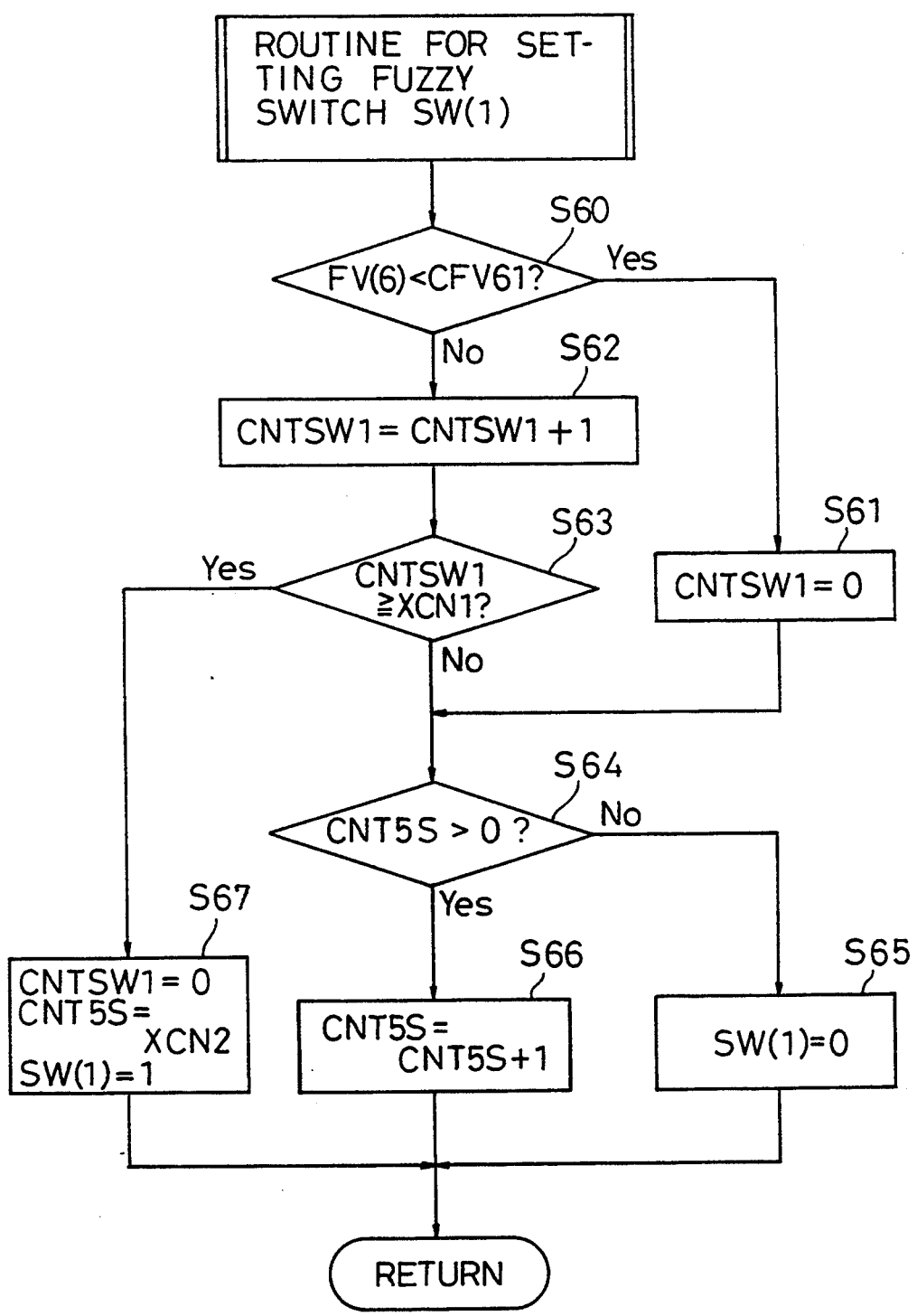
FIG. 9 is a flowchart which shows a setting procedure for fuzzy input switch SW (1) for memorizing a state where the gradient resistance of a slope is high, which switch is used for the fuzzy speed change control.

A procedure for setting the fuzzy input switch value SW (1) will now be described with reference to FIG. 9.

The electronic control unit 5 first judges in the step S60 whether the weight/gradient resistance value FV (6) is smaller than a predetermined value CFV61 which corresponds to a predetermined gradient level of the road. If the judgment result of the step S60 is affirmative, which means that the gradient of the road is smaller, then the program resets a 2.5-second counter CNTSW1 to 0 (the step S61) and proceeds to the step S64. In the step S64, the program checks that 5-second counter CNT5S to be discussed later indicates zero or less, then proceeds to the step S65 to set fuzzy input switch SW (1) to 0 and terminate the routine.

If the weight/gradient resistance FV (6) is the predetermined value CFV61 or more so that the vehicle is climbing an ascending slope with a steep gradient, the program increments the 2.5-second counter CNTSW1 by one in the step S62, then judges whether the counter value CNTSW1 has reached predetermined value XCN1 (a value corresponding to 2.5 seconds) or more (the step S63). If the counter value CNTSW1 is smaller than the predetermined value XCN1, that is, if the predetermined period of time (2.5 seconds) has not yet elapsed, then the program judges whether 5-second counter CNT5S is greater than 0 in the step S64. The 5-second counter CNT5S is a down-counter designed to clock the elapse of a predetermined period of time (e.g., 5 seconds). If the judgment result of the step S64 is affirmative, i.e., if the predetermined period of time (5 seconds) has not yet elapsed, then the program decrements the 5-second counter CNT5S by one in the step S66, and terminates the routine. If the weight/gradient resistance value FV (6) continuously stays at the predetermined value CFV61 or more during the predetermined period of time (5 seconds), then the 2.5-second counter CNTSW1 is successively incremented. On the other hand, if the weight/gradient resistance value FV (6) does not continuously stay at the predetermined value CFV61 or more for the predetermined period of time (2.5 seconds) but drops below the predetermined value CFV61 midway, then the 2.5-second counter CNTSW1 is reset (the step S61), while the 5-second counter CNT5S continues to be decremented (the step S66).

If the weight/gradient resistance value FV (6) continuously stays at the predetermined value CFV61 or more for the predetermined period of time (2.5 seconds) during the predetermined period of time (5 seconds), then the judgment result in the step S63 is affirmative, causing the step S67 to be implemented. In this step, the 2.5-second counter CNTSW1 is reset to an initial value 0, the 5-second counter CNT5S is reset to the initial value XCN2 (a value corresponding to 5 seconds), and the fuzzy input switch SW (1) is set to a value 1, terminating the routine. Thus, the state where the vehicle is climbing the ascending slope with the high gradient resistance is memorized by setting the fuzzy input switch SW (1) to the value 1. In this way, determination as to whether the high gradient resistance state has continued for the second predetermined period of time (2.5 seconds) during the first predetermined period of time (5 seconds) makes it possible not only to detect that the vehicle is traveling on an ascending slope but also to accurately determine a state that the vehicle is climbing the ascending slope even if, for example, the vehicle climbs a steep slope immediately after it turns a hairpin curve following a drive on a flat road.

Figure 10:
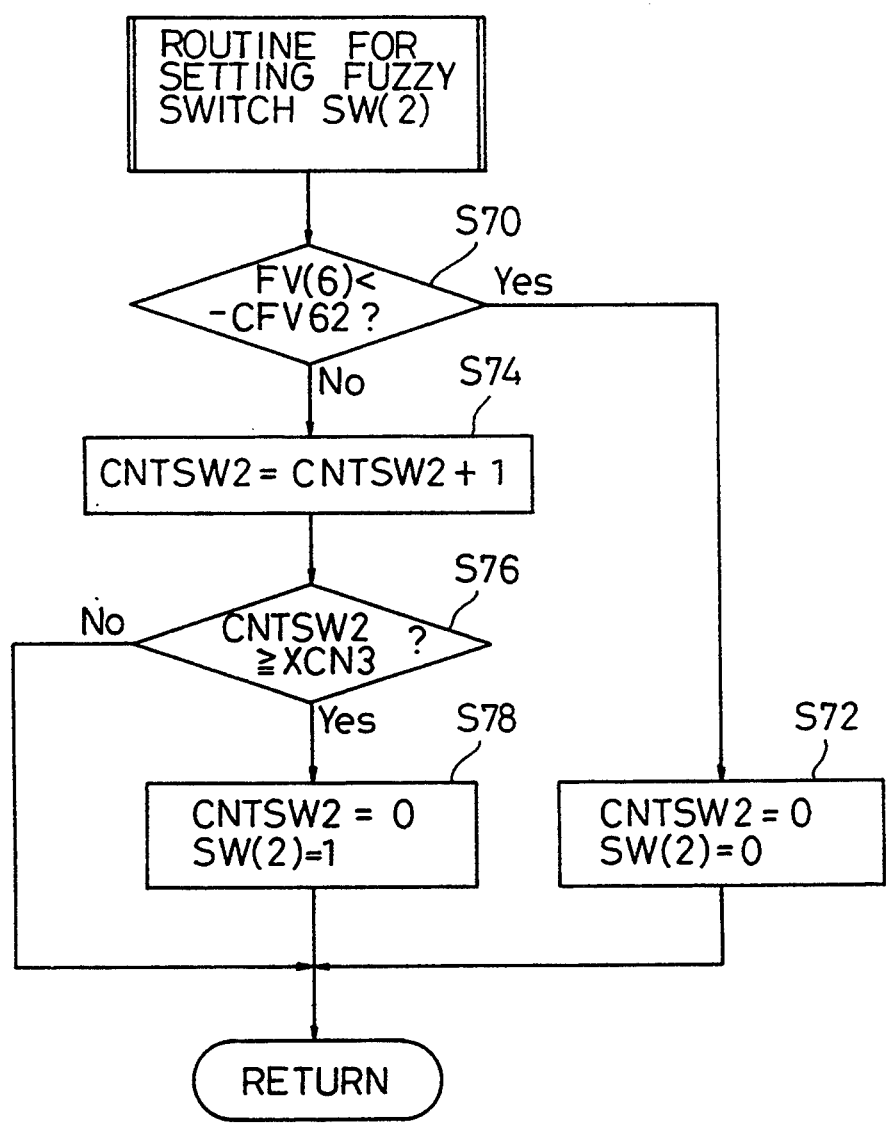
FIG. 10 is a flowchart which shows a setting procedure for fuzzy input switch SW (2) for memorizing a state where the gradient resistance of a slope is not negative, which switch is used for the fuzzy speed change control.

Regarding fuzzy input switch SW (2), the program judges that the vehicle has recovered from the condition of traveling on the descending slope and sets the fuzzy input switch SW (2) to a value 1 to memorize a state that the gradient resistance is non-negative, if the weight/gradient resistance stays at a negative predetermined value (−CFV62) or more for a predetermined period of time (e.g., 2.5 seconds). A procedure for setting the fuzzy input switch value SW (2) will be described with reference to FIG. 10.

The electronic control unit 5 first judges in the step S70 whether the weight/gradient resistance value FV (6) is smaller than the negative predetermined value (−CFV62) which corresponds to a predetermined gradient level of the road. If the judgment result of the step S70 is affirmative, which means that the gradient of the road is still negative, then the program proceeds to the step S72 to reset a 2.5-second counter CNTSW2 to the value 0, and also sets the fuzzy input switch SW (2) to the value 0, terminating the routine.

On the other hand, if the program judges that the weight/gradient resistance FV (6) is the negative predetermined value (−CFV62) or more and the gradient is not negative (non-negative), then the program increments 2.5-second counter CNTSW2 by one in the step S74, and judges whether the counter value CNTSW2 has reached a predetermined value XCN3 (a value corresponding to 2.5 seconds) or more (the step S76). If the counter value CNTSW2 is smaller than the predetermined value XCN3, i.e., if it is found that the predetermined period of time (2.5 seconds) has not elapsed, then the program terminates the routine without doing anything.

If the program judges that the weight/gradient resistance FV (6) is the negative predetermined value (−CFV62) or more and the gradient is non-negative in the step S70, and also judges that the counter value CNTSW2 has reached the predetermined value XCN3 in the step S76, then the program executes the step S78 to reset the 2.5-second counter CNTSW2 to the initial value 0 and set fuzzy input switch SW (2) to a value 1, terminating the routine. The state that the vehicle has returned to a road of the non-negative gradient resistance is memorized by setting fuzzy input switch SW (2) to the value 1.

Figure 11:
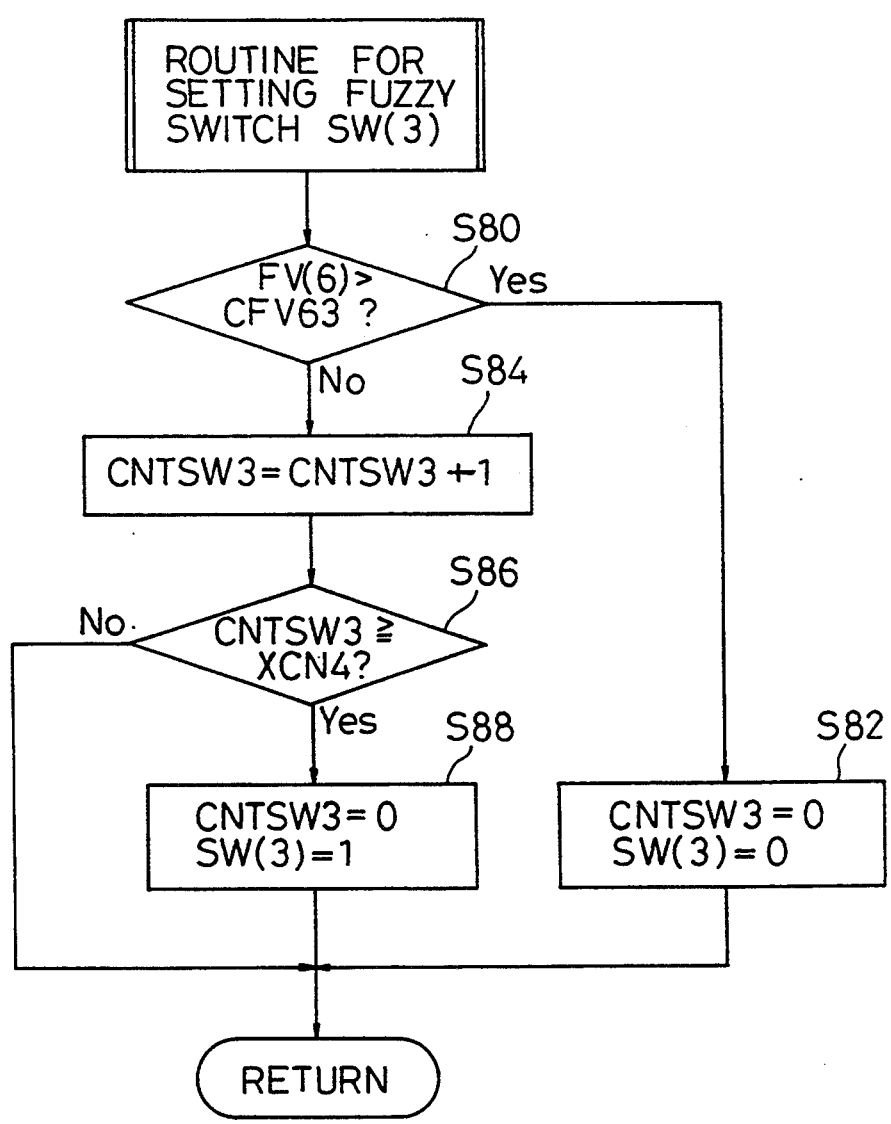
FIG. 11 is a flowchart which shows a setting procedure for fuzzy input switch SW (3) for memorizing a state where the gradient resistance of a slope is not high, which switch is used for the fuzzy speed change control.

Regarding fuzzy input switch SW (3), the program judges that the vehicle has left an ascending slope traveling condition, and it sets the fuzzy input switch SW (3) to a value 1 thereby to memorize a state that the gradient resistance is not high, if the weight/gradient resistance stays at a predetermined value (CFV63) or less for a predetermined period of time (e.g., 5 seconds). A procedure for setting the fuzzy input switch value SW (3) will now be described with reference to FIG. 11.

The electronic control unit 5 first judges in the step S80 whether the weight/gradient resistance value FV (6) is greater than the predetermined value (CFV63) which corresponds to a predetermined gradient level of the road. If the judgment result of the step S80 is affirmative, which means that the gradient of the road is still greater, then the program proceeds to the step S82 to reset 5-second counter CNTSW3 to a value 0, and also sets fuzzy input switch SW (3) to a value 0, terminating the routine.

On the other hand, if the program judges that the weight/gradient resistance FV (6) is the predetermined value (CFV63) or less and judges that the vehicle has left the condition where the gradient level is high, that is, non-high condition, then the program increments the 5-second counter CNTSW3 only by one in the step S84, and judges whether the counter value CNTSW3 has reached a predetermined value XCN4 (a value corresponding to 5 seconds) or more (the step S86). If the counter value CNTSW3 is found to be smaller than the predetermined value XCN4, i.e., if it is found that the predetermined period of time (5 seconds) has not elapsed, then the program terminates the routine without doing anything.

If the program judges in the step S80 that the weight/gradient resistance FV (6) is the predetermined value (CFV63) or less and the gradient is non-steep, and also judges that the counter value CNTSW3 has reached the predetermined value XCN4, then the program executes the step S88 to reset 5-second counter CNTSW3 to the initial value 0 and set fuzzy input switch SW (3) to a value 1, terminating the routine. The state that the vehicle has returned to a road of the non-large gradient resistance (the end of the ascending slope) is memorized by setting the fuzzy input switch SW (3) to the value 1.

Figure 12:
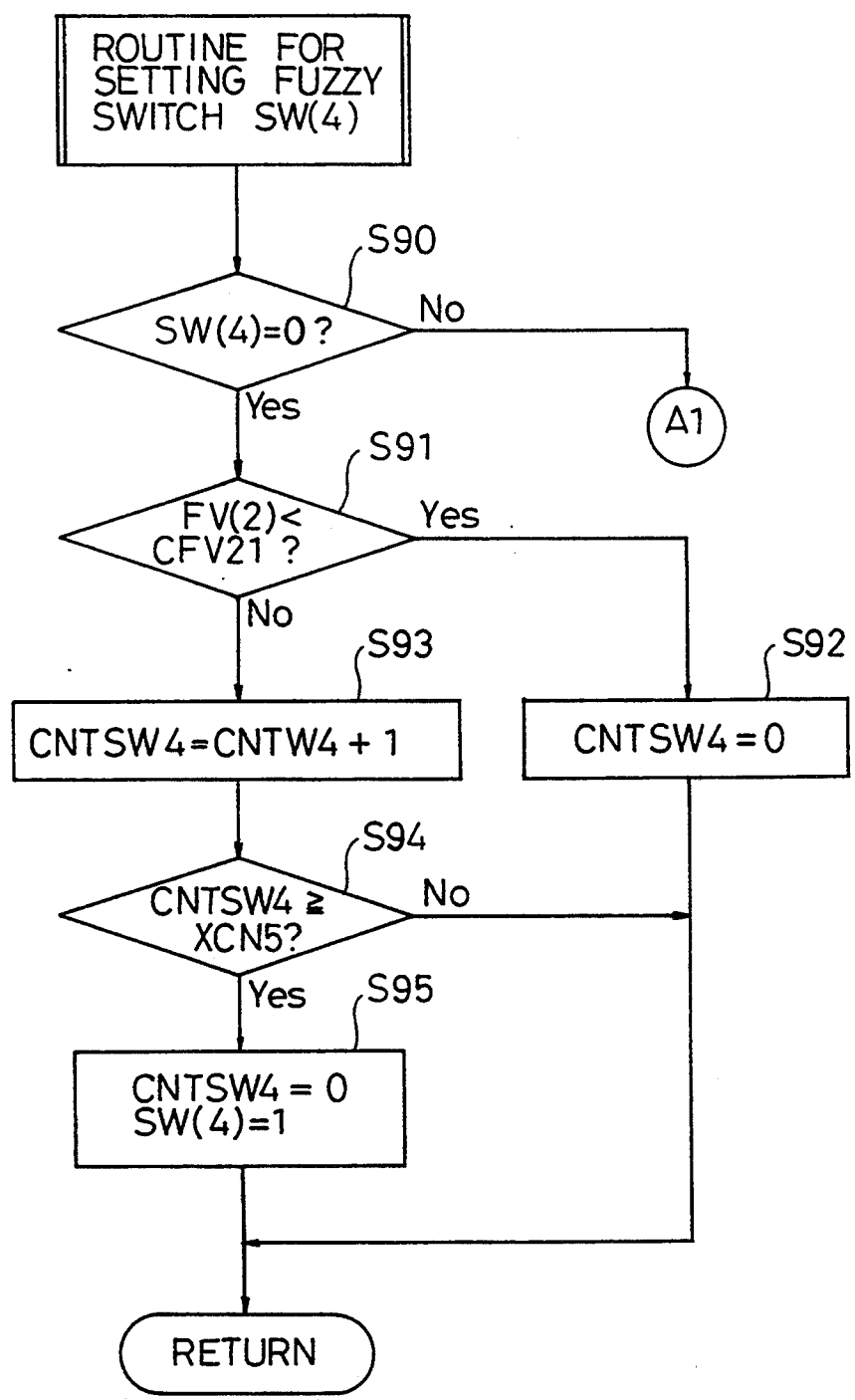
FIG. 12 is a part of a flowchart which shows a setting procedure for fuzzy input switch SW (4) for memorizing a winding state of a road, which switch is used for the fuzzy speed change control.
Figure 13:
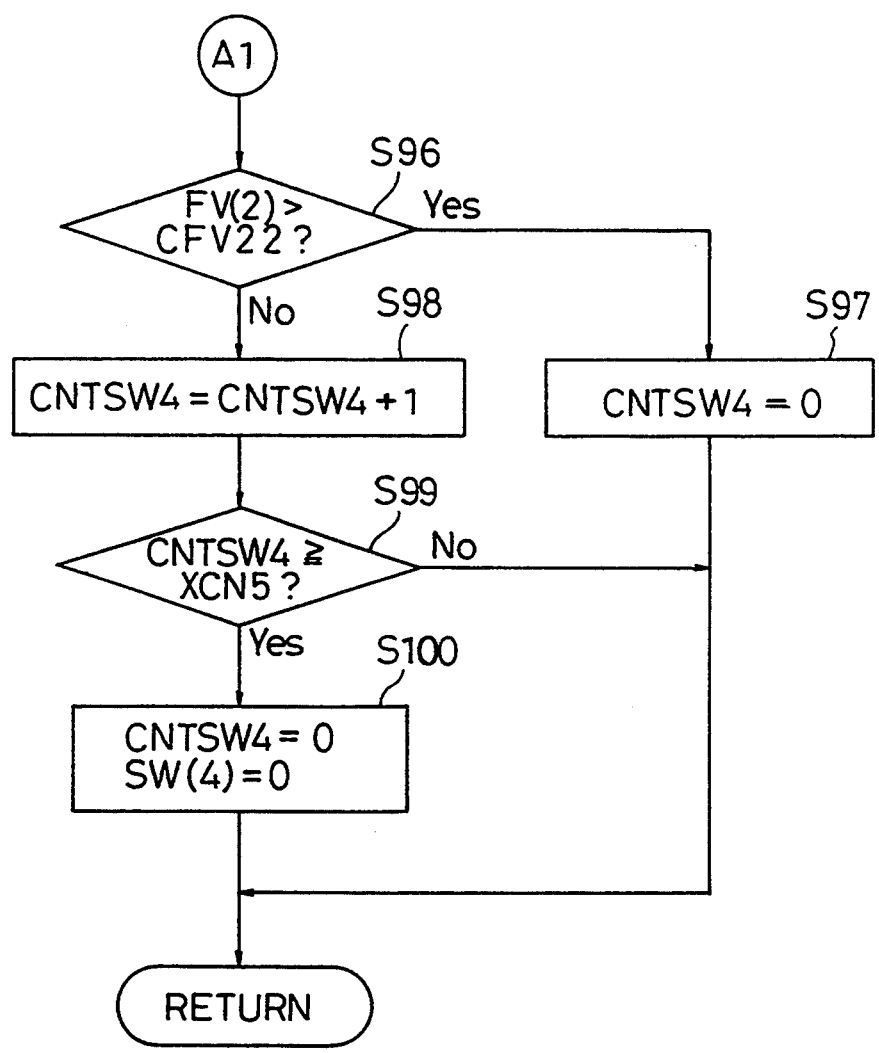
FIG. 13 is the remaining part of the flowchart of FIG. 12.

Regarding fuzzy input switch SW (4), if the steering wheel operating amount FV (2) stays at a predetermined value (CFV21) or more for a predetermined period of time (e.g., 5 seconds), then the program judges that the vehicle is traveling on a winding road and sets the fuzzy input switch SW (4) to a value 1 to memorized the condition. To judge that the vehicle has left the winding road, a predetermined value (CFV22) which is smaller than the foregoing predetermined value (CFV21) is used so that the program recognizes when the steering wheel operating amount FV (2) decreases. More specifically, a hysteresis characteristic is utilized to judge whether the vehicle is traveling on a winding road. A procedure for setting the fuzzy input switch value SW (4) will be described with reference to FIG. 12 and FIG. 13.

The electronic control unit 5 first judges whether the fuzzy input switch SW (4) has been set to a value 0 in the step S90. The program proceeds to the step S91 if the fuzzy input switch SW (4) has been set to the value 0, or to the step S96 of FIG. 13 if it has been set to the value 1.

If the fuzzy input switch SW (4) has been set 0 and the judgment result of the step S90 is affirmative, then the electronic control unit 5 executes the step S91 and judges whether the steering wheel operating amount FV (2) is smaller than the predetermined value (CFV21) which indicates that the steering wheel operating amount is large. If the judgment result of the step S91 is affirmative, i.e., if the steering wheel operating amount is not large, then the program proceeds to the step S92 where it resets 5-second counter CNTSW4 to a value 0 and terminates the routine.

On the other hand, if the program judges that the steering wheel operating amount FV (2) exceeds the predetermined value (CFV21) and that the steering wheel operating amount is large, then the program increments the 5-second counter CNTSW4 only by one in the step S93, then judges whether this counter value CNTSW4 has reached a predetermined value XCN5 (a value corresponding to 5 seconds) (step S94). If the counter value CNTSW4 is smaller than the predetermined value XCN5, i.e., if the predetermined period of time (5 seconds) has not elapsed, then the program terminates the routine without doing anything.

If the program judges in the step S91 that the steering wheel operating amount FV (2) is the predetermined value (CFV21) or more, the steering wheel operating amount is large, and the counter value CNTSW4 has reached the predetermined value XCN5, then the program executes the step S95, resets 5-second counter CNTSW4 to the initial value 0, sets fuzzy input switch SW (4) to a value 1, and terminates the routine. The program memorizes a state where the vehicle is traveling on a winding road by setting fuzzy input switch SW (4) to the value 1.

When fuzzy input switch SW (4) is set to the value 1, the judgment result of the step S90 becomes negative. In this case, the electronic control unit 5 executes the step S96 of FIG. 13. In the step S96, the program judges whether the steering wheel operating amount FV (2) is larger than the predetermined value (CFV22) which is set at a smaller value than the foregoing predetermined value (CFV21). If the judgment result in the step S96 is affirmative, then the program judges that the vehicle is still traveling on the winding road and proceeds to the step S97 where it resets the foregoing 5-second counter CNTSW4 to the value 0 before it terminates the routine.

On the other hand, if the steering wheel operating amount FV (2) lowers below the predetermined value (CFV22) and therefore causes the program to judge that the steering wheel operating amount is small, then the program increments 5-second counter CNTSW4 only by one in the step 98 and judges whether the counter value CNTSW4 has reached the predetermined value XCN5 (the value corresponding to 5 seconds) (the step S99). If the counter value CNTSW4 is smaller than the predetermined value XCN5, i.e., if the predetermined period of time (5 seconds) has not elapsed, then the program terminates the routine without doing anything.

If the program judges in the step S96 that the steering wheel operating amount FV (2) is smaller than the predetermined value (CFV21), it therefore judges that the steering wheel operating amount is small and also judges in the step S99 that the counter value CNTSW4 has reached the predetermined value XCN5, then the program executes the step S100, resets 5-second counter CNTSW4 to the initial value 0, and sets fuzzy input switch SW (4) to the value 0 before it terminates the routine. The program memorize a state that the vehicle has left the winding road by setting fuzzy input switch SW (4) to the value 0.

Figure 14:
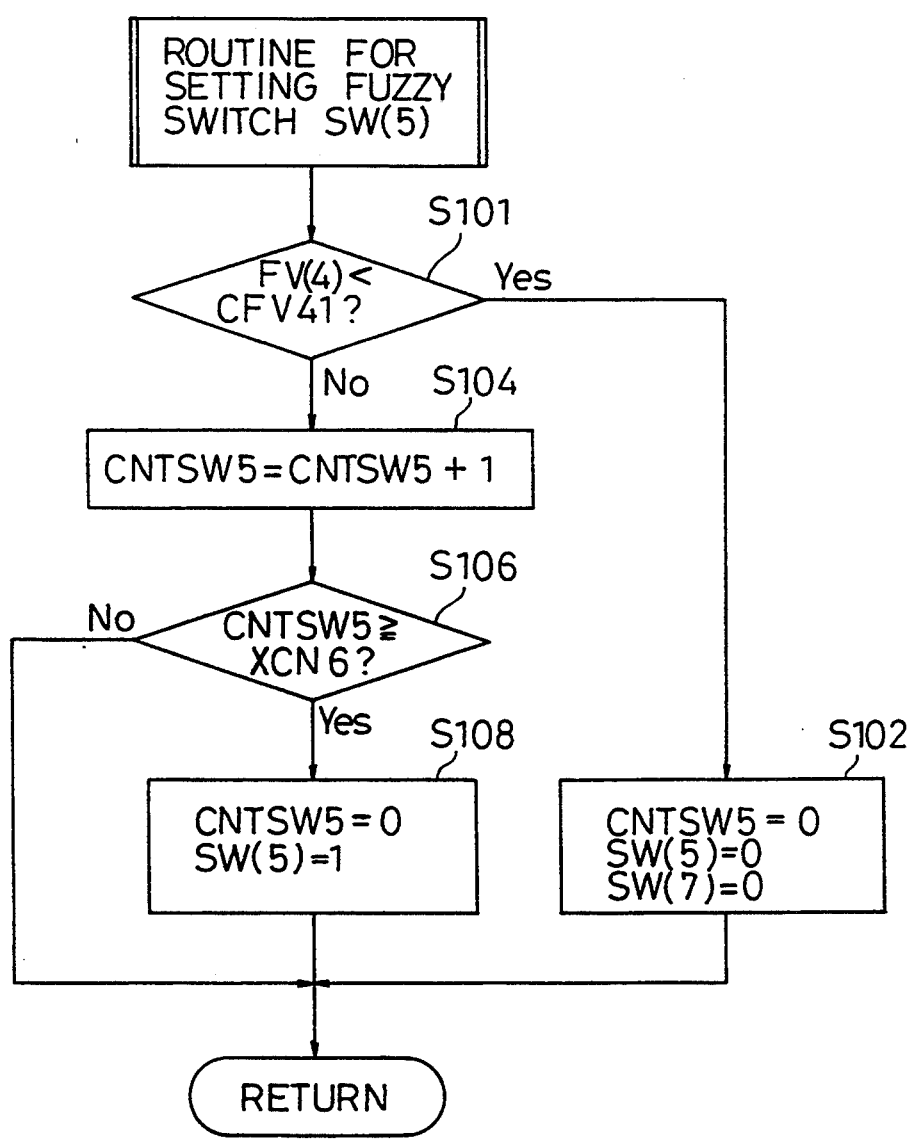
FIG. 14 is a flowchart which shows a setting procedure for fuzzy input switch SW (5) for memorizing a state where the opening of the accelerator is large, which switch is used for the fuzzy speed change control.

Regarding fuzzy input switch SW (5), if the accelerator opening FV (4) stays larger than a predetermined CFV41 (e.g., 25%) for a predetermined period of time (e.g., 0.6 second), then the program judges that the accelerator opening is large and sets the switch SW (5) to a value 1 to memorize the condition where the accelerator opening is large. A procedure for setting fuzzy input switch value SW (5) will be described with reference to FIG. 14.

The electronic control unit 5 first judges in the step S101 whether the accelerator opening FV (4) is smaller than the predetermined value (CFV41). If the judgment result in the step S101 is affirmative, that is, if the accelerator opening is smaller than the predetermined value (CFV41), then the program proceeds to the step S102 where it resets counter CNTSW5 to a value 0 and sets fuzzy input switch SW (5) and fuzzy input switch SW (7) to a value 0, respectively before it terminates the routine. Fuzzy input switch SW (7) is a flag of strong acceleration at the time of third-gear engine braking. As will be detailed later, if the accelerator opening FV (4) exceeds a predetermined opening CFV 43 (e.g., 404), immediately after fuzzy input switch SW (5) is set to a value 1 in this routine, switch SW (7) is set to a value 1 (in the routine shown in FIG. 32), thereby memorizing a driver's intention of engaging strong acceleration on a descending slope.

On the other hand, if the program judges in the step S101 that the accelerator opening FV (4) is larger than the predetermined value (CFV41), then the program increments counter CNTSW5 only by one in the step S104, and judges whether the counter value CNTSW5 has reached a predetermined XCN6 (a value corresponding to 0.6 second) (the step S106). If the counter value CNTSW5 is smaller than the predetermined value XCN6, i.e., if the predetermined period of time (0.6 second) has not elapsed, then the program terminates the routine without doing anything.

In the step S101, if the program judges that the accelerator opening FV (4) exceeds the predetermined value (CFV41) and that the counter value CNTSW5 has reached the predetermined value XCN6, then the program carries out the step S108 where counter CNTSW5 is reset to the initial value 0 and fuzzy input switch SW (5) is set to a value 1, and the program terminates the routine. The program memorize the state that the accelerator opening is large, by setting fuzzy Input switch SW (5) to the value 1.

Figure 15:
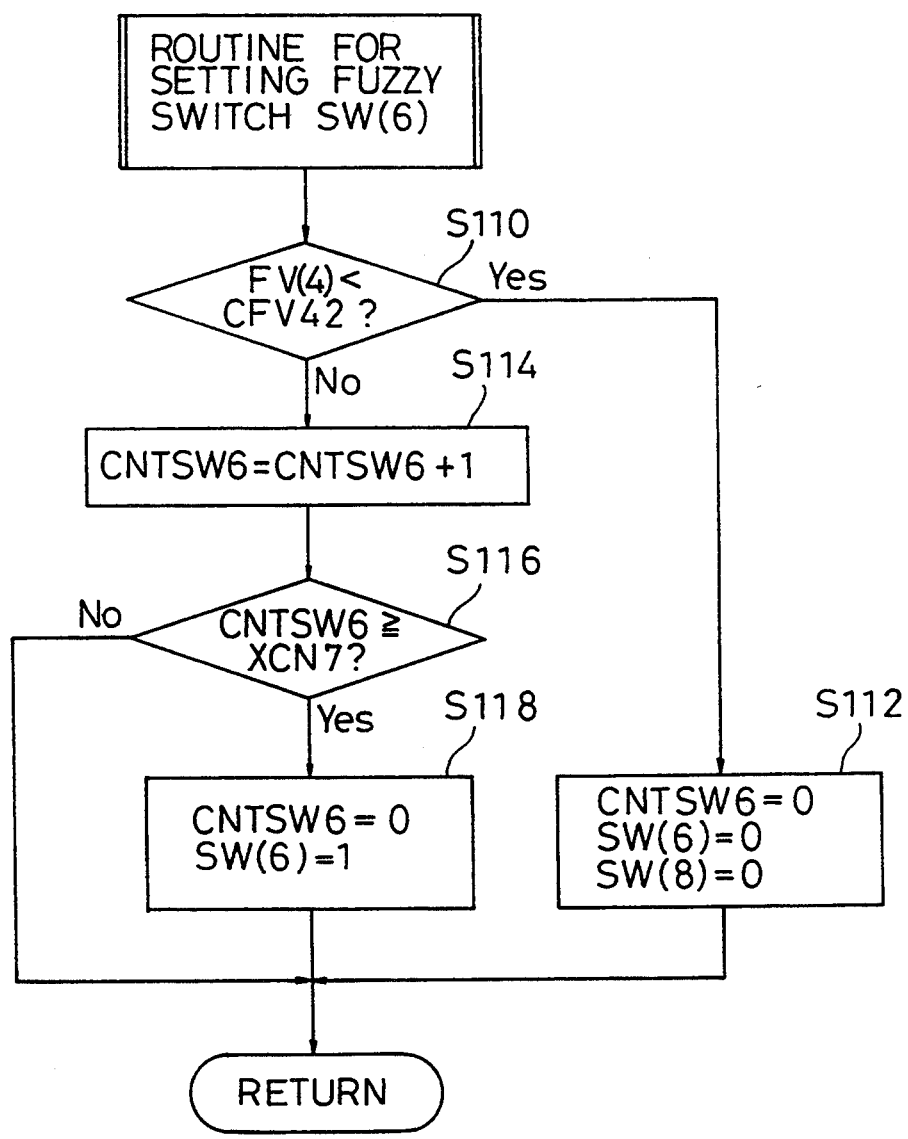
FIG. 15 is a flowchart which shows a setting procedure for fuzzy input switch SW (6) for memorizing a state where the opening of the accelerator is medium, which switch is used for the fuzzy speed change control.

Regarding fuzzy input switch SW (6), the program judges that the accelerator opening is medium and sets switch SW (6) to a value 1 to memorize the state that the accelerator opening is medium, if the accelerator opening FV (4) stays larger than a predetermined value CFV42 (e.g., 15%) which is set at a smaller value than the foregoing predetermined value CFV41 (25%) for a predetermined time (e.g., 0.6 second). A procedure for setting fuzzy input switch value SW (6) will be described with reference to FIG. 15.

The electronic control unit 5 first judges in the step S110 whether the accelerator opening FV (4) is smaller than the predetermined value (CFV42). If the judgment result of the step S110 is affirmative, that is, the accelerator opening is smaller than the predetermined value (CFV42), then the program proceeds to the step S112 where the program resets counter CNTSW6 to a value 0, sets fuzzy input switch SW (6) and fuzzy input switch SW (8) to 0, respectively, and terminates the routine. Fuzzy input switch SW (8) is a flag of strong acceleration at the time of second-gear engine braking. As will be detailed later, if the accelerator opening FV (4) is greater than a predetermined opening CFV45 (e.g., 40%), immediately after fuzzy input switch SW (6) is set to a value 1 in this routine switch SW (8) is set to a value 1 (in the routine shown in FIG. 33), thereby memorizing a driver's intention of engaging strong acceleration on a descending slope.

On the other hand, if the program judges in the step S110 that the accelerator opening FV (4) is larger than the predetermined value (CFV42), then the program increments the counter CNTSW6 only by one in the step S114 and judges whether the counter value CNTSW6 has reached a predetermined value XCN7 (a value corresponding to 0.6 second) (step S116). If the counter value CNTSW6 is smaller than the predetermined value XCN7, that is, if the predetermined period of time (0.6 second) has not elapsed, then the program terminates the routine without doing anything.

In the step S110, if the program judges that the accelerator opening FV (4) is larger than the predetermined value (CFV42) and that the counter value CNTSW6 has reached the predetermined value XCN7 in the step S116, then the program implements the step S118, where it resets counter CNTSW6 to the initial value 0 and sets fuzzy input switch SW (6) to the value 1, and terminates the routine. The program memorizes the state that the accelerator opening is medium, by setting fuzzy input switch SW (6) to the value 1.

Fuzzy input switches SW (9) and SW (10) are both set to values 1, respectively, when the friction factor $\mu$ of a road surface(hereinafter call "road surface $\mu$") is judged to be low. The switch SW (9) stores a short-term prediction result of a road surface condition, while the switch SW (10) stores a long-term prediction result. Procedures for setting fuzzy input switch values SW (9) and SW (10) will now be descried with reference to FIG. 16 and FIG. 17.

The electronic control unit 5 first calculates road surface value $\mu$ in the step S250. Various methods have been proposed for calculating road surface $\mu$. For instance, according to the calculating method of road surface $\mu$ disclosed in Japanese Unexamined Patent Publication No. 60-148769 (counterpart to U.S. Pat. No. 4,964,481), the relationships between steering angle of front wheels and lateral acceleration are experimentally determined beforehand in terms of road surface friction factor as a parameter, and road surface $\mu$ is estimated in accordance with the steering angle value and lateral acceleration value that are actually detected.

Another method for determining road surface $\mu$ has been proposed. According to this other method, road surface $\mu$ is calculated based on power steering pressure signal PST, vehicle speed V0, and the steering angle $\theta$w. How this road surface $\mu$ is calculated will now be described with reference to FIG. 18 and FIG. 19.

Figure 18:
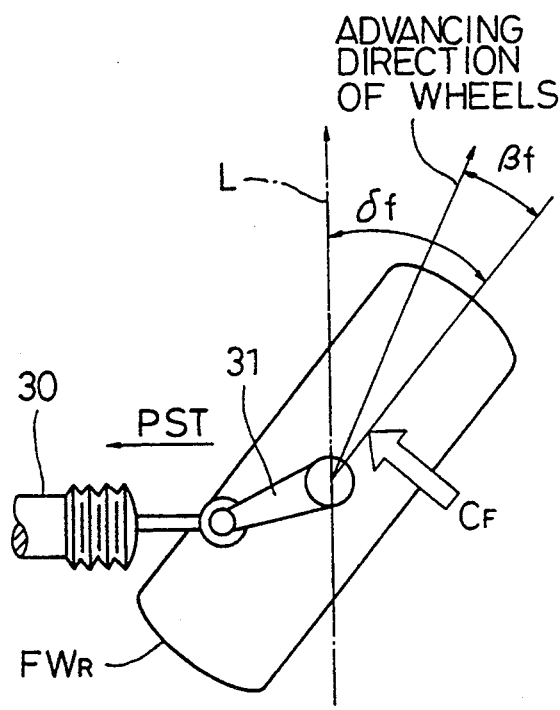
FIG. 18 is a diagram which shows the relationship between skidding angle of front wheels and the cornering force.
Figure 19:
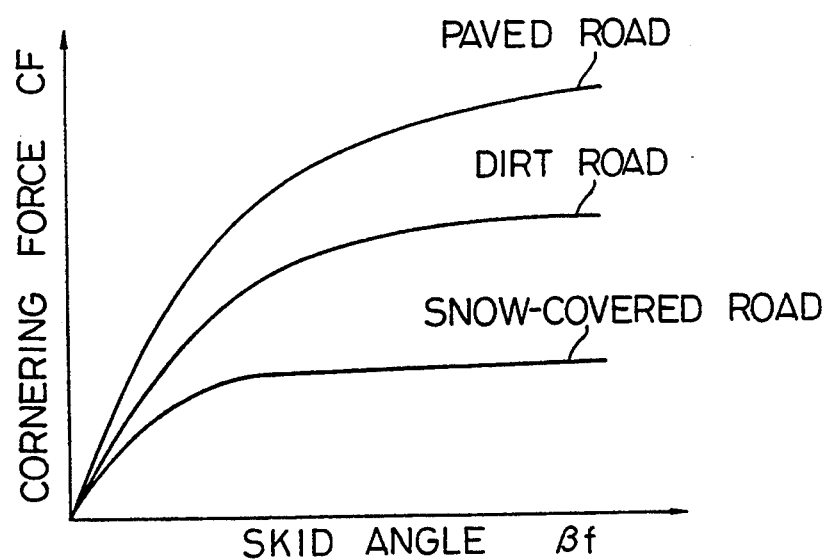
FIG. 19 is a graph which shows different cornering forces in relation to skidding angles, the cornering forces depending on the condition of road surface.

When front wheels FW are steered, if inclination angle or skid angle of the right front wheel $FW_R$ with respect to the traveling direction of the right front wheel $FW_R$ is taken as $\beta$f, then cornering force $C_F$ of the right front wheel $FW_R$ can be represented by the following expression:

$$C_F \propto C \beta f \cdot \mu$$

where cornering force CF is, as is obvious from the above expression, proportional to a product of skid angle $\beta$f and road surface $\mu$. Accordingly, if the road surface $\mu$ differs, that is, if the road surface condition differs, then the cornering force $C_F$ of the wheels significantly differs even when the skid angle $\beta$f stays the same. More specifically, as is obvious from FIG. 19, in the range wherein the skid angle $\beta$f is large, the cornering force $C_F$ of the wheels increases as the road surface $\mu$ increases. In FIG. 18, a reference numeral 30 denotes a front steering actuator, and 31, a tie rod. A reference symbol L denotes a line in parallel with the vehicle body axis, "$\delta$f", a steering angle of the right front wheel $FW_R$, i.e., the front wheels FW.

It can be seen from FIG. 18 that cornering force $C_F$ is nearly proportional to power steering pressure PST when a dynamic equilibrium condition is considered. Accordingly, the foregoing expression can be rewritten to the following expression when cornering force CF is replaced by power steering pressure PST:

$$PST = C_1 \cdot \beta f \cdot \mu \qquad \ldots (M1)$$

where $C_1$ is a constant.

Further, skid angle $\beta$f can be represented by the following expression using vehicle speed V0, steering angle $\theta$w, and road surface $\mu$:

$$\beta f = C_3 \cdot V0^2 \theta w / (\mu + C_2 \cdot V0^2) \qquad \ldots (M2)$$

where $C_2$ and $C_3$ are both constants.

From the expressions (M1) and (M2), the ratio of power steering pressure PST to steering angle $\theta$w, i.e., PST/$\theta$w, can be represented by the following expression:

$$PST/\theta w = \mu \cdot C_1 \cdot C_3 \cdot V0^2 / (\mu + C_2 \cdot V0^2) \qquad \ldots (M3)$$

Thus, the electronic control unit 5 can calculate road surface $\mu$ by substituting the supplied power steering pressure signal value PST, steering angle signal value $\theta$w, and the vehicle speed signal value V0 for the above expression (M3).

Figure 16:
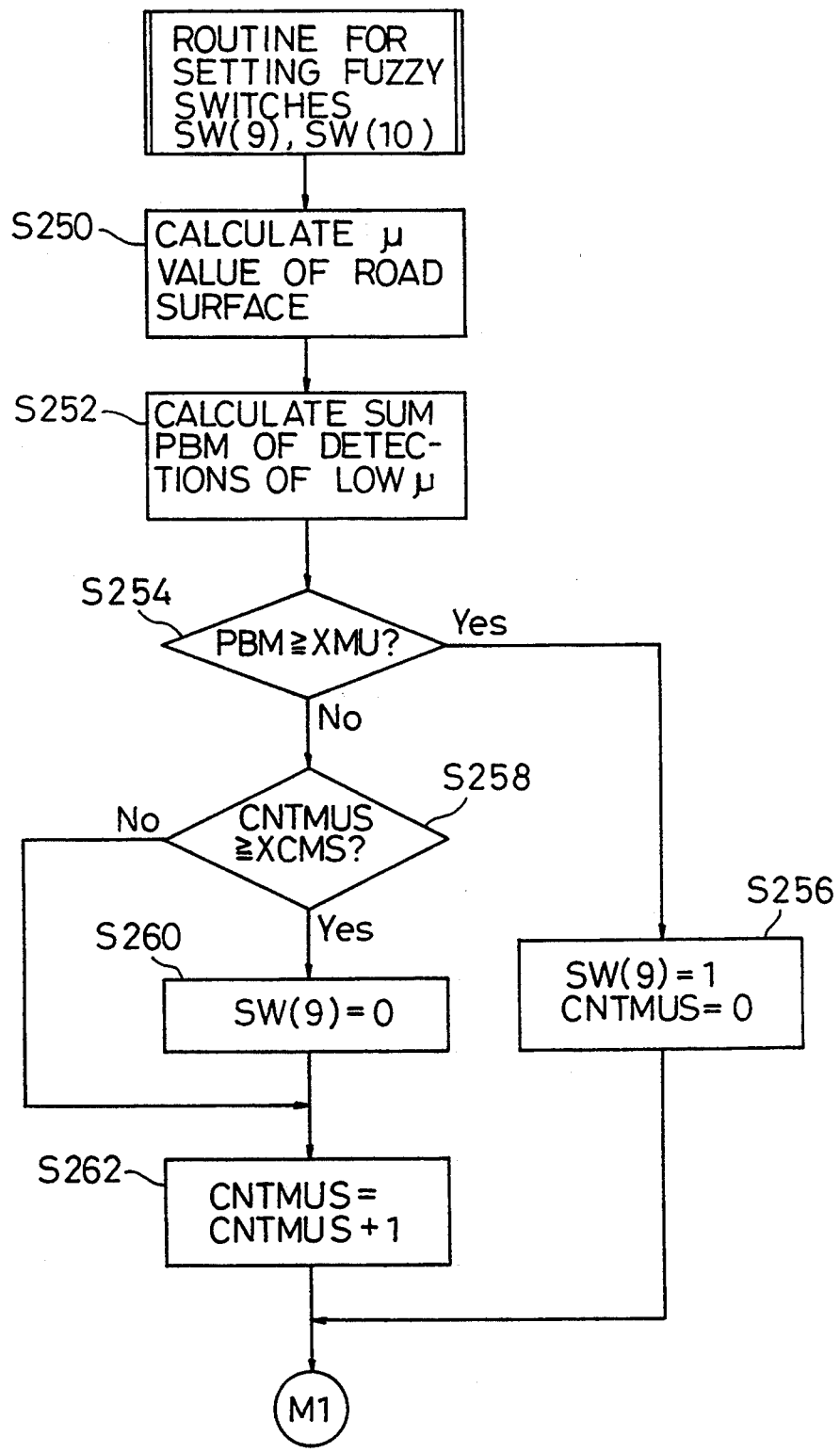
FIG. 16 is a part of a flowchart which shows a setting procedure for fuzzy input switches SW (9) and SW (10)

Then, the program proceeds to the step S252 of FIG. 16 to create a histogram shown in FIG. 20 from, for example, 100 pieces of data on the road surface $\mu$ values detected at each control interval (50 msec) in accordance with the method described above, and calculates a sum PBM of the detections of the road surface $\mu$ value which is smaller than a predetermined value XML (e.g., 0.3). The program then judges whether the sum PBM of the detections is larger than a predetermined XMU (e.g., 50%) (the step S254). If the judgment result is affirmative, the program assumes that the friction factor $\mu$ of the road surface is low, and sets fuzzy input switch SW (9) to the value 1 and resets the value of short-term counter CNTMUS to 0 (the step S256). The short-term counter CNTMUS is designed to maintain the value of fuzzy input switch SW (9) at 1 for a while (e.g., 20 seconds) even after the sum PBM of the detections lowers below the predetermined XMU and the judgment condition in the step S254 no longer stands.

Accordingly, if the sum PBM of the detections is smaller than the predetermined XMU and the judgment result of the step S254 is negative, the program first checks whether the short-term counter value CNTMUS is larger than a predetermined XCMS (a value corresponding to 20 seconds) in the step S258. If the predetermined period of time has not elapsed, then the program skips the step S260, keeps the fuzzy input switch SW (9) at the value 1, and proceeds to the step S262. In the step S262, the value of short-term counter CNTMUS is incremented by 1. If the judgment result of the step S258 is affirmative, then the program advances to the step S260, and resets the fuzzy input switch SW (9) to a value 0. Thus, the program resets fuzzy input switch SW (9) to the value 0 after the predetermined period of time (20 seconds) elapses from a point at which the sum PBM of detections decreases below the predetermined value XMU.

When fuzzy input switch SW (9) is set to the value 1, it means that the vehicle is traveling on a road surface with a small friction factor $\mu$. As will be detailed later, switch SW (9) is used for speed change control operations such as actuating the engine brake early on when traveling on a descending slope and prohibiting gearshift change when turning a corner while traveling on a winding road.

Figure 17:
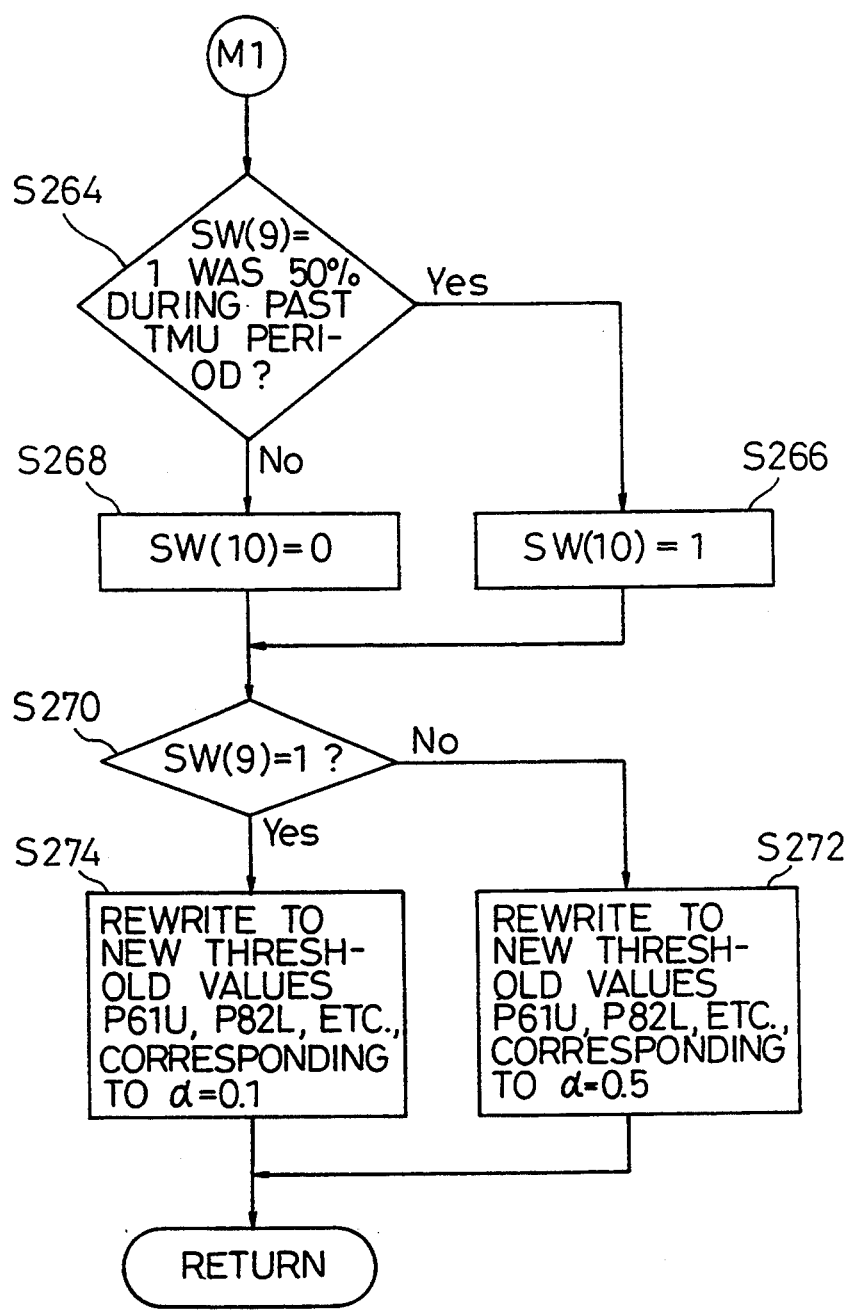
FIG. 17 is the remaining part of the flowchart of FIG. 16.

The program then proceeds to the step S264 of FIG. 17 and judges whether the fuzzy input switch SW (9) stayed at the value 1 for a predetermined percentage (e.g., 50%) or more during a past TMU period of time. The TMU period of time is set to a value, 20 minutes, for example, which is larger than the predetermined period of time XCMS (20 seconds) which is clocked by the foregoing short-term counter CNTMUS. If the judgment result of the step S264 is affirmative, then the program sets fuzzy input switch SW (10), which is a long-term low $\mu$ road judgment flag, to the value 1 in the step S266, while it resets switch SW (10) to a value 0 in the step S268 if the judgment result is negative. The value of fuzzy input switch SW (10) is stored in a nonvolatile memory so that it is not erased even after the key switch is turned OFF and the engine 1 is stopped, allowing the value of switch SW (10) to be read out when the engine is restarted.

When the fuzzy input switch SW (10) is set to the value 1, assumed is a case where the temperature of open air is low and the road surface is frozen all over. In this case, as will be detailed later, the speed change control is automatically carried out in the "snow mode" with the second-gear starting to prevent the wheels from slipping at the time of start.

Next, the program advances to the step S270, and judges whether the fuzzy input switch SW (9) has been set to the value 1, that is, whether it has been judged that the road surface is in a low $\mu$ condition. If the judgment result is negative, i.e., if the road surface is in the normal condition, then the program proceeds to the step S272 where it reads out new threshold values P61U, P62U, P63U, P82L, and P82U that correspond to the first $\alpha$ value, $\alpha=0.5$, for example, from engine brake timing maps to rewrite old threshold values to those values. On the other hand, if the judgment result of the step S270 is affirmative, i.e., if the road surface is judged to be in the low $\mu$ condition, then the program proceeds to the step S274 where it reads out new threshold values P61U, P62U, P63U, P82L, and P82U that correspond to the second $\alpha$ value, $\alpha=0.1$, for example, which is smaller than the first $\alpha$ value, from the engine brake timing maps to rewrite old threshold values to those values.

FIG. 21 (A) and FIG. 21 (B) show examples of the engine brake timing maps giving the membership functions that specify the relationship between the variable $\alpha$ and the threshold values P61U, P62U, P63U, P82L, and P82U (refer to Table 5 and Table 7) used for fuzzy rules 2, 3, 4, 6, 7, and 8 to be discussed later. Each of these threshold values is simultaneously set by the same variable $\alpha$. When the $\alpha$ value is changed each of the threshold values P61U, P62U, P63U, P82L, and P82U corresponding to the $\alpha$ value is set in accordance with the maps shown in FIG. 21 or a similar map. Therefore, by setting the $\alpha$ value according to the road surface $\mu$ value, all threshold values that correspond to the road surface $\mu$ can be set. This allows all membership function values of the fuzzy rules to be rewritten according to road surface $\mu$ as described later. Accordingly, the timing to actuate the engine brake on a descending slope can be changed in accordance with road surface $\mu$.

judgment of Applying a Rule

In the speed change control method according to the present invention, the application of the following fuzzy rules is judged, and one of the control modes that corresponds to the rule applied is selected. It is judged that a fuzzy rule is applicable when all the following conditions are fulfilled:

(1) All fuzzy input switches involved in the rule are equal to the respective applicable values.

(2) All fuzzy input variables involved in the rule are within the range of the respective predetermined membership function.

(3) The rule can be applied continuously for a specific number of times or more.

Table 4 shows the fuzzy input switches involved in the fuzzy rules and their respective applicable values. Table 5 shows the fuzzy input variables for the individual fuzzy rules and a summary of each rule. In this embodiment, the membership functions are defined as crisp sets, respectively, and the fuzzy inference is implemented by deciding whether a fuzzy input variable value concerned is within a predetermined range of the membership function. Table 6 shows the control modes which are selected when the individual fuzzy rules are found applicable.

TABLE 4

| Rule | Fuzzy Switch Input |
|---|---|
| 0 | SW (1) = 1 |
| 1 | SW (1) = 1 |
| 2 | — |
| 3 | — |
| 4 | — |
| 5 | — |
| 6 | SW (0) = 2 |
| 7 | SW (0) = 2 |
| 8 | SW (0) = 2 and SW (4) = 1 |
| 9 | SW (0) = 2 and SW (2) = 1 |

TABLE 5

| Rule | Fuzzy Input Variable |
|---|---|
| 0 | (FV(0) is small) (FV(4) > 10) (FV(5) > 5) (FV(8) is small) (FV(9) is large) |
| 1 | (FV(0) is small) (FV(4) > 10) (FV(5) > 5) (FV(8) is small) (FV(10) is large) |
| 2 | (FV(0) is medium) (FV(2) is large) (FV(4) is small) (FV(6) is negative) (FV(8) is large) |
| 3 | (FV(0) is medium) (FV(2) is large) (FV(3) is large) (FV(4) is small) (FV(6) is negative) |
| 4 | (FV(0) is medium) (FV(4) is small) (FV(6) is negative and large) (FV(8) is large) |
| 5 | (FV(0) is medium) (FV(1) is small) (FV(4) is large) (FV(5) is large) (FV(7) is small) |
| 6 | (FV(4) is small) (FV(6) is negative and extra large) (FV(8) is large) |
| 7 | (FV(3) is large) (FV(4) is small) (FV(6) is negative and extra large) |
| 8 | (FV(4) is small) (FV(6) is negative) (FV(10) is large) |
| 9 | (FV(4) > 3) (FV(5) is small) (FV(9) is small) |

TABLE 6

| Rule Applied | Mode To Switch To When Rule Applies |
|---|---|
| 0 | Mode 1 |

TABLE 6-continued

| Rule Applied | Mode To Switch To When Rule Applies |
|---|---|
| 1 | Mode 1 |
| 2 | Mode 2 |
| 3 | Mode 2 |
| 4 | Mode 2 |
| 5 | Mode 4 |
| 6 | Mode 3 |
| 7 | Mode 3 |
| 8 | Mode 3 |
| 9 | Mode 0 |

FIG. 22 shows a procedure for judging whether any of the aforementioned fuzzy rules can be applied. The program first checks each rule for applicability in a rule applicability judgment routine, then checks whether the applicable rule can be continuously applied for a predetermined number of times or more in the check routine of the applicable rule.

Figure 23:
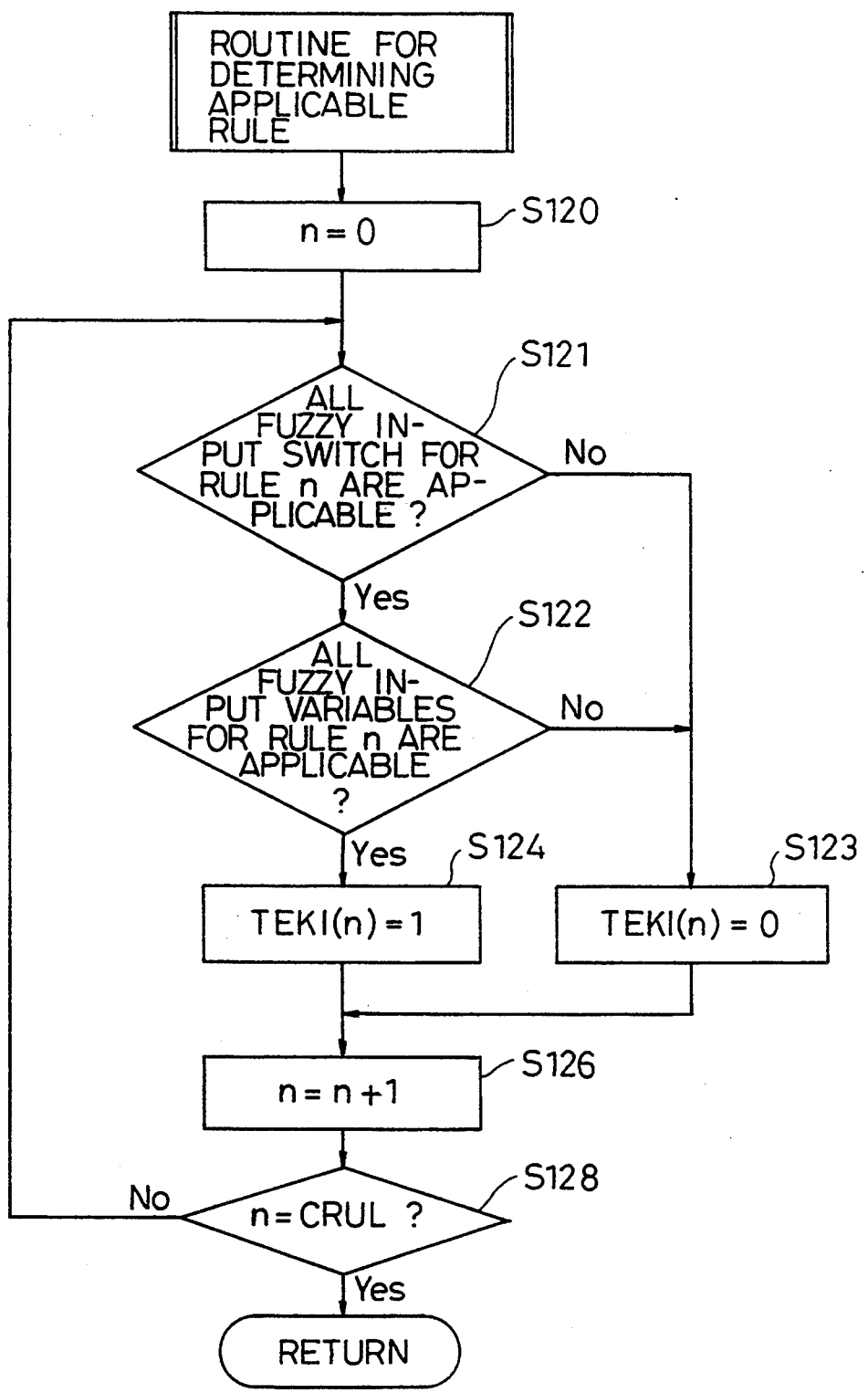
FIG. 23 is a flowchart of a procedure for checking for an applicable rule in the step of judging whether rules are applicable.

FIG. 23 shows a detailed procedure of the rule applicability judgment routine. When this routine is executed, the electronic control unit 5 first resets the program control variable n to a value 0 in the step S120. In the next step, the program judges whether all fuzzy input switches of the rule n are applicable (the step S121). In the rule 0, for instance, based on Table 4, it is judged whether fuzzy input switch SW (1) is equal to an applicable value 1. In a rule 8, for instance, it is judged whether fuzzy input switch SW (0) and fuzzy input switch SW (4) are equal to applicable values 2 and 1, respectively, thus checking whether all of them are applicable.

In the step S121, if any of the fuzzy input switches involved in the rule n is found not applicable, then the program proceeds to the step S123 where it sets control variable TEKI (n) to a value 0. On the other hand, if all fuzzy input switches involved in the rule n are found applicable, then the program proceeds to the step S122 where it judges whether all the fuzzy input variables involved in the rule n are applicable, i.e., if the fuzzy input variables stay in the predetermined range of the respective membership functions.

For instance, as shown in Table 5, five fuzzy input variables are checked for applicability in the rule 0, and four fuzzy input variables are checked for applicability in the rule 4. A proposition whether the fuzzy input variable FV (0), i.e., the vehicle speed, is low is inferred by determining whether the fuzzy input variable FV (0) is within a range predetermined by the upper and lower limit values (e.g., a range from 10 km/hr. to 55 km/hr.) according to the 0th membership function prepared for the fuzzy input variable FV (0). Similarly, a proposition whether the fuzzy input variable FV (0), i.e., the vehicle speed, is medium is inferred by determining whether the fuzzy input variable FV (0) is within a range predetermined by the upper and lower limit values (e.g., a range from 30 km/hr. to 100 km/hr.) according to the 1st membership function prepared for the fuzzy input variable. The relationships between such propositions and membership functions are shown in Table 7.

TABLE 7

| Proposition | Membership Function | Fuzzy Input Variable Range | Remark |
|---|---|---|---|
| Is vehicle speed low? | 0th | $P01L \leq FV(0) \leq P01U$ | $P01L < P02L <$ |
| Is vehicle speed medium? | 1st | $P02L \leq FV(0) \leq P02U$ | $P01U < P02U$ |
| Is longitudinal acceleration low? | 0th | $P1L \leq FV(1) \leq P1U$ | |
| Is steering wheel operating amount large? | 0th | $P2L \leq FV(2) \leq P2U$ | |
| Is brake deceleration width large? | 0th | $P3L \leq FV(3) \leq P3U$ | |
| Is accelerator opening small? | 0th | $P41L \leq FV(4) \leq P41U$ | $P41L < P42L <$ |
| Is accelerator opening 3% or more? | 1st | $P42L \leq FV(4) \leq P42U$ | $P43L < P44L;$ |
| Is accelerator opening 10% or more? | 2nd | $P43L \leq FV(4) \leq P43U$ | $P41U = P42L;$ $P42U = P43U$ |
| Is accelerator opening large? | 3rd | $P44L \leq FV(4) \leq P44U$ | $= P44U$ |
| Is accelerator operating speed low? | 0th | $P51L \leq FV(5) \leq P51U$ | $P51L < P52L <$ |
| Is accelerator operating speed 5%/s or more? | 1st | $P52L \leq FV(5) \leq P52U$ | $P53L < P51U <$ |
| Is accelerator operating speed high? | 2nd | $P53L \leq FV(5) \leq P53U$ | $P52U = P53U$ |
| Is gradient resistance negative and extra high? | 0th | $-MIN \leq FV(6) \leq -P61U$ | $-P61U$ |
| Is gradient resistance negative and high? | 1st | $-MIN \leq FV(6) \leq -P62U$ | $< -P62U$ |
| Is gradient resistance negative? | 2nd | $-MIN \leq FV(6) \leq -P63U$ | $< -P63U$ |
| Is engine torque allowance small? | 0th | $P7L \leq FV(7) \leq P7U$ | |
| Is 2-sec. vehicle speed difference small? | 0th | $P81L \leq FV(8) \leq P81U$ | $P81L < P82L =$ |
| Is 2-sec. vehicle speed difference large? | 1st | $P82L \leq FV(8) \leq P82U$ | $P81U < P82U$ |
| Is steering angle absolute value small? | 0th | $P91L \leq FV(9) \leq P91U$ | $P91L < P91U <$ |
| Is steering angle absolute value large? | 1st | $P92L \leq FV(9) \leq P92U$ | $P92L < P92U$ |
| Is lateral acceleration | 0th | $P10L \leq FV(10) \leq P10U$ | $P10L < P10U <$ |

TABLE 7-continued

| Proposition | Membership Function | Fuzzy Input Variable Range | Remark |
| --- | --- | --- | --- |
| absolute value small? Is lateral acceleration absolute value large? | 1st | P11L ≦ FV(10) ≦ P11U | P11L < P11U |

If the judgment result of the step S122 is negative, the program proceeds to the aforementioned step S123 where it sets the control variable TEKI (n) to the value 0. If the judgment result is affirmative, i.e., if all the fuzzy input switches of the rule n are applicable and all the fuzzy input variables of the rule n are applicable, then the program sets control variable TEKI (n) to a value 1, and memorize that the rule n has been applied.

Upon completion of the applicability judgment of a rule, the program increments program control variable n only by one the step S126, then judges whether the variable value n is equal to a predetermined value CRUL (a value corresponding to the number of rules). The steps of the foregoing step S121 and after are repeatedly executed until the variable value n reaches the predetermined value CRUL to check all the rules for applicability. When the applicability judgment of all the rules is completed and if the judgment result in the step S128 is affirmative, then the routine is terminated.

Applicability of any one of rules 2 through 4 is a precondition for entering the descending slope weak engine brake mode 2. Entering the mode 2 means actuating the engine brake by coercively setting the gearshift in the 3rd-gear position. Referring to Table 5 and Table 7, for the rule 2 to be applicable, it is required that the weight/gradient resistance FV (6) be negative and the 2-second vehicle speed difference FV (8) be large. For the rule 3 to be applicable, it is required that the weight/gradient resistance FV (6) be negative. For the rule 4 to be applicable, it is required that the weight/gradient resistance FV (6) be negative and high, and the 2-second vehicle speed difference FV (8) be large.

Applicability of any one of rules 6 through 8 is a precondition for entering the descending slope strong engine brake mode 3. Entering the mode 3 means exercising the strong engine brake by coercively setting the gearshift in the 2nd-gear position. For the rule 6 to be applicable, it is required that the weight/gradient resistance FV (6) be negative and extra high, and the 2-second vehicle speed difference FV (8) be large. For the rule 7 to be applicable, it is required that the weight/gradient resistance FV (6) be negative and extra high, and for the rule 8 to be applicable, it is required that the weight/gradient resistance FV (6) be negative.

Propositions such as "whether the weight/gradient resistance FV (6) is negative," and "whether the 2-second vehicle speed difference (acceleration) FV (8) is large" are judged, as described previously, by checking whether the individual fuzzy input variables are within the ranges predetermined by the threshold values of the corresponding membership functions. Since the threshold values are set in accordance with road surface μ in the routine shown in FIG. 16 and FIG. 17, these rules are likely to be applicable when the road surface μ is found to be low, and an earlier timing for exercising the engine brake will be set.

Figure 24:
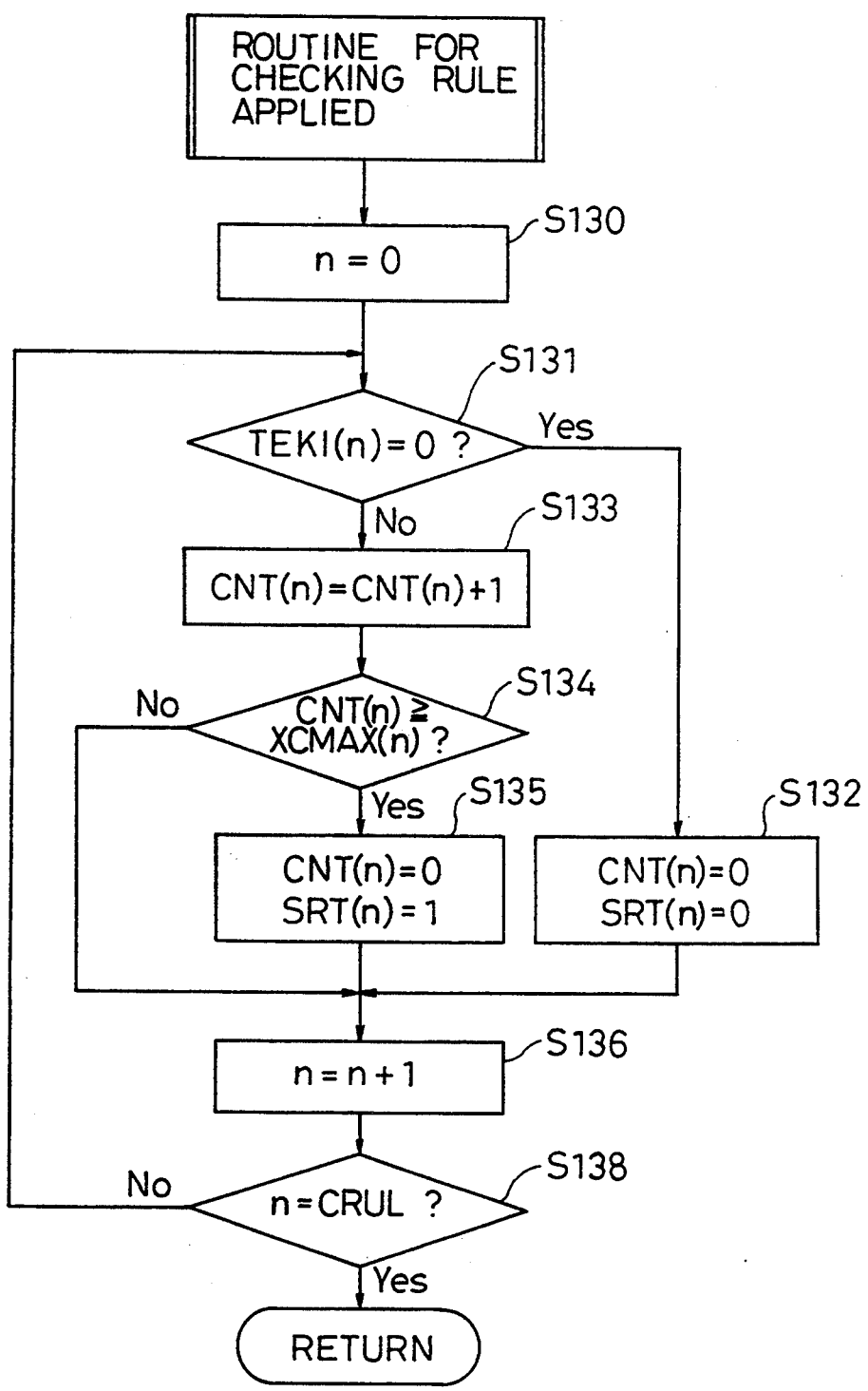
FIG. 24 is a flowchart of a procedure for checking an applicable rule in the step of judging whether rules are applicable.

FIG. 24 shows a routine for checking whether an applicable rule has been continuously found effective for a predetermined number of times. The electronic control unit 5 first resets program control variable n to the value 0 in the step S130. Then in the step S131, the program judges whether the control variable TEKI (n) which corresponds to the rule n specified in the step S130 is the value 0. In the step S131, if said control variable TEKI (n) is the value 0, then the rule n is not that applicable, so the program proceeds to the step S132 where it resets counter CNT (n) for the rule n to a value 0, and also sets control variable SRT (n) for memorizing the applicability of the rule n to a value 0. After that, the program advances to the step S136 to be described later.

On the other hand, if the judgment result of the step S131 is negative and the control variable TEKI (n) corresponding to the rule n is not the value 0, then the program goes to the step S133 where it increments counter value CNT (n) only by one and determines whether the counter value CNT (n) has reached a predetermined value XCMAX (n) which is set for the rule n concerned (the step S134). If the counter value CNT (n) has not reached the predetermined value XCMAX (n), then the program goes to the step S136 without changing the variable value SRT (n). The predetermined value XCMAX (n) is set at an appropriate value considering the influences exerted by the urgent level of implementing the control mode concerned, noises, and the like on judging the applicability of the rule.

Upon completion of checking one of rules for applicability, the program increments program control variable n only by one in the step S136, then judges whether the variable value n has reached the predetermined value CRUL (the value corresponding to the number of the rules) (the step S138). The program repeatedly implements the foregoing step S131 and after until the variable value n reaches the predetermined value CRUL to check all the rules for applicability. When the program finishes checking all the rules for applicability and determines that the judgment result in the step S138 is affirmative, it terminates the routine.

Thus, if the routine is repeated so that control variable TEKI (n) which corresponds to a particular rule n is continuously set to the value 1, then counter value CNT (n) is incremented each time said routine is carried out until it finally reaches the predetermined value XCMAX (n). If the judgment result of the step S134 is affirmative, then the step S135 is implemented to reset counter CNT (n) to the value 0 and also set control variable SRT (n) for memorizing the applicability of the rule n to a value 1.

Processing for Each Mode

Figure 25:
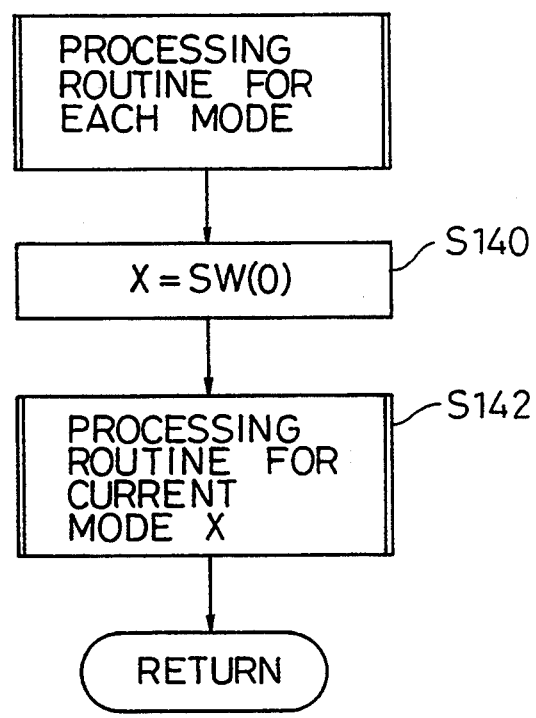
FIG. 25 is a flowchart which shows a processing procedure for each mode.

After discriminating an applicable rule in the manner described above, the electronic control unit 5 carries out each mode processing in accordance with a procedure shown in FIG. 25. More specifically, the electronic control unit first sets the value of fuzzy input switch SW (0) in a program variable X in the step S140. In other words, the control unit specifies the current control mode. Then, the control unit executes a processing routine for the current control mode X (the step S142).

Processing Routine Used When the Current Mode is 0

Figure 26:
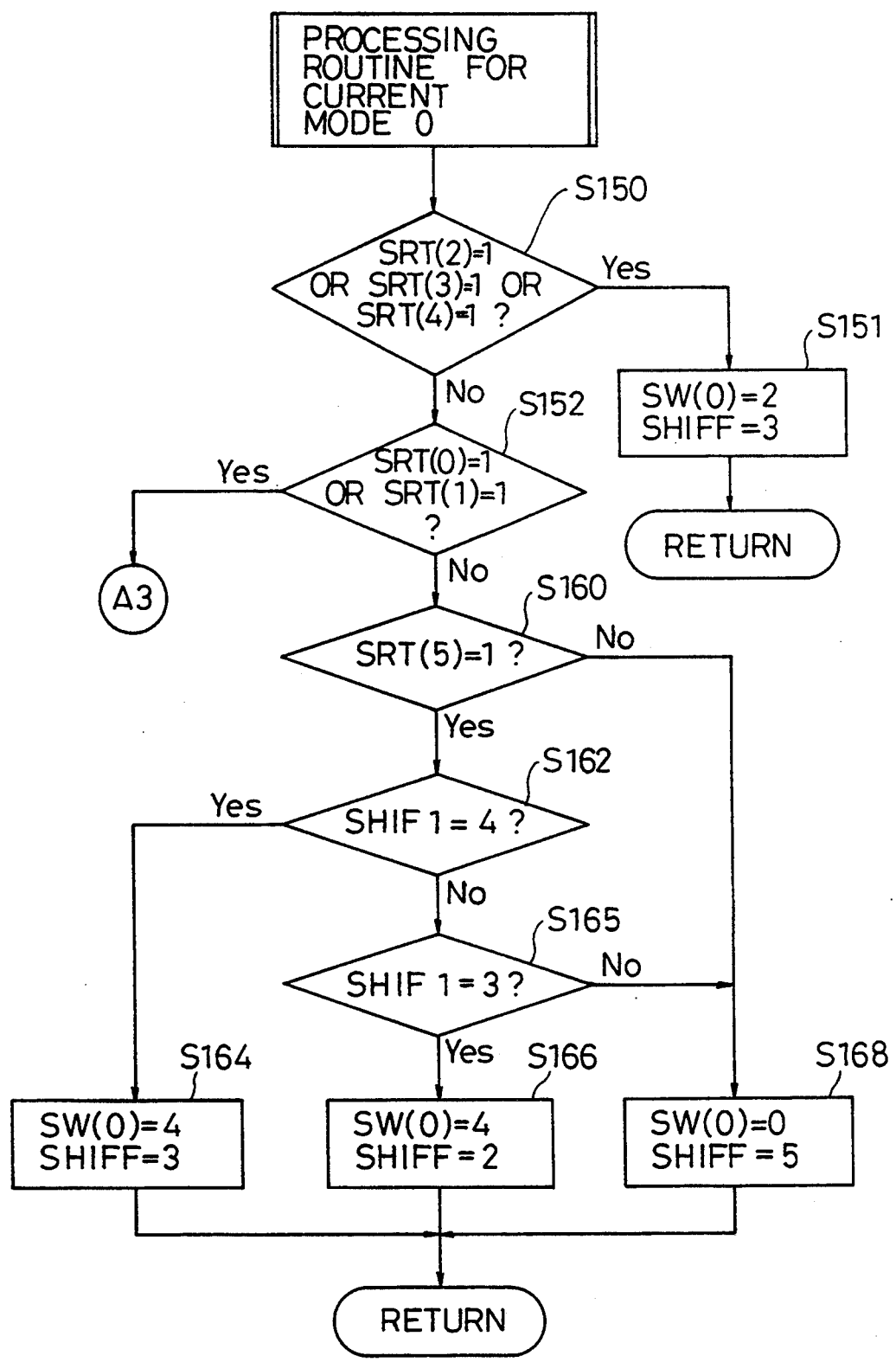
FIG. 26 is a part of a flowchart which shows a processing procedure when the current control mode is 0.

When the current speed change control is being performed in the control mode 0 (normal mode 0), the fuzzy shift position SHIFF is set in accordance with the flowcharts of FIG. 26 and FIG. 27. In the control mode 0, as previously explained, the gearshift position is set using the shift pattern for normal flat road drive, and it is possible to shift from this control mode to the mode 1, mode 2 or mode 4.

The electronic control unit 5 first determines, in a step S150, whether any of the control variables SRT (2), SRT (3), and SRT (4) for memorizing the applicability of rules concerned is the value 1. These variables are used for memorizing the applicability of the rules 2, 3, and 4, respectively. As shown in Table 6, when any of these rules is found applicable, it means that the mode 2 should be exercised. Therefore, if the judgment result of the step S150 is affirmative, then the program goes to the step S151 where it sets fuzzy input switch SW (0) to a value 2 and fuzzy shift position variable SHIFF to a value 3, and terminates the routine. The mode 2 is a mode used for traveling on a descending slope with the engine brake coercively set in the 3rd gearshift position.

If none of the control variables SRT (2), SRT (3), and SRT (4) are the value 1 with the judgment result in the step S150 being negative, then the program executes the step S152 to determine whether either the variable SRT (0) or SRT (1) is the value 1. These variables are for memorizing the applicability of the rule 0 and 1, respectively. As shown in Table 6, when any of these rules is found applicable, it means that the mode 1 should be executed. Accordingly, if the judgment result of the step S152 is affirmative, the program advances to the step S154 of FIG. 27 to set the fuzzy input switch SW (0) to the value 1. Then, the program proceeds to the step S155 where it determines whether the variable SHIF1 has a value 4 which denotes the 4th gearshift position. The variable SHIF1 indicates a shift position (a calculated gearshift position in the mode 0) decided by the aforementioned shift pattern used in the mode 0. If the judgment result is affirmative, then the program sets the fuzzy shift position variable SHIFF to a value 3 in order to coercively shift the gearshift position down to the 3rd position, and terminates the routine. On the other hand, if the judgment result of the step S155 is negative, then the program goes to the step S156 to set fuzzy shift position variable SHIFF to the variable value SHIF1, and terminates the routine. The mode 1 is the ascending slope cornering mode as shown in FIG. 1, and the gearshift position is decided using a shift pattern with an expanded range for driving at the 2nd and 3rd gearshift positions to be described later. When a shift is made from the mode 0 to the mode 1 while driving at the 4th gearshift position, a command is issued to coercively shift down to the 3rd position, and at this downshift operation switches the normal mode shift pattern is switched to the ascending cornering mode shift pattern. When the vehicle is traveling at a gearshift position other than the 4th position, the shift pattern is switched with that gearshift position maintained.

If none of the control variables SRT (0) and SRT (1) are the value 1, and the judgment result of the step S152 is negative, the program goes to the step S160 where it determines whether the control variable SRT (5) is the value 1. This variable SRT (5) is used for memorizing the applicability of the rule 5, and when this rule is applied, it means that the mode 4 should be exercised as shown in Table 6. Accordingly, if the judgment result of the step S160 is affirmative, then the program goes to the step S162 where it determines whether the shift position variable SHIF1 which is decided by the shift pattern used in the mode 0 is the value 4 which indicates the 4th gearshift position. If the judgment result is affirmative, then the program sets fuzzy input switch SW (0) to the value 4, also sets fuzzy position variable SHIFF to the value 3 in order to coercively shift down the current gearshift position by one position, and terminates the routine.

If the judgment result of the step S162 is negative, then the program advances to the step S165 where it judges whether the shift position variable (calculated speed change gearshift position in the mode 0) SHIF1 is the value 3 which indicates the 3rd gearshift position. If the judgment result is affirmative, then the program sets the fuzzy input switch SW (0) to the value 4, also sets the fuzzy shift position variable SHIFF to the value 2, and terminates the routine. Thus, in the mode 4 which is the straight ascending slope mode, if the gearshift position set by the shift pattern used in the normal mode 0 is in the 4th position, then it is coercively shifted down to the 3rd position, and if the gearshift position is in the 3rd position, then it is coercively shifted down to the 2nd position.

If the shift position variable SHIF1 is neither in the 4th nor 3rd, then the program proceeds to the step S168 where it keeps the value 0 in the fuzzy input switch SW (0), sets fuzzy shift position variable SHIFF to a value 5, and terminates the routine. When the fuzzy shift position variable SHIFF is set to the value 5, it means that the gearshift position is changed to the 5th position, however, the transmission 3 does not have the 5th gearshift position. Therefore, the speed change command based on the fuzzy shift position variable SHIFF is ignored, and the speed change control based on the normal mode 0 is carried out.

If the control variable SRT (5) is not the value 1 and if the judgment result in the step S160 is negative, then the program proceeds to the foregoing step S168 where it maintains the value 0 in fuzzy input switch SW (0), sets fuzzy shift position variable SHIFF to the value 5, and continues executing the normal mode 0.

Processing Routine When the Current Mode is 1

Figure 28:
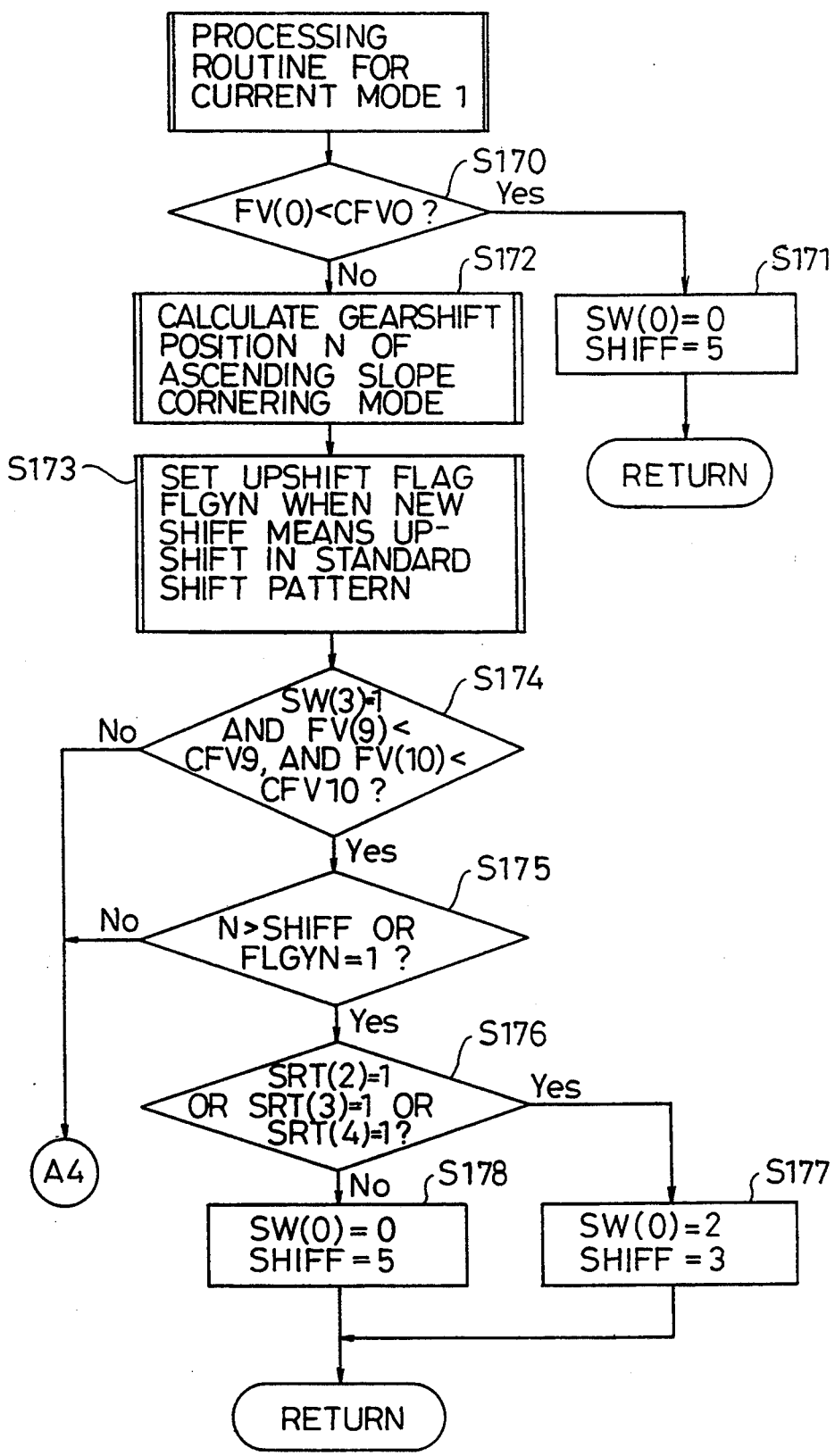
FIG. 28 is a part of a flowchart which shows a processing procedure when the current control mode is 1.
Figure 29:
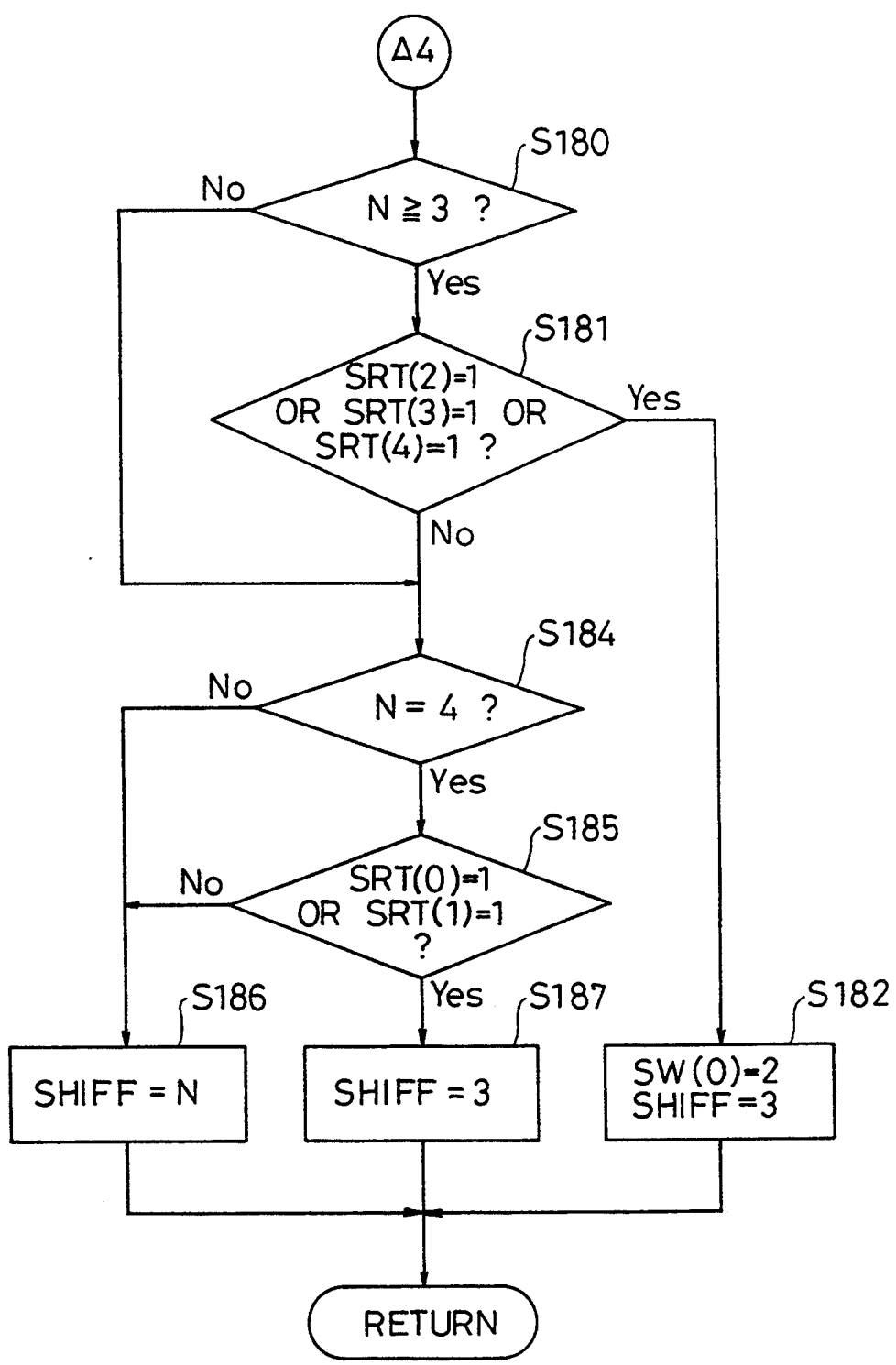
FIG. 29 is the remaining part of the flowchart of FIG. 28.

When the current speed change control is being performed in the control mode 1, the gearshift position is set in accordance with the flowcharts shown in FIG. 28 and FIG. 29. In the control mode 1, as described previously, the gearshift position is set in accordance with the shift pattern for the ascending cornering mode. From this control mode, it is possible to switch to the mode 0 or the mode 2 as shown in FIG. 1.

The electronic control unit 5 first determines in the step S170 whether the vehicle speed Fv (0) is smaller than the predetermined value CFVO (e.g., 10 km/hr.). If the judgment result is affirmative, then the program advances to the step S171 where it sets fuzzy input switch SW (0) to the value 0 and sets fuzzy shift position variable SHIFF to the value 5 to switch to the normal mode 0. When the vehicle speed is low, unconditionally executing the normal mode 0 will cause no difficulty.

Figure 30:
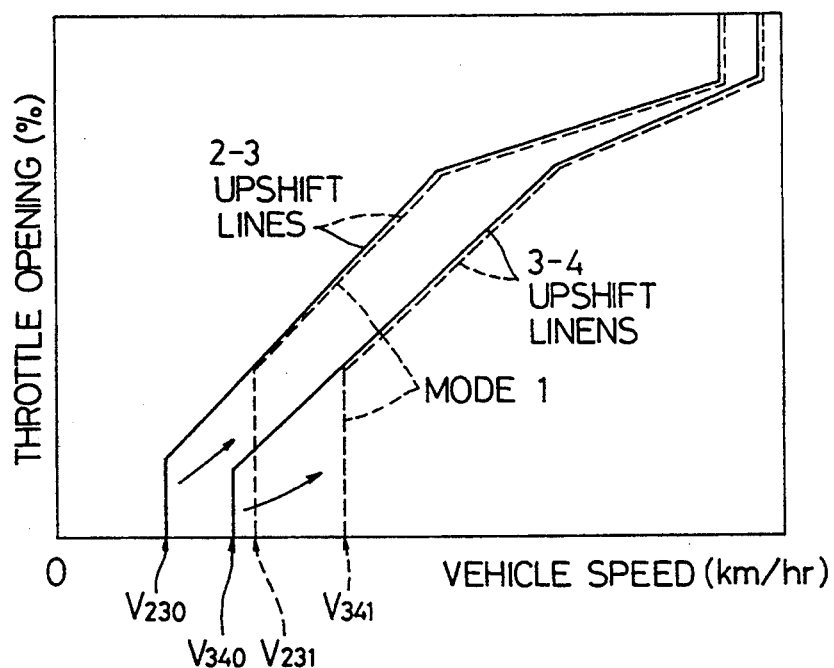
FIG. 30 is a graph which shows upshift lines in the control modes 0 and 1, which upshift lines define speed change areas on the basis of throttle opening and vehicle speed.
Figure 31:
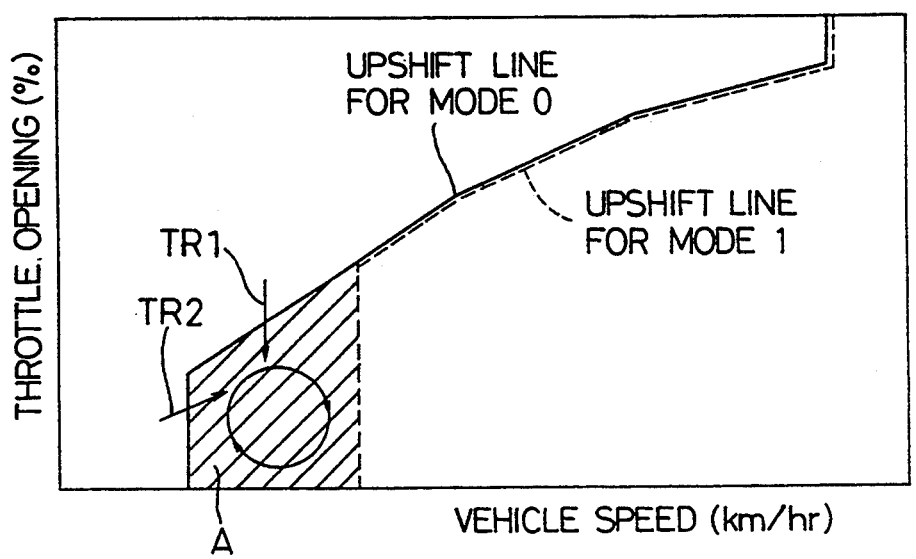
FIG. 31 is a graph to illustrate the speed change area which expands as the control mode is switched from 0 to 1.

If the vehicle speed FV (0) is higher than the predetermined value CFVO and if the judgment result of the step S170 is negative, then the program proceeds to the step S172 where it uses the shift pattern for the ascending slope cornering mode to calculate a current shift position N on the basis of detected vehicle speed VO and the accelerator opening (throttle opening) APS. FIG. 30 shows the shift patterns for upshift from the 2nd to the 3rd, and from the 3rd to the 4th. When the control mode is switched from the normal mode 0 to the ascending cornering mode 1, the upshift lines are changed as shown by the arrows in the figure, expanding the driving range at the 2nd or the 3rd gearshift position. To be more specific, the upshift line (indicated by a solid line) from the 2nd to the 3rd gearshift position in the normal mode 0 is indicated by a line of the constant vehicle speed and defines two speed change regions. For the upshift line (indicated by a broken line) of the ascending slope cornering mode 1, the constant vehicle speed line changes to the constant vehicle speed line of $V_{231}$ which is higher than the previous vehicle speed $V_{230}$, expanding the 2nd gearshift position range. Similarly, the upshift line (indicated by a solid line) from the 3rd to the 4th gearshift position in the normal mode 0 is indicated by a line of the constant vehicle speed $V_{340}$ and defines two speed change regions. For the upshift line (indicated by a broken line) of the ascending slope cornering mode 1, the constant vehicle speed line changes to the constant vehicle speed line of $V_{341}$ which is higher than the previous vehicle speed $V_{340}$, expanding the 3rd gearshift position range. The calculation of the shift position N in the step S172 is performed using the shift pattern shown by the broken-line upshift line in FIG. 30. A hatched area A in FIG. 31 indicates the area of the 2nd or 3rd gearshift position range which is expanded by the switch from the normal mode to the ascending slope cornering mode.

The electronic control unit 5 determines whether an upshift from the 2nd to the 3rd gearshift position or from the 3rd to the 4th gearshift position results if the shift position is calculated on the basis of the detected vehicle speed VO and the accelerator opening (throttle opening) by using the normal shift pattern of the normal mode 0 shown by the solid lines in FIG. 30. If such upshift is expected, variable FLGYN is set to a value 1 (the step S173). For the speed change control in the mode 1, as described previously, fuzzy input switch SW (0) is set to the value 1, and fuzzy shift position variable SHIFF is used to issue a speed change command to coercively change the speed to the 3rd or lower gearshift position. Setting the variable FLGYN to the value 1 means that there would be a shift position change to cause an upshift if the command based on the variable SHIFF were not issued. This means that, referring to FIG. 31, the change of the shift position caused the new shift position to enter the area (hatched area A) enclosed by the upshift line (solid line) of the normal mode 0 and the upshift line (broken line) of the mode 1. This shift position change, i.e., the entry of the new shift position into the area A, can happen when a driver releases the accelerator pedal, causing accelerator opening APS to become smaller as indicated by the arrow TR1 in FIG. 31, or when the vehicle speed V0 increases as indicated by the arrow TR2.

Thus, the purpose of calculating the shift position N in the step S172 and storing data that indicates whether an upshift has been caused by the variable FLGYN in the step S173 is to ensure a proper timing for switching from the control mode 1 to another mode, the proper timing being the moment the upshift line is passed. This timing for changing the control mode prevents a driver from feeling uncomfortable with the operation.

The electronic control unit 5 determined whether or not all of the following conditions hold: the fuzzy input switch SW (3) has the value 1; the steering angle FV (9) is smaller than a predetermined value CFV9 (e.g., 50°); and the lateral acceleration FV (10) is smaller than a predetermined CFV10 (the step S174). In other words, the electronic control unit judges whether an ascending slope has ended and the road is non-winding. If the judgment result is negative, the program proceeds to the step S180 shown in FIG. 29 to be explained later. On the other hand, if the judgment result of the step S174 is affirmative, then the program goes to the step S175 where it judges whether the shift position N determined using the shift pattern of the ascending cornering mode 1 is larger than the fuzzy shift position variable value SHIFF, or whether the flag FLGYN has the value 1, which indicates that an upshift has been taken place. If both judgment results are negative, then the program advances to the step S180 to be discussed later. If either judgment result is affirmative, then the program proceeds to the step S176.

In the step S176, it is judged whether any of the control variables SRT (2), SRT (3), and SRT (4) for memorizing the applicability of rules concerned has the value 1. As previously explained, these variables are used to memorize the applicability of the rules 2, 3, and 4, respectively. As shown in Table 6, when any of the rules is applied, it means that the mode 2 should be exercised. Accordingly, if the judgment result of the step S176 is affirmative, then the program advances to the step S177 where it sets fuzzy input switch SW (0) to the value 2, sets fuzzy shift position variable SHIFF to the value 3, and terminates the routine. As previously described, the mode 2 is designed to coercively drive on a descending slope with the gearshift set in the 3rd position.

If none of the control variables SRT (2), SRT (3), and SRT (4) have the value 1, and the judgment result of the step S176 is negative, then the program executes the step S178 where it sets fuzzy input switch SW (0) to the value 0, sets fuzzy shift position variable SHIFF to the value 5, and terminates the routine. In this case, the control mode is switched from the ascending slope cornering mode 1 to the normal mode 0.

In the step S180 shown in FIG. 29 which is executed if the judgment result of either the step S174 or the step S175 is negative, the program first determines whether the shift position N calculated in the foregoing step S172 is 3 or more. If the judgment result is negative, then the program proceeds to the step S184 to be described later; if it is affirmative, then the program proceeds to the step S181. In the step S181, the program judges whether any of the control variables SRT (2), SRT (3), and SRT (4) has the value 1. These variables are, as previously described, used for memorizing the applicability of the rules 2, 3, and 4, respectively. If any of the rules is applied, it means that the mode 2 should be exercised. Accordingly, if the judgment results of both steps S180 and S181 are affirmative, the program advances to the step S182 where it sets fuzzy input switch SW (0) to the value 2 and fuzzy shift position variable SHIFF to the value 3, and terminates the routine. This causes the control mode 2 to be executed.

When the judgment result of either the step S180 or S181 is negative, it means that the ascending slope cornering mode 1 will be continued. In this case, the program determines whether the foregoing shift position N is equal to 4 in the step S184, and either the variable SRT (0) or SRT (1) has the value 1 in the step S185. As previously described, the variables SRT (0) and SRT (1) are used for memorizing the applicability of the rules 0 and 1, respectively. If either rule is applied, it means that the mode 1 should be exercised. If the shift position which is calculated according to the shift pattern for the ascending cornering mode 1 is not the 4th position, or if neither the variable SRT (0) nor the SRT (1) has the value 1, that is, if the judgment result of either the step S184 or S185 is negative, then the program proceeds to the step S186 where it sets fuzzy shift position variable SHIFF to the value N, and terminates the routine.

If the shift position N is 4, and either the variable SRT (0) or SRT (1) has the value 1, then the program implements the speed change control of the ascending cornering mode again in the same mode 1, sets fuzzy shift position variable SHIFF to the value 3, and downshifts from the 4th to the 3rd position.

When the speed change control of the ascending slope cornering mode is carried out, the upshift line moves so that the upshifting operation is not performed with ease even if the accelerator opening is set back when turning a corner of an ascending slope. This is explained with reference to FIG. 31 as follows; when the speed change control is switched from the mode 0 to the mode 1, the speed change range shown by the hatched area A is expanded. When climbing an ascending slope with frequent curves, the operation line defined by the vehicle speed and the driver's stepping on the accelerator pedal becomes a circle which is often produced within the hatched area A shown in FIG. 31. As a result, the frequency of upshifts can be reduced, minimizing the chances of shift hunting even when driving on an ascending slope with many curves.

Processing Routine When the Current Mode is 2

Figure 32:
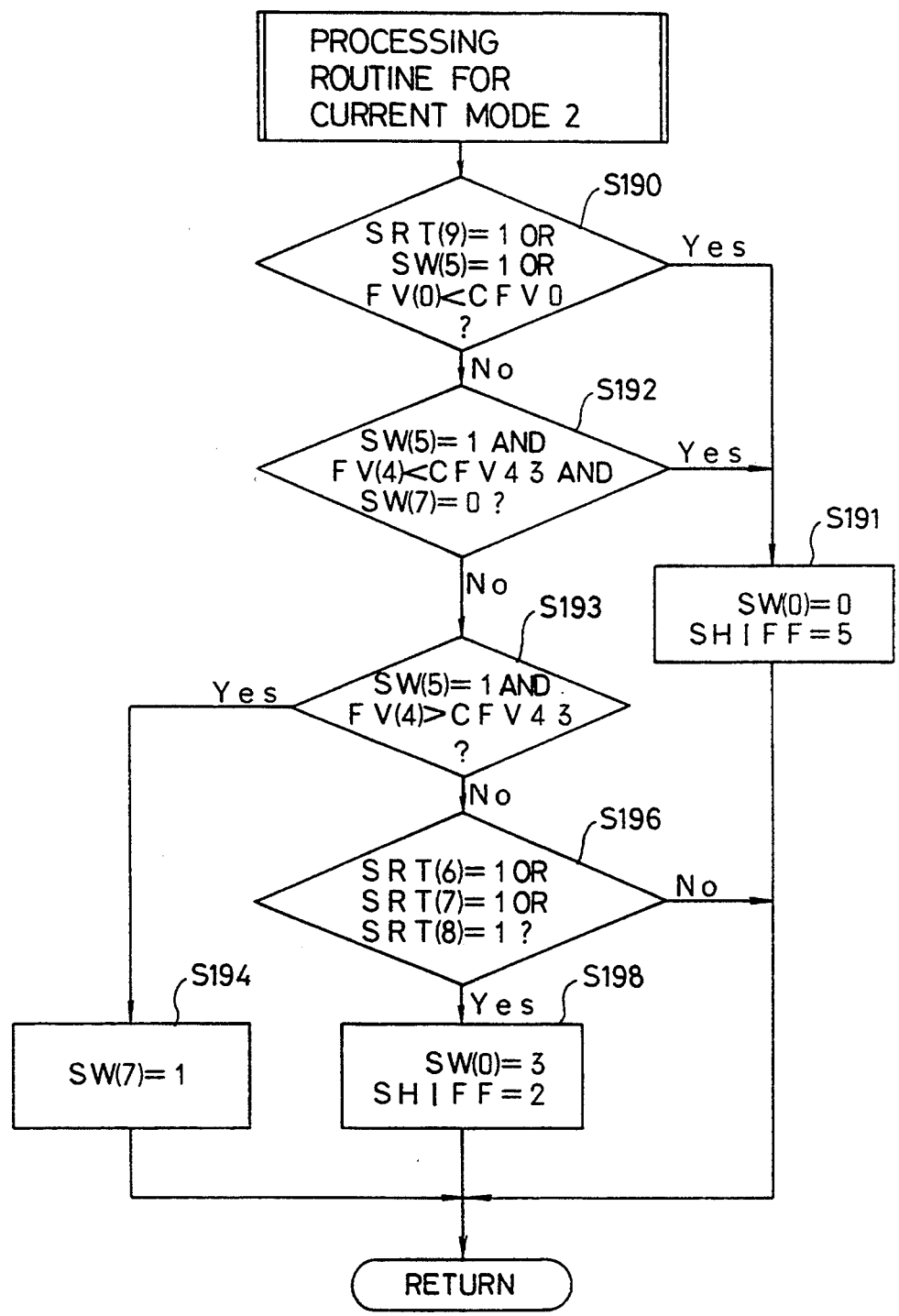
FIG. 32 is a flowchart which shows a processing procedure when the current control mode is 2.

When the current speed change control is in the control mode 2, the gearshift position is set in accordance with the flowchart of FIG. 32. As previously described, the control mode 2 is the descending slope weak engine brake mode for driving on a descending slope with the gearshift set in the 3rd position, however, the gear may be shifted to a position ranging from 1st to 4th, depending on the depressing mount of the accelerator pedal. As shown in FIG. 1, it is possible to switch from the control mode 2 to the mode 0 or the mode 3.

The electronic control unit 5 first determined in the step S190 whether or not at least one of the following conditions holds: the control variable SRT (9) has the value 1; the fuzzy input switch SW (5) has the value 1; and the vehicle speed FV (0) is smaller than the predetermined value CFV0 (e.g., 10 km/hr.). The control variable SRT (9) is used for memorizing the applicability of the rule 9; as shown in Table 6, when the rule 9 is applied, it means that the mode 0 should be exercised. The fuzzy input switch SW (5) is used to memorize the condition where the accelerator opening is large. If any of the judgment results in the step S190 is affirmative, then the program executes the step S191, sets fuzzy input switch SW (0) to the value 0, sets fuzzy shift position variable SHIFF to the value 5, and terminates the routine. In this case, the control mode is switched from the descending slope weak brake mode 2 to the normal mode 0.

If the judgment result of the step S190 is negative, then the program proceeds to the step S192 in which it is determined whether or not all of the following conditions hold: the fuzzy input switch SW (5) has the value 1; the accelerator opening FV (4) is smaller than a predetermined value CFV43 (e.g., 40%); and the fuzzy input switch SW (7) has the value 0. As mentioned previously, fuzzy input switch SW (5) is used to memorize the condition where the accelerator opening is large. Fuzzy input switch SW (7) is set to the value 1 when an accelerator is depressed deeply during 3rd gearshift position engine braking to memorize this condition. Accordingly, when the fuzzy input switch SW (7) is 0, it means that there was no deep depression of the accelerator pedal. In other words, in the step S192, the program determines a driver's intention of the medium acceleration. If the judgment result is affirmative, the program proceeds to the foregoing step S191 where it sets fuzzy input switch SW (0) to the value 0, and sets fuzzy shift position variable SHIFF to the value 5 to switch to the normal mode 0. In this case, the gearshift position is decided in accordance with the shift map for the normal mode, and therefore, the 3rd gearshift position is maintained or an upshift to the 4th position takes place, depending on the accelerator opening and the vehicle speed. The upshift to the 4th gearshift position requires a reduced depression of the accelerator pedal, ensuring an acceleration feeling that matches the driver's accelerating intention on a descending slope.

If the judgment result of the step S192 is negative, the program proceeds to the step S193 where it judges whether the fuzzy input switch SW (5) has the value 1 and also the accelerator opening FV (4) is larger than the foregoing predetermined value CFV43 (40%). This judgment is made to determine if the driver intends to exercise high acceleration. If the judgment result is affirmative, then the program executes the step S194 to set fuzzy input switch SW (7) to the value 1, and terminates the routine. In this case, the 3rd gearshift position is maintained, the speed change control in the mode 2 is continued, and the high acceleration on a descending slope is exercised. The mode 2 is the speed change control mode for descending a gentle slope while exercising a weak engine braking. If the driver implements high acceleration of the vehicle in such operation mode, it is predicted that strong braking will be required when turning a corner in the future. The fuzzy input switch SW (7) is used as a flag for issuing a command for strong engine braking when engaging strong braking following high acceleration. In other words, when the fuzzy input switch SW (7) is set to the value 1, the judgment result of the foregoing step S192 becomes negative even if the fuzzy input switch SW (5) indicates that the accelerator opening is large and the accelerator opening is smaller than the predetermined value CFV43 (40%). As a result, the speed change control in the normal mode 0 in the step S191 is not executed, but the current control mode, that is, the descending slope weak engine brake mode 2 or the descending slope strong engine brake mode 3 is carried out, thereby reducing the frequency of braking.

If the judgment result of the step S193 is negative, the program executes the step S196 where it determines whether any of the control variables SRT (6), SRT (7), and SRT (8) for memorizing the applicability of the rules concerned has the value 1. These variables are, as previously explained, used for memorizing the applicability of the rule 6, 7, and 8, respectively. As shown in Table 6, when any of the rules is applied, it means that the mode 3 should be exercised. Therefore, if the judgment result of the step S196 is affirmative, the program proceeds to the step S198 where it sets fuzzy input switch SW (0) to the value 3, sets fuzzy shift position variable SHIFF to the value 2, and terminates the routine. The mode 3, as described previously, is used to coercively descend a slope with the gearshift set in the 2nd position.

If none of the control variables SRT (6), SRT (7), and SRT (8) have the value 1, and the judgment result of the step S196 is negative, the program terminates the routine without doing anything. In other words, the speed change control in the current control mode 2 is continued, preventing wasteful shifting.

Processing Routine When the Current Mode is 3

Figure 33:
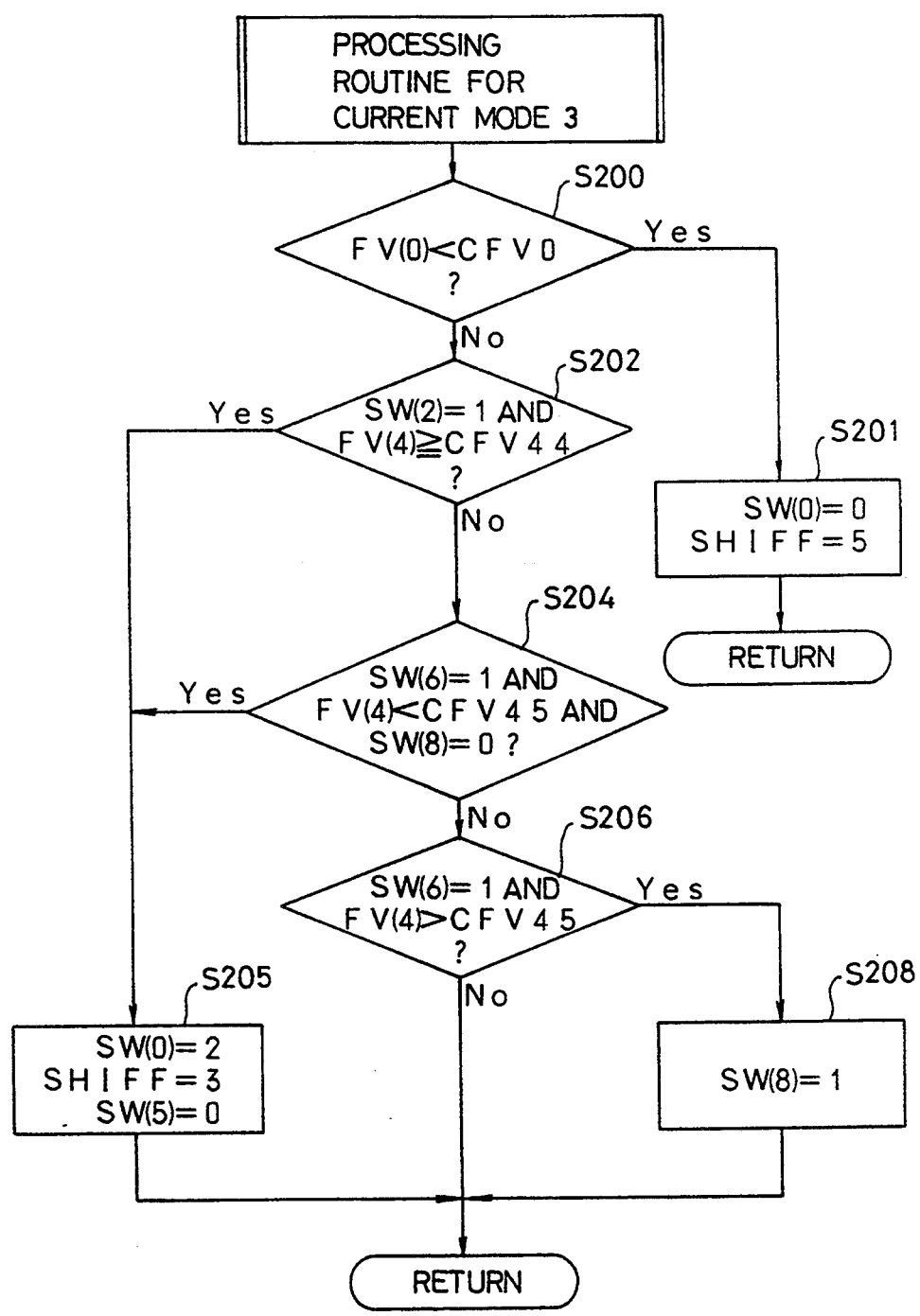
FIG. 33 is a flowchart which shows a processing procedure when the current control mode is 3.

When the current speed change control is being carried out in the control mode 3, the gearshift position is set in accordance with the flowchart shown in FIG. 33. As previously described, the control mode 3 is the descending slope strong engine brake mode for descending a slope with gearshift set in the 2nd position. As shown in FIG. 1, it is possible for switch from this control mode 3 to the mode 0 or the mode 2.

The electronic control unit 5 first judges in the step S200 whether the vehicle speed FV (0) is smaller than the predetermined value CFV0 (10 km/hr.). If the vehicle speed FV (0) is smaller than the predetermined value CFV0, then the program unconditionally executes the step S201 where it sets fuzzy input switch SW (0) to the value 0, sets fuzzy shift position variable SHIFF to the value 5, and terminates the routine. In this case, the control mode is directly switched from the descending slope strong engine brake mode 3 to the normal mode 0.

If the judgment result of the step S200 is negative, then the program proceeds to the step S202 where it judges whether fuzzy input switch SW (2) has the value 1 and the accelerator opening FV (4) is a predetermined value CFV44 (e.g., 3%) or more. The fuzzy input switch SW (2) is, as previously described, used for memorizing the condition where the weight/gradient resistance is not negative. Therefore, in the step S202, it is determined whether the vehicle has left a descending slope and the accelerator pedal is slightly depressed. If the judgment result is affirmative, the program advances to the step S205 where it sets fuzzy input switch SW (0) to the value 2 and fuzzy input switch SW (5) to the value 0, and also sets fuzzy shift position variable SHIFF to the value 3, thus switching to the descending slope weak engine brake mode 2.

If the judgment result of the step S202 is negative, the program proceeds to the step S204 in which it determined whether or not all of the following conditions hold: the fuzzy input switch SW (6) is the value 1; the accelerator opening FV (4) is smaller than a predetermined value CFV45 (e.g., 40%); and the fuzzy input switch SW (8) is the value 0. As explained previously, the fuzzy input switch SW (6) is used to memorize the condition where the accelerator opening is medium. The fuzzy input switch SW (8) is, as described later, used to memorize a deep depression of the accelerator pedal at the time of braking with the gearshift in the 2nd position. Accordingly, this judgment is made to check for a driver's intention for the medium acceleration. If the judgment result is affirmative, the program goes to the foregoing step S205 where it sets fuzzy input switch SW (0) to the value 2, fuzzy input switch SW (5) to the value 0, and fuzzy shift position variable SHIFF to the value 3, thereby switching to the descending slope weak engine brake mode 2. This upshifts the gearshift position from the 2nd to the 3rd, and the depression of the accelerator pedal is less than with the 2nd gearshift position, ensuring an acceleration feeling that matches the driver's intention of acceleration on a descending slope.

If the judgment result of the step S204 is negative, then the program judges whether the fuzzy input switch SW (6) has the value 1 and the accelerator opening FV (4) is larger than the foregoing predetermined CFV45 (40%). This step is to check for a driver's intention of high acceleration. If the judgment result is affirmative, then the program executes the step S208, sets fuzzy input switch SW (8) to the value 1, and terminates the routine. In this case, the 2nd gearshift position is maintained, and the speed change control in the mode 3 is continued. This provides a high output that matches the driver's intention of high acceleration on a descending slope. The mode 3 is the speed change control mode for descending a steep slope while exercising strong engine braking. In this driving mode, if the driver highly accelerates the vehicle, it is predicted that strong braking will be required when turning a corner in the future. The fuzzy input switch SW (8) is used as a flag for issuing a command for strong engine brake at the time of strong braking followed by the high acceleration. Thus, when fuzzy input switch SW (8) is set to the value 1, the judgment result of the foregoing step S204 is negative even if the accelerator opening is medium which is smaller than the predetermined value CFV45 (40%). As a result, the current control mode, i.e., the descending slope strong engine brake mode 3, is always continued and the strong engine brake in the 2nd gearshift position is exercised.

If the judgment result of the foregoing step S206 is negative, then the program terminates the routing without setting fuzzy input switch SW (8) to the value 1. In this case, the 2nd gearshift position is maintained, and the speed change control in the mode 3 is continued, thus preventing wasteful gear shifts.

Processing Routine When the Current Mode is 4

Figure 34:
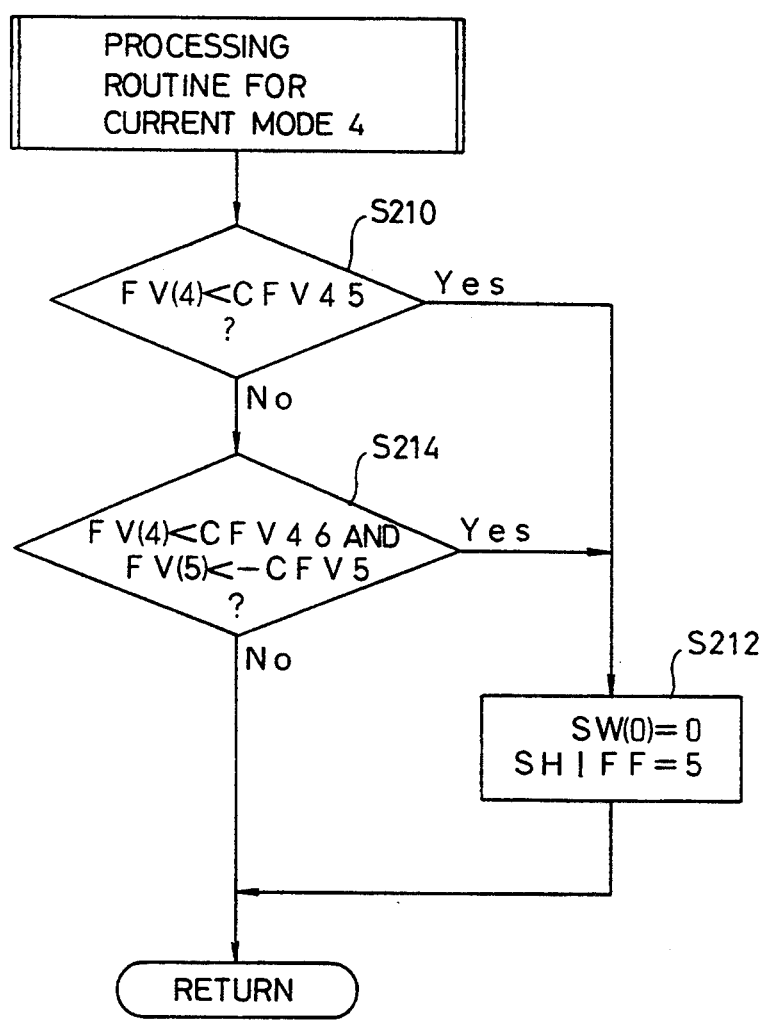
FIG. 34 is a flowchart which shows a processing procedure when the current control mode is 4.

When the current speed change control is being carried out in the control mode 4, the gearshift position is set in accordance with the flowchart shown in FIG. 34. As previously explained, the control mode 4 is the straight ascending slope mode; if the gearshift position set according to the shift pattern of the normal mode 0 is the 4th, then it is downshifted to the 3rd, or if it is the 3rd, then it is downshifted to the 2nd, thereby obtaining a required driving force. As shown in FIG. 1, this control mode 4 can be switched only to the mode 0.

The electronic control unit 5 first judges in the step S210 whether the accelerator opening FV (4) is smaller than a predetermined value CFV45 (e.g., 10%). If the accelerator opening FV (4) is smaller than the predetermined value CFV45, then the program executes the step S212 where it sets fuzzy input switch SW (0) to the value 0, sets fuzzy position variable SHIFF to the value 5, and terminates the routine. In this case, the control mode is switched from the straight ascending slope mode 4 to the normal mode 0.

If the judgment result of the step S210 is negative, the program proceeds to the step S214 where it judges whether the accelerator opening FV (4) is smaller than a predetermined value CFV46 (e.g., 25%) and also the accelerator operating speed FV (5) is smaller than a predetermined negative value (−CFV5). If the judgment results of both conditions are affirmative, then the program advances to the foregoing step S212 where it sets fuzzy input switch SW (0) to the value 0 and fuzzy shift position variable SHIFF to the value 5 in order to switch to the normal mode 0.

If the judgment result of the step S214 is negative, the program terminates the routine without doing anything. In this case, the current control mode 4 is maintained.

Gearshift Position Output Processing

Figure 35:
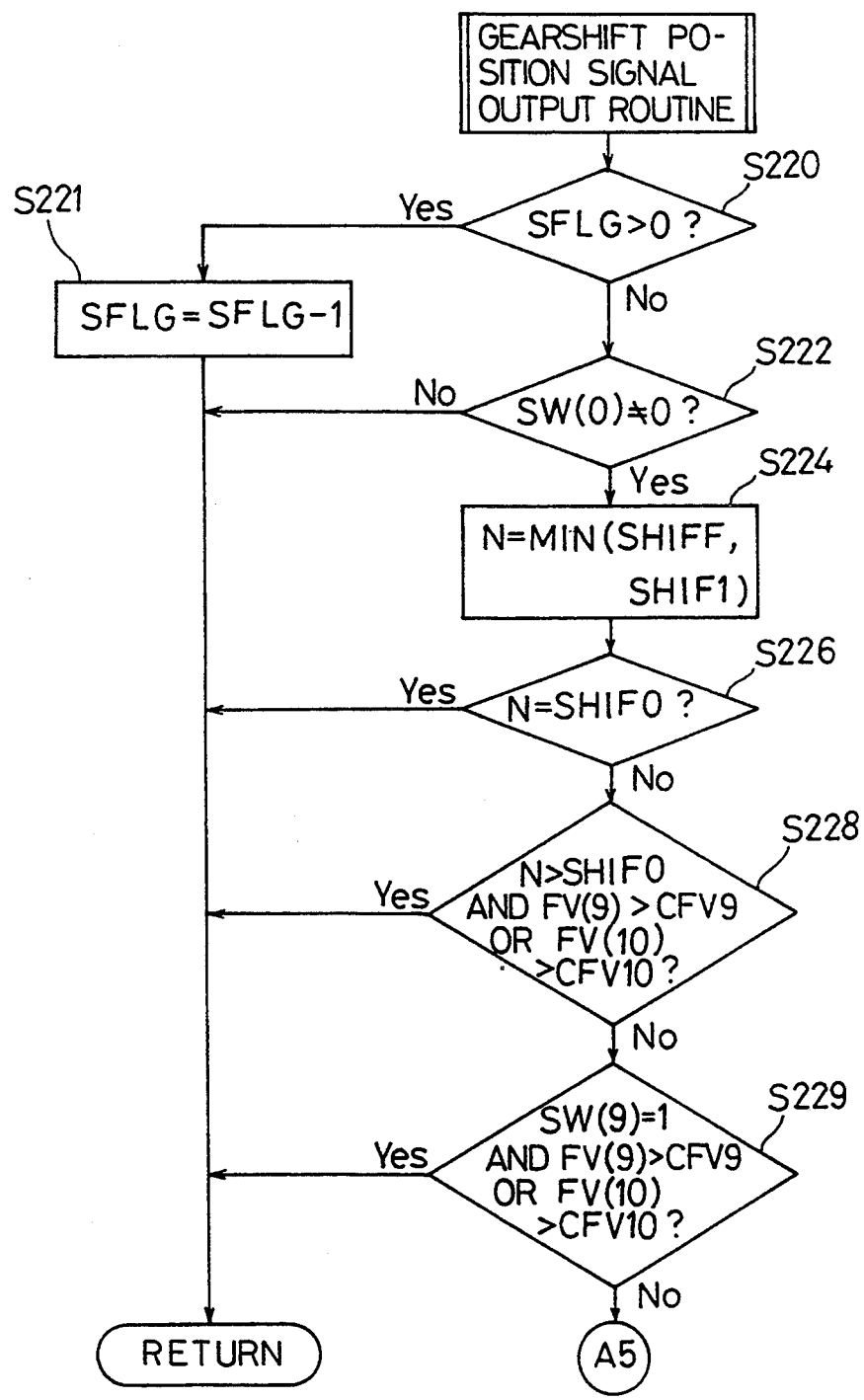
FIG. 35 is a part of a flowchart which shows an output procedure for a shift position control signal.

Upon completion of the processing for each mode as described above, a control signal is sent to the hydraulic oil pressure controller 4 according to a set gearshift position. The flowcharts of FIG. 35 and FIG. 36 indicate a procedure for outputting a gearshift position control signal. The procedure for outputting the gearshift position control signal according to the flowcharts is implemented only when a result of the fuzzy judgment described above indicates the need for changing the current gearshift position. Further, to carry out actual gearshift position changing, the following requirements must all be satisfied; a predetermined period of time (e.g., 0.5 second) has passed since the latest gearshift position change, an absolute value of steering angle is a predetermined value or less, and an absolute value of lateral acceleration is a predetermined value or less. If any of these requirements is not satisfied, then no gearshift position change is made.

More specifically, the electronic control unit 5 determines in the step S220 whether the 0.5-second counter value SFLG is larger than 0. The 0.5-second counter SFLG is a decremental counter or down-counter used to determine whether the predetermined period of time (0.5 second) has elapsed since the previous gearshift position change, and it is reset to an initial value whenever a gearshift position change is made. Accordingly, if the judgment result in the step S220 is affirmative, then the program judges that the predetermined period of time (0.5 second) has not yet elapsed from the latest gearshift position change. In this case, the program decrements the counter value SFLG only by one in the step S221, and terminates the routine. Therefore, if a new gearshift position is set before the counter value SFLG is counted down to zero, the gearshift will not be changed to the new position.

If the predetermined period of time has passed since the latest gearshift position change was made, and the judgment result of the step S220 is negative, then the program proceeds to the step S222 where it judges whether the fuzzy input switch SW (0) has a value other than 0. If the value of switch SW (0) is 0, not being a value other than 0, then it means the speed change control in the mode 0. In this case, the program terminates the routine without doing anything. In the normal mode 0, the normal speed change control is carried out, and there is no need to carry out interrupt gearshift position control based on the fuzzy judgment. Thus, as described before, a gearshift position control signal is supplied to the hydraulic oil pressure controller 4 by a program for the normal speed change control which is separately prepared.

If the program judges that the fuzzy input switch SW (0) has a value other than 0, and the judgment result of the step S222 is affirmative, then the program advances to the step S224 where it selects a smaller gearshift position out of fuzzy gearshift position SHIFF and gearshift position SHIF1 which is set according to the shift pattern of the normal mode 0, and sets that smaller one in the variable N as a gearshift position command value. Also during the fuzzy control, if the gearshift position SHIF1, which is decided according to the shift pattern used for the normal mode 0, is smaller, then this gearshift position is selected preferentially. In other words, the fuzzy gearshift position SHIFF is selected only when the fuzzy gearshift position SHIFF provides a slower speed than that provided by the gearshift position SHIF1 which is set by the shift pattern of the normal mode 0. Then, the program determines whether the value of the selected gearshift position command variable N is equal to the currently commanded gearshift position SHIF0 (the step S226). If it is equal, then there is no need to change the gearshift position, and the program terminates the routine.

If the judgment result of the step S226 is negative, then the program determines whether or not the gearshift position command variable N is larger than the currently commanded gearshift position SHIF0, and when the former is larger than the latter, determined whether or not at least one of the following conditions holds: the absolute value FV (9) of steering angle is larger than a predetermined value CFV9; and the absolute value FV (10) of lateral acceleration is larger than a predetermined value FV (10) (the step S228). If either requirement is satisfied, then the judgment result of the step S228 is affirmative, and in this case, the program terminates the routine without making any gearshift position change. This means that when the upshift command is to be executed according to the gearshift position command variable N, the gearshift position change is prohibited if the steering angle is larger than the predetermined value or the absolute value of lateral acceleration is larger than the predetermined value.

If none of the requirements in the step S228 are satisfied, and the judgment result is negative, then the program proceeds to the step S229 in which it determines whether or not the fuzzy input switch SW (9) has the value 1, and when the SW (9) has the value 1, determined whether at least one of the following conditions holds: the absolute value FV (9) of steering angle is larger than the predetermined value CFV9; and the absolute value FV (10) of lateral acceleration is larger than the predetermined value CFV10. The fuzzy input switch SW (9) is, as previously explained, set to the value 1 when the program judges that the friction factor $\mu$ is low due to a frozen road surface or the like. When either the absolute value FV (9) of steering angle is larger than the predetermined value CFV9, or the absolute value FV (10) of lateral acceleration is larger than the predetermined value CFV10, it means that the vehicle is turning a corner. If the judgment result of the step S229 is affirmative, then the program terminates the routine without implementing any speed change based on the fuzzy speed change control. Thus, any gearshift position change is prohibited when turning a corner on road with low $\mu$ value.

Figure 36:
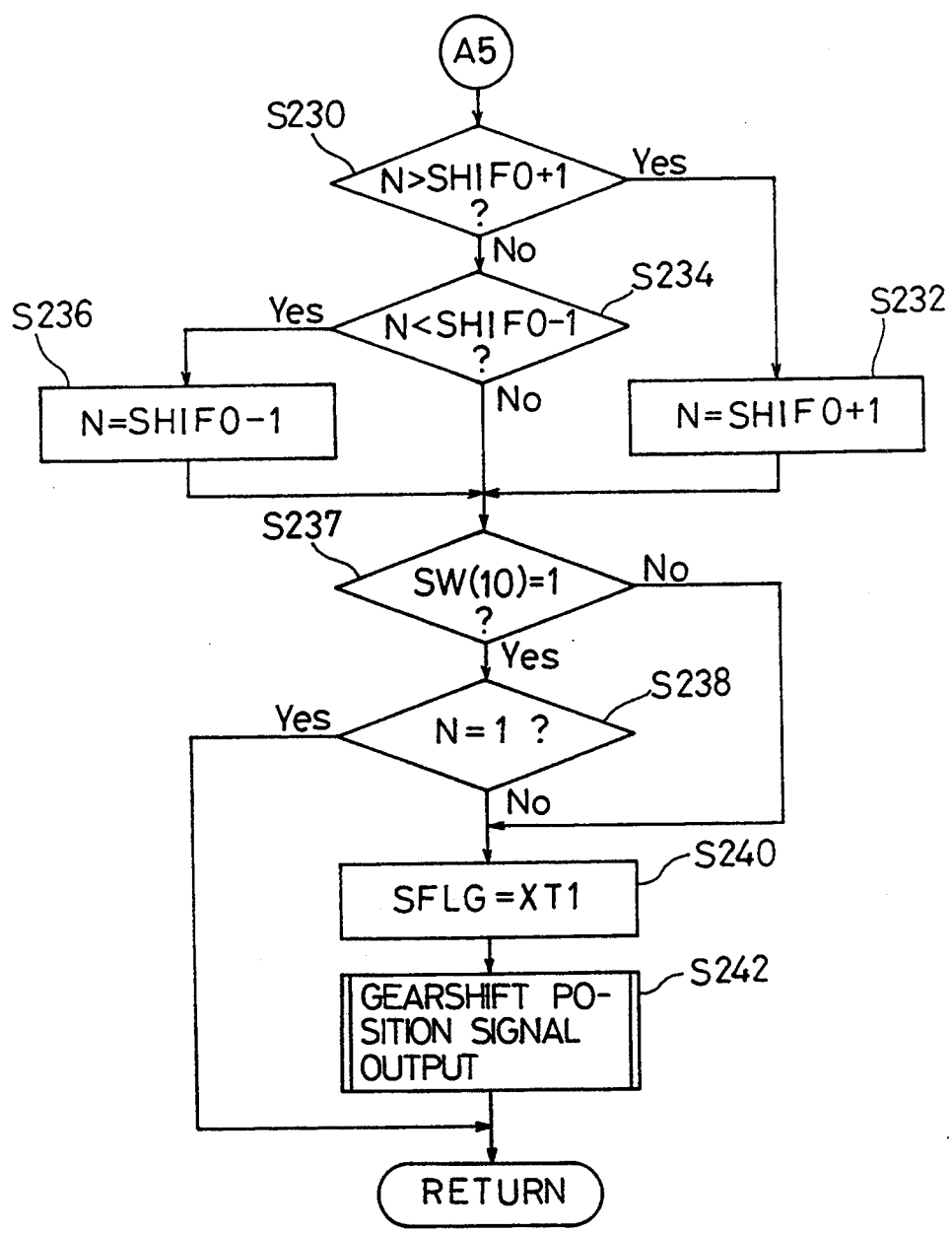
FIG. 36 is the remaining part of the flowchart of FIG. 35.

If none of the requirements in the step S229 are satisfied, and the judgment result is negative, then the program executes the step S230 of FIG. 36. In the step S230, the program determines whether the gearshift position command variable N is larger than a value which is one level higher than the currently commanded gearshift position SHIF0, that is, whether the present gearshift position command variable N would cause an upshift of 2 levels or more at a time. If the present gearshift position command variable N would cause the upshift of 2 levels or more at a time, then the program resets command variable value N to a value (SHIF0+1) in order to limit the present upshift to a gearshift position which is higher than the currently commanded gearshift position SHIF0 only by one level, then proceeds to the step S237 which will be discussed later.

If the judgment result of the step S230 is negative, then the program proceeds to the step S234 where it judges whether the gearshift position command variable N is smaller than a value which is one level lower than the currently commanded gearshift position SHIF0, that is, whether the present gearshift position command variable N would cause a downshift of 2 levels or more at a time. If the present gearshift position command variable N would cause the downshift of 2 levels or more at a time, then the program resets command variable value N to a value (SHIF0−1) in order to limit the present downshift to a gearshift position which is lower than the currently commanded gearshift position SHIF0 only by one level, then proceeds to the step S237 which will be discussed later. If the judgment result of the step S234 is negative, then the program keeps the value of gearshift position command variable N unchanged, and proceeds to the step S237.

In the step S237, the program determines whether the fuzzy input switch SW (10), which serves as the long-term low-$\mu$ road judgment flag, has been set to the value 1. The value of this fuzzy input switch SW (10) is stored in the foregoing non-volatile battery-backed-up RAM. When this value of switch SW (10) is 1, it means that the friction factor $\mu$ is low due to a snow-covered or frozen road surface or the like. Accordingly, if the judgment result of the step S237 is negative, then the program directly advances to the step S240 which will be discussed later, but if the judgment result is affirmative, then it proceeds to the step S238 where it decides whether the command variable N is equal to the value 1. If the command variable value N is equal to the value 1, that is, if the gearshift position to be outputted is the 1st position, then the program terminates the routine, and prohibits downshift to the 1st position. If the judgment result of the step S238 is negative, and the command variable value N is not equal to the value 1, then the program goes to the step S240, assuming that there is no particular problem.

The subsequent step S238 is executed only if the result of the comparison of the commanded gearshift position N with the current gearshift position SHIF0 is negative in the foregoing step S226. In the step S238, therefore, the case where the commanded gearshift position N value is equal to 1 can take place only when the current gearshift position SHIF0 is the 2nd position. Thus, on a snow-covered road (a case where SW (10)=1 applies), for example, even if the vehicle speed lowers and the 1st gearshift position is selected from the shift pattern of the normal mode 0, the judgment result of the step S238 prevents the step S242 from being executed. As a result, the current gearshift position SHIF0, i.e., the 2nd gearshift position, is maintained, thus reliably prohibiting the downshift to the 1st gearshift position when driving on the road with the low $\mu$ value.

In the step S240, the program resets the value of 0.5-second counter SFLG to a predetermined value XT1 (a value corresponding to 0.5 second), and executes the step S242 to output a gearshift position control signal, that corresponds to the gearshift position command variable N, to the hydraulic oil pressure controller 4, then terminates the routine. The gearshift position control signal outputted in the step S240 is based on the fuzzy control, and the signal has a higher priority than the gearshift position control signal outputted according to the normal mode 0; therefore, the gearshift operation based on the fuzzy control is executed, interrupting the gearshift position control signal based on the normal mode 0.

Normal Mode Speed Change Control

Figure 37:
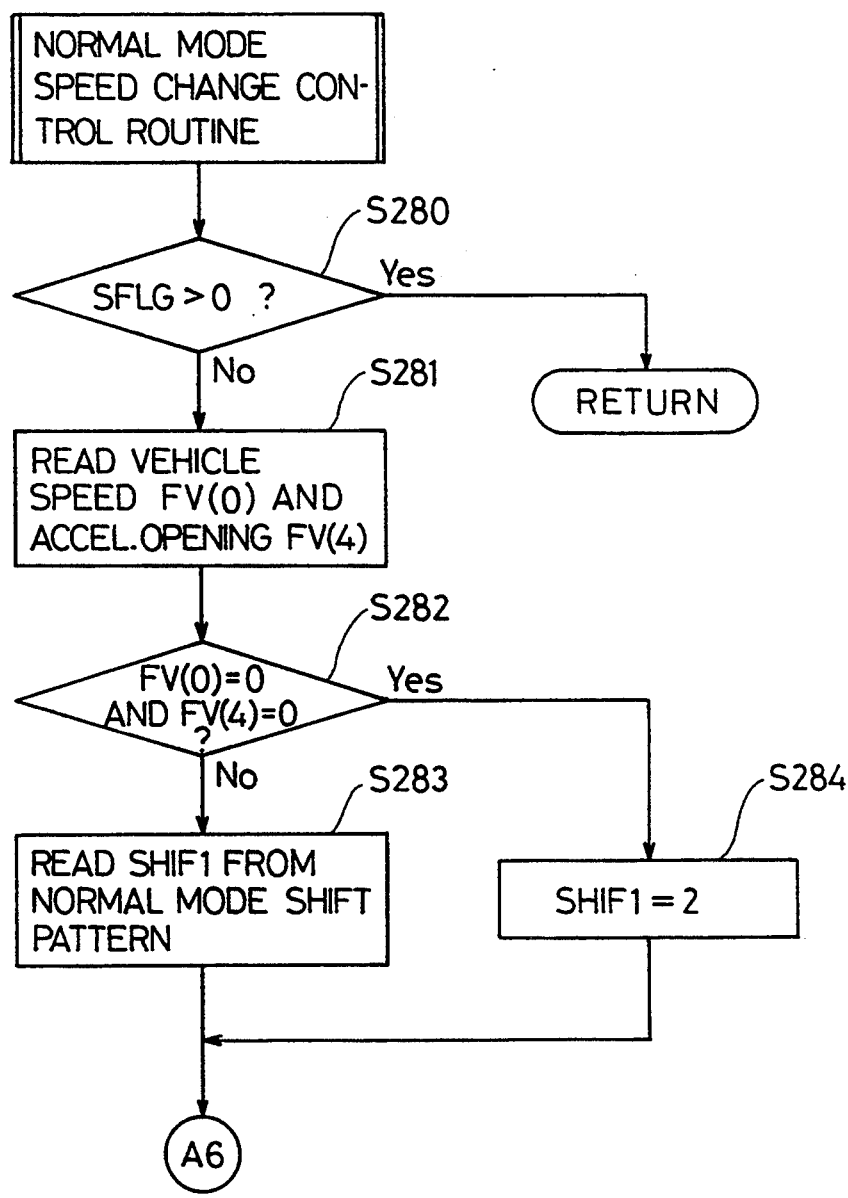
FIG. 37 is a part of a flowchart which shows a speed change control procedure in the normal mode 0.

A procedure of the speed change control based on the normal mode 0 will now be described with reference to the flowcharts of the normal mode speed change control routine shown in FIG. 37 through FIG. 39.

The normal mode speed change control routine is carried out at a predetermined control interval when the gearshift lever position detected by the gearshift position sensor 12 is in the drive (D) position. The electronic control unit 5 first judges in the step S280 whether the 0.5-second counter value SFLG is larger than 0. The 0.5-second counter SFLG uses the same counter used for the gearshift position output routine in the fuzzy control. As described previously, the 0.5-second counter SFLG is used to prohibit any gearshift position change before the predetermined period of time (0.5 second) elapses since the latest gearshift position change. Accordingly, if the judgment result of the step S280 is affirmative, then it means that the predetermined period of time (0.5 second) has not yet passed from the previous gearshift position change. In this case, the program immediately terminates the routine. The counter value SFLG is decremented by one in the foregoing gearshift position output routine.

If the judgment result of the step S280 is negative after the predetermined period of time elapses since the previous gearshift position change, then the program proceeds to the step S281 where it reads the vehicle speed FV (0) and the accelerator opening FV (4), and judges whether the read vehicle speed FV (0) is 0 and the read accelerator opening FV (4) is also 0 (the step S282). This judgment is performed to determine whether the vehicle is stopped and the accelerator pedal is in a non-depressed condition. If the judgment result is affirmative, then the program goes to the step S284 where it coercively sets the value of SHIF1 to the value 2, i.e., the 2nd gearshift position, as a commanded gearshift position, and advances to the step S285. Thus, setting the gearshift position in the 2nd effectively prevents the vehicle from creeping. The creeping phenomenon may take place when the gearshift is in the D range and the vehicle is stopped.

If the judgment result in the step S282 is negative, that is, if the accelerator pedal is depressed for starting or the vehicle is traveling, then the program goes to the step S283 where it reads out the computed gearshift position SHIF1 of the mode 0 on the basis of speed FV (0) and accelerator opening FV (4), from the shift pattern of the normal mode 0 stored in the memory 5C. The shift pattern of the normal mode 0 defines gearshift position ranges, which are optimum for driving on a flat road in an urban district or the like, on the basis of speed and accelerator opening.

Figure 38:
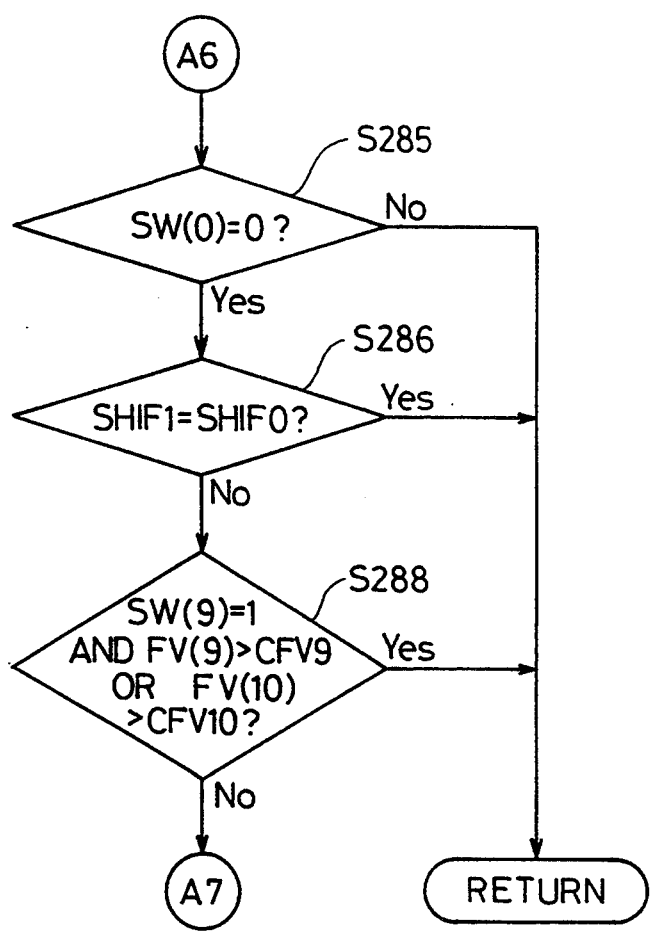
FIG. 38 is another part of the flowchart of FIG. 37.

After computing the gearshift position SHIF1, the program proceeds to the step S285 of FIG. 38 where it judges whether the fuzzy input switch SW (0) has the value 0. If the switch SW (0) has a value other than 0, this means that the fuzzy speed change control is based on one of the modes other than the mode 0. In this case, the program terminates the routine without doing anything. On the other hand, if the judgment result of the step S285 is affirmative and the mode is the normal mode 0, then the program determines whether the computed gearshift position SHIF1 is equal to the currently commanded gearshift position SHIF0 (the step S286). If the SHIF1 is equal to the SHIF0, then there is no need to change the gearshift position, so the program terminates the routine.

On the other hand, if the judgment result of the step S286 is negative, then the program proceeds to the step S288 where it determines whether or not the fuzzy input switch SW (9) has the value 1, and when the SW (9) has the value 1, determined whether or not at least one of the following conditions holds: the absolute value FV (9) of steering angle is larger than the predetermined value CFV9; and the absolute value FV (10) of the lateral acceleration is larger than the predetermined value CFV10. As previously described, the fuzzy input switch SW (9) is used for memorizing the condition that indicates that the friction factor $\mu$ is low due to a frozen road surface or other reasons. Like the gearshift position output routine shown in FIG. 35, if the judgment result of the step S288 is affirmative, the program terminates the routine and does not implement the speed change based on the fuzzy speed change control. In other words, on the road with the low $\mu$, gearshift position changes are prohibited when turning a corner.

Figure 39:
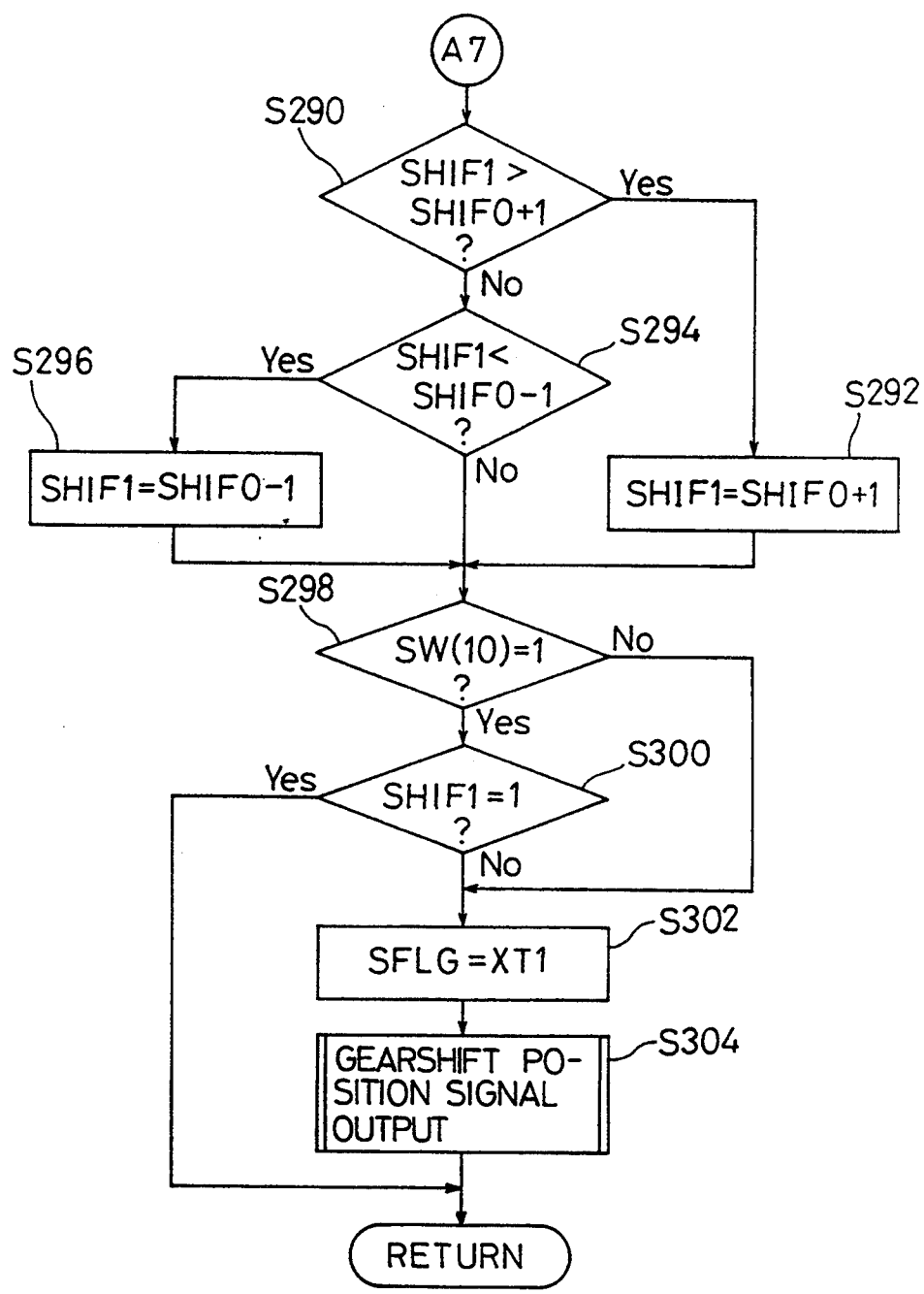
FIG. 39 is the remaining part of the flowchart of FIG. 38.

If the judgment result of the step S288 is negative, the step S290 of FIG. 39 is executed. The step S290, the program determines whether the computed gearshift position SHIF1 of the mode 0 is larger than a value which is one level higher than the currently commanded gearshift position SHIF0, that whether the present computed gearshift position SHIF1 would cause an upshift of 2 levels or more at a time. If the present computed gearshift position SHIFT1 would cause the upshift of 2 levels or more at a time, then the program resets, in the step S292, the computed gearshift position SHIF1 to a value (SHIF0+1) in order to restrict the present upshift to a gearshift position which is higher than the currently commanded gearshift position SHIF0 only by one level. After that, the program proceeds to the step S298 which will be discussed later.

On the other hand, if the judgment result of the step S290 is negative, then the program proceeds to the step S294 where it judges whether the computed gearshift position SHIF1 of the mode 0 is smaller than a value which is one level lower than the currently commanded gearshift position SHIF0, that is, whether the present computed gearshift position SHIF1 would cause a downshift of 2 levels or more at a time. If the present computed gearshift position SHIF1 would cause the downshift of 2 levels or more at a time, then the program resets, in the step S296, computed gearshift position SHIF1 to a value (SHIF0−1) in order to restrict the present downshift to a gearshift position which is lower than the currently commanded gearshift position SHIF0 only by one level, and proceeds to the step S298 to be discussed later. If the judgment result of the step S294 is negative, then the program keeps the value of the computed gearshift position SHIF1 unchanged, and proceeds to the step S298.

In the step S298, the program determines whether the fuzzy input switch SW (10), which serves as the long-term low $\mu$ road judgment flag, has been set to the value 1. As previously described, the value of fuzzy input switch SW (10) is stored in the non-volatile battery-backed-up RAM. When the value of switch SW (10) is 1, it means that the friction factor $\mu$ is low due to a snow-covered or frozen road surface or the like. Accordingly, if the judgment result of the step S298 is negative, then the program goes directly to the step S302 which will be discussed later, but if the judgment result is affirmative, then the program goes to the step S300 where it determines whether the computed gearshift position SHIF1 is equal to the value 1. If the computed gearshift position SHIF1 is equal to the value 1, that is, if the gearshift position to be outputted is in the 1st level, then the program terminates the routine, and prohibits downshift to the 1st level. If the judgment result of the step S300 is negative, and the computed gearshift position SHIF1 is not equal to the value 1, then the program goes to the step S302, assuming that there is no particular problem.

In a case where the gearshift changes from the N range to the D range, and the vehicle is started, according to the normal mode speed change control applied in the present embodiment, the gearshift is coercively set in the 2nd position (the step S284) thereby preventing creeping phenomenon as long as the vehicle is stopped, and the accelerator pedal in a non-depressed condition. Under this condition, when the accelerator pedal is depressed, causing accelerator opening FV (4) to become larger than a predetermined small value, the 1st gearshift position is selected in the step S283. When the gearshift is set in the 1st position at the time of starting the vehicle, there would be no problem on a regular paved road, but the vehicle wheels may slip to make the starting difficult on a snow-covered road if the accelerator pedal is depressed abruptly. In such a case, according to the speed change control method of the present invention, setting the gearshift in the 1st position is prohibited on the road with the low $\mu$ value in the aforementioned steps S298 and S300. As a result, the 2nd gearshift position set to prevent creeping is maintained to start the vehicle with the gearshift in the 2nd position. It is also prohibited, of course, to downshift to the 1st position when driving on the road with the low $\mu$ value. Thus, on the road with the low $\mu$ value such as a snow-covered road, the downshift to the 1st position is prohibited to permit easy starting on a snow-covered road or prevent slippage or the like when driving.

In the step S302, the program sets the value of the 0.5-second counter SFLG to a predetermined value XT1 (a value corresponding to 0.5 second), then executes the step S304 to output a gearshift position control signal, which corresponds to the computed gearshift position SHIF1, to the hydraulic oil pressure controller 4, and it terminates the routine.

What is claimed is:

1. A speed change control method for an automatic transmission which is provided on a vehicle and which has a plurality of gear positions including a lowest-speed gearshift position, comprising the steps of:
   (a) detecting a value of a parameter related to frictional resistance of a road surface on which the vehicle is traveling;
   (b) detecting a start of the vehicle from a stop position; and
   (c) prohibiting gearshift to said lowest-speed gearshift position if the frictional resistance of the road surface is judged to be low based on the value of the detected said related parameter at the time of detecting a start.

2. The speed change control method according to claim 1, wherein said step (a) is carried out repeatedly, and the step (a) includes the substep of establishing a first predetermined value, establishing a second predetermined value, and determining the frictional resistance of the road surface to be low when an occurrence frequency (%) of said value being less than or equal to a first predetermined value, is greater than or equal to said second predetermined value.

3. The speed change control method according to claim 2, wherein said step (a) further includes the substep of establishing a first predetermined period of time, and determining the frictional resistance of the road surface to be low until said first predetermined period of time elapses from the point at which the occurrence frequency (%) falls below said second predetermined value, when the occurrence frequency (%) of said value detected in the step (a) being less than or equal to the first predetermined value, decreases to said second predetermined value or less.

4. The speed change control method according to claim 3, wherein said step (c) includes the substep of establishing a second predetermined period of time, establishing a third predetermined value, and prohibiting gearshifting to said lowest-speed gearshift position at the detected starting of the vehicle from the stopped position in said step (a), when the ratio of a period of time during which the said frictional resistance of the said road surface is judged to be low to said second predetermined period of time is equal to or greater than said third predetermined value.

5. The speed change control method according to claim 1, wherein said vehicle is equipped with a steering device designed to generate a hydraulic pressure during steering to supplement steering force thereby, the hydraulic pressure generated is proportional to a cornering force applied to the vehicle, and the frictional resistance of the road surface is detected on the basis of hydraulic pressure generated by said steering device, steering angle, and vehicle speed.

6. A speed change control apparatus for an automatic transmission which is provided on a vehicle and which has a plurality of gear positions including a lowest-speed gearshift position, comprising:
frictional resistance detecting means for detecting a value of a parameter related to frictional resistance of a road surface on which a vehicle is travelling;
vehicle start detecting means for detecting a start of the vehicle from a stop position; and
prohibiting means for prohibiting gearshift to said lowest-speed gear position if the frictional resistance of the road surface is judged to be low based on the detected value when the start of the vehicle is detected.

7. A speed change control apparatus according to claim 6, wherein:
said frictional resistance detecting means detects the value of said parameter related to frictional resistance of the road surface repeatedly; and
said frictional resistance detecting means further includes a first establishing means for establishing a first predetermined value, a second establishing means for establishing a second predetermined value, and a first determining means for determining the frictional resistance of the road surface to be low when an occurrence (%) of said detected value being less than or equal to said first predetermined value, is greater than or equal to said second predetermined value.

8. A speed change control apparatus according to claim 7, wherein:
said frictional resistance detecting means further includes a third establishing means for establishing a first predetermined period of time, and a second determining means for determining the frictional resistance of the road surface to be low until said first predetermined period of time elapses from the point at which the occurrence frequency (%) falls below said second predetermined value, when the occurrence frequency (%) of said value detected by said frictional resistance detector being less than or equal to the first predetermined value, decreases to said second predetermined value.

9. A speed change control apparatus according to claim 8, wherein:
said prohibiting means further includes a fourth establishing means for establishing a second predetermined period of time, fifth establishing means for establishing a third predetermined value, a control ratio establishing means for establishing a ratio of a period of time during which the frictional resistance of the road surface is judged to be low to said second predetermined period of time, and said prohibiting means prohibits gearshift to said lowest-speed gear position at the detected starting of the vehicle by said when said established ratio is equal to or greater than said third predetermined value.

10. A speed change control apparatus according to claim 9, wherein, said second predetermined period is longer than said first predetermined period.

11. A speed change control apparatus according to claim 7, wherein:
said frictional resistance detector includes sensor for detecting hydraulic pressure of a steering device designed to generate said hydraulic pressure during steering to supplement steering force thereby, a steer angle sensor, and a vehicle speed sensor.

* * * * *